US012638848B1

(12) United States Patent
Bernards et al.

(10) Patent No.: US 12,638,848 B1
(45) Date of Patent: May 26, 2026

(54) DOCKS FOR LEGGED ROBOTS AND RELATED TECHNOLOGY

(71) Applicant: Agility Robotics, Inc., Pittsburgh, PA (US)

(72) Inventors: Mitchell Bernards, Lake Oswego, OR (US); Ryan Schwendeman, Albany, OR (US); Grayson Lewis, Corvallis, OR (US); Frankie Vazquez, San Francisco, CA (US); Jonathan Hurst, Albany, OR (US); Mikhail Jones, Corvallis, OR (US); Andrew Abate, Albany, OR (US); Kevin Sweeney, Albany, OR (US); Frederic Hook, Albany, OR (US); Stefan Klein, Portland, OR (US); Ryan Domres, Portland, OR (US)

(73) Assignee: Agility Robotics, Inc., Salem, OR (US)

( * ) Notice: Subject to any disclaimer, the term of this patent is extended or adjusted under 35 U.S.C. 154(b) by 690 days.

(21) Appl. No.: 18/156,343

(22) Filed: Jan. 18, 2023

Related U.S. Application Data

(60) Provisional application No. 63/300,521, filed on Jan. 18, 2022.

(51) Int. Cl.
*G05D 1/00* (2024.01)
*B62D 57/032* (2006.01)
*H02J 7/70* (2026.01)

(52) U.S. Cl.
CPC ......... *G05D 1/0225* (2013.01); *B62D 57/032* (2013.01); *H02J 7/70* (2026.01)

(58) Field of Classification Search
CPC ........ G05D 1/0225; H02J 7/70; B62D 57/032
USPC ......................................................... 320/109
See application file for complete search history.

(56) References Cited

U.S. PATENT DOCUMENTS

| | | | |
|---|---|---|---|
| 6,764,373 B1 | 7/2004 | Osawa et al. | |
| 8,364,314 B2 | 1/2013 | Abdallah et al. | |
| 9,252,584 B2 | 2/2016 | Aldrich | |
| 2006/0043929 A1 | 3/2006 | Koyanagi | |
| 2022/0194245 A1 | 6/2022 | Gonano et al. | |

FOREIGN PATENT DOCUMENTS

CN           1743146           3/2012

*Primary Examiner* — Helal A Algahaim
*Assistant Examiner* — Michael T Dowling

(57) ABSTRACT

A system in accordance with at least some embodiments of the present technology includes a robot and a dock. The robot includes a body and a plurality of legs connected to the body through which the robot is configured to ambulate. The robot further includes a hanger carried by the body and a charge-receiving electrode at the hanger. The dock includes a hook, a charge-dispensing electrode at the hook, and a guide that urges the hanger into alignment with the hook. The system is transitionable between an undocked state and a docked state. In the undocked state, the robot and the dock are spaced apart from one another. In the docked state, the hanger is received at the hook, the dock supports at least a portion of a weight of the robot via the hook, and the charge-receiving electrode is electrically connected to the charge-dispensing electrode.

20 Claims, 39 Drawing Sheets

Figure 34:
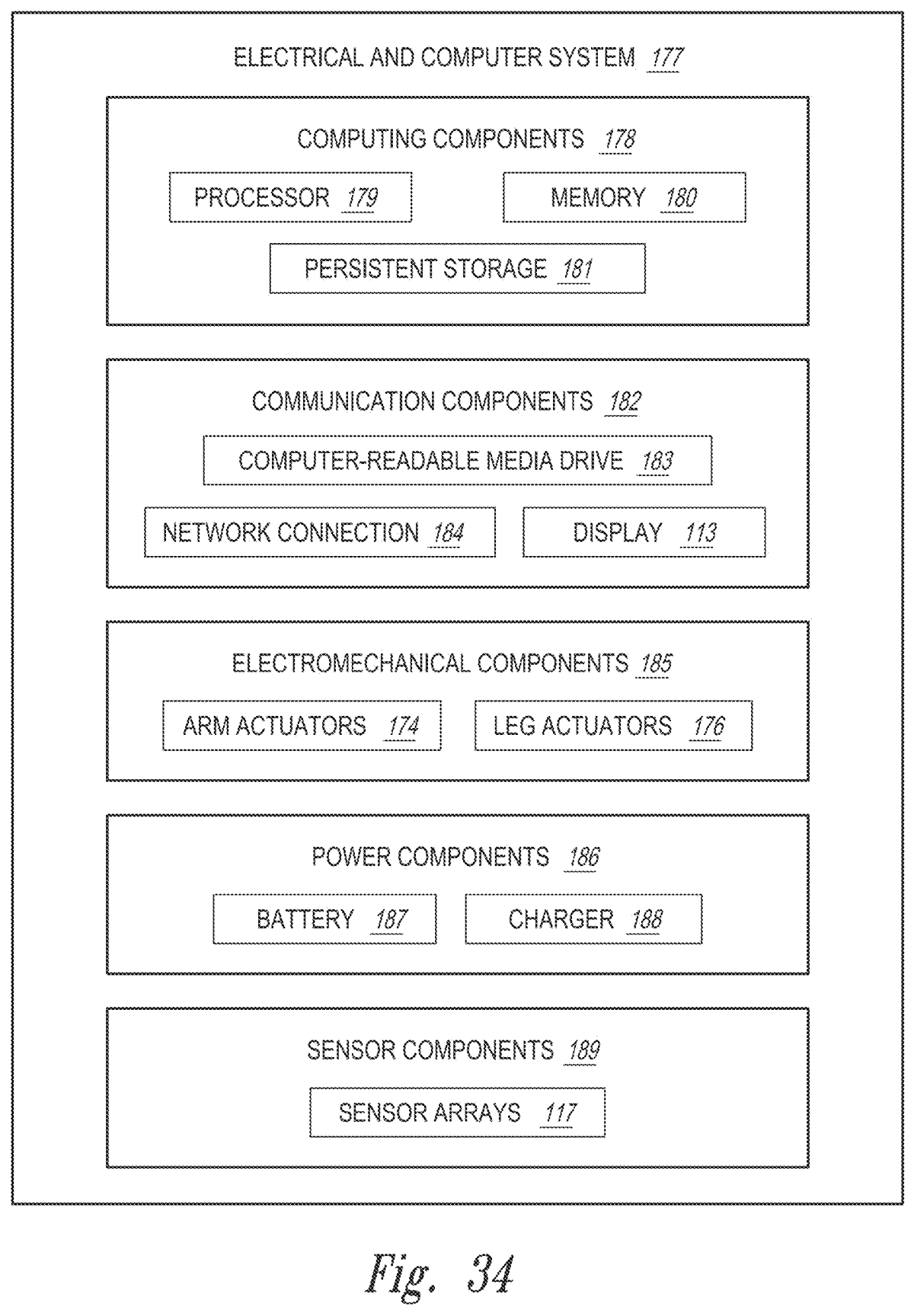

ELECTRICAL AND COMPUTER SYSTEM _177_

COMPUTING COMPONENTS _178_

PROCESSOR _179_

MEMORY _180_

PERSISTENT STORAGE _181_

COMMUNICATION COMPONENTS _182_

COMPUTER-READABLE MEDIA DRIVE _183_

NETWORK CONNECTION _184_

DISPLAY _113_

ELECTROMECHANICAL COMPONENTS _185_

ARM ACTUATORS _174_

LEG ACTUATORS _176_

POWER COMPONENTS _186_

BATTERY _187_

CHARGER _188_

SENSOR COMPONENTS _189_

SENSOR ARRAYS _117_

DOCKS FOR LEGGED ROBOTS AND RELATED TECHNOLOGY

CROSS-REFERENCE TO RELATED APPLICATION

This claims the benefit of U.S. Provisional Application No. 63/300,521, filed Jan. 18, 2022. The foregoing application is incorporated herein by reference in its entirety. To the extent the foregoing application or any other material incorporated herein by reference conflicts with the present disclosure, the preset disclosure controls.

TECHNICAL FIELD

The present technology relates to docking legged robots, such as to facilitate charging, maintenance, and/or storage of the robots.

BACKGROUND

Many simple tasks that humans currently perform are amenable to automation using robotics. Among such tasks are those involving moving goods between locations within distribution centers. For example, after a trailer containing goods arrives at a distribution center, human workers are needed to move the goods from the trailer onto a conveyor that carries the goods to other locations within the distribution center for further processing. Similarly, although conveyors can be used to deliver outgoing goods to loading docks and palletizing stations at distribution centers, human workers are still needed to move the goods from the conveyors onto outgoing trailers and pallets. As another example, human workers at order-fulfillment distribution centers are often tasked with retrieving specific goods for last-mile delivery. Modern order-fulfillment distribution centers are massive and handle thousands of different goods. Even with the aid of sophisticated route optimization systems, locating and retrieving specific goods to fill orders as needed is labor intensive. Indeed, it is not uncommon for human workers at order-fulfillment distribution centers to walk ten or more miles a day. Despite the apparent simplicity of loading and unloading trailers and pallets and of retrieving specific goods for last-mile delivery, these tasks have conventionally been difficult or impossible to fully automate.

In the forgoing examples and in other cases, the use of human workers to perform repetitive and time-consuming tasks is inefficient. Human effort would be far better applied to more complex tasks, particularly those involving creativity and advanced problem solving. Presently, however, the need for distribution centers is large and rapidly increasing. Some analysts forecast a shortage of a million or more distribution-center workers within the next ten to fifteen years. Due to the importance of this field, even small improvements in efficiency can have major impacts on macroeconomic productivity. For these and/or other reasons, there is a significant and growing need for innovation that supports automating simple tasks that humans currently perform at distribution centers and elsewhere.

BRIEF DESCRIPTION OF THE DRAWINGS

Certain aspects of the present technology can be better understood with reference to the following drawings. The relative dimensions in the drawings may be to scale with respect to some embodiments of the present technology. With respect to other embodiments, the drawings may not be to scale. The drawings may also be enlarged arbitrarily. For clarity, reference-number labels for analogous components or features may be omitted when the appropriate reference-number labels for such analogous components or features are clear in the context of the specification and all of the drawings considered together. Furthermore, the same reference numbers may be used to identify analogous components or features in multiple described embodiments.

Figure 1:
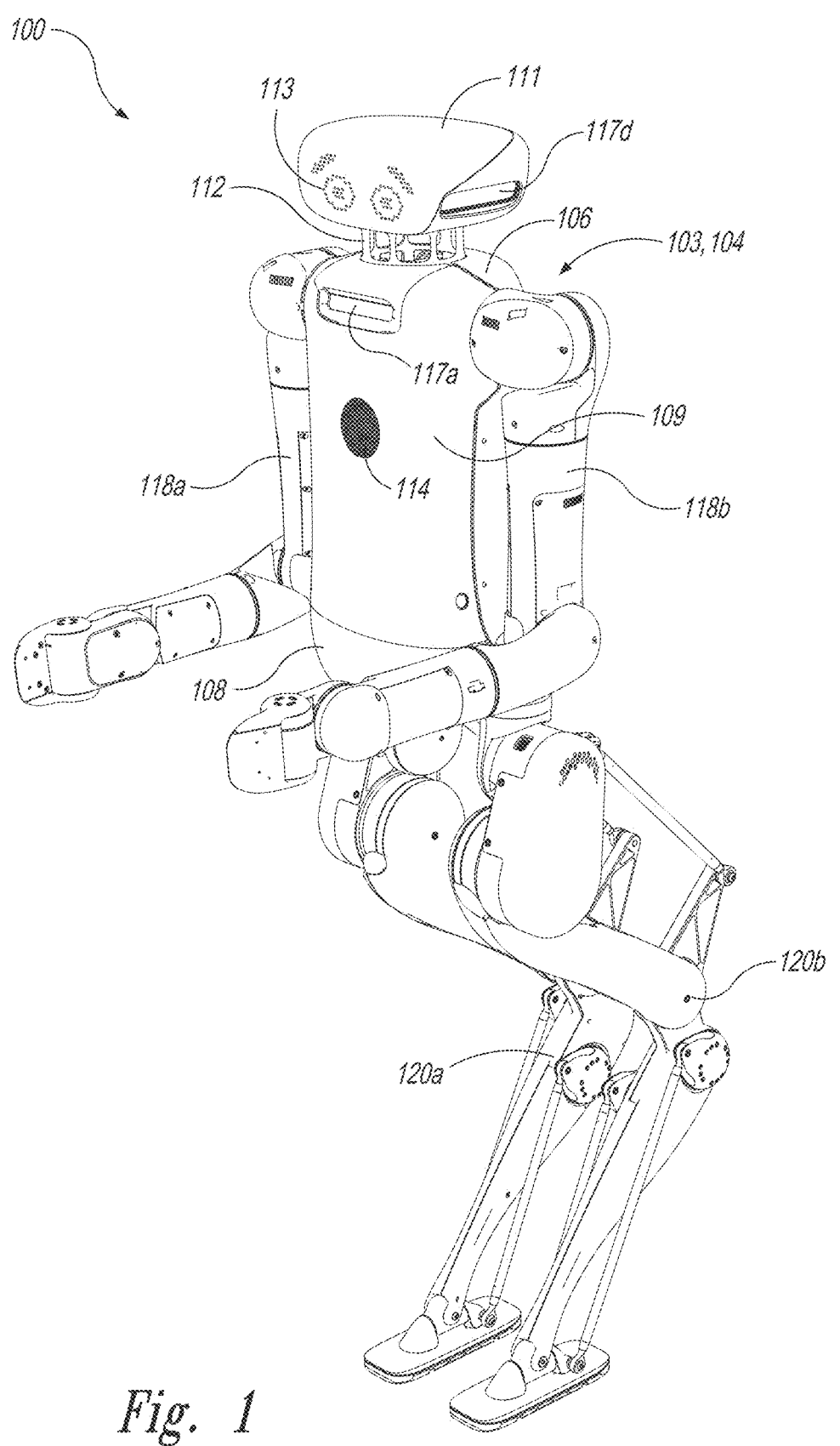
Figure 2:
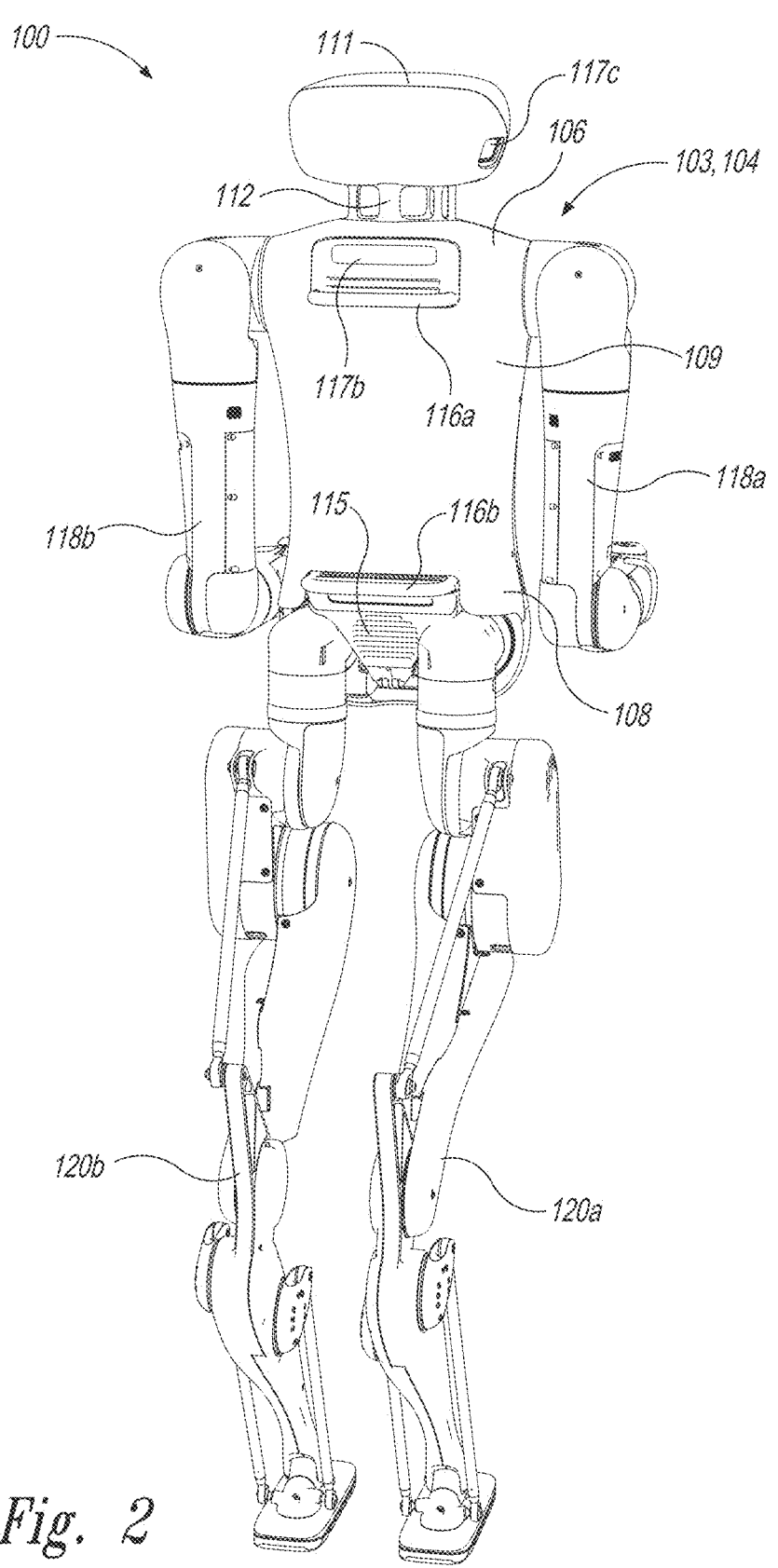
Figure 3:
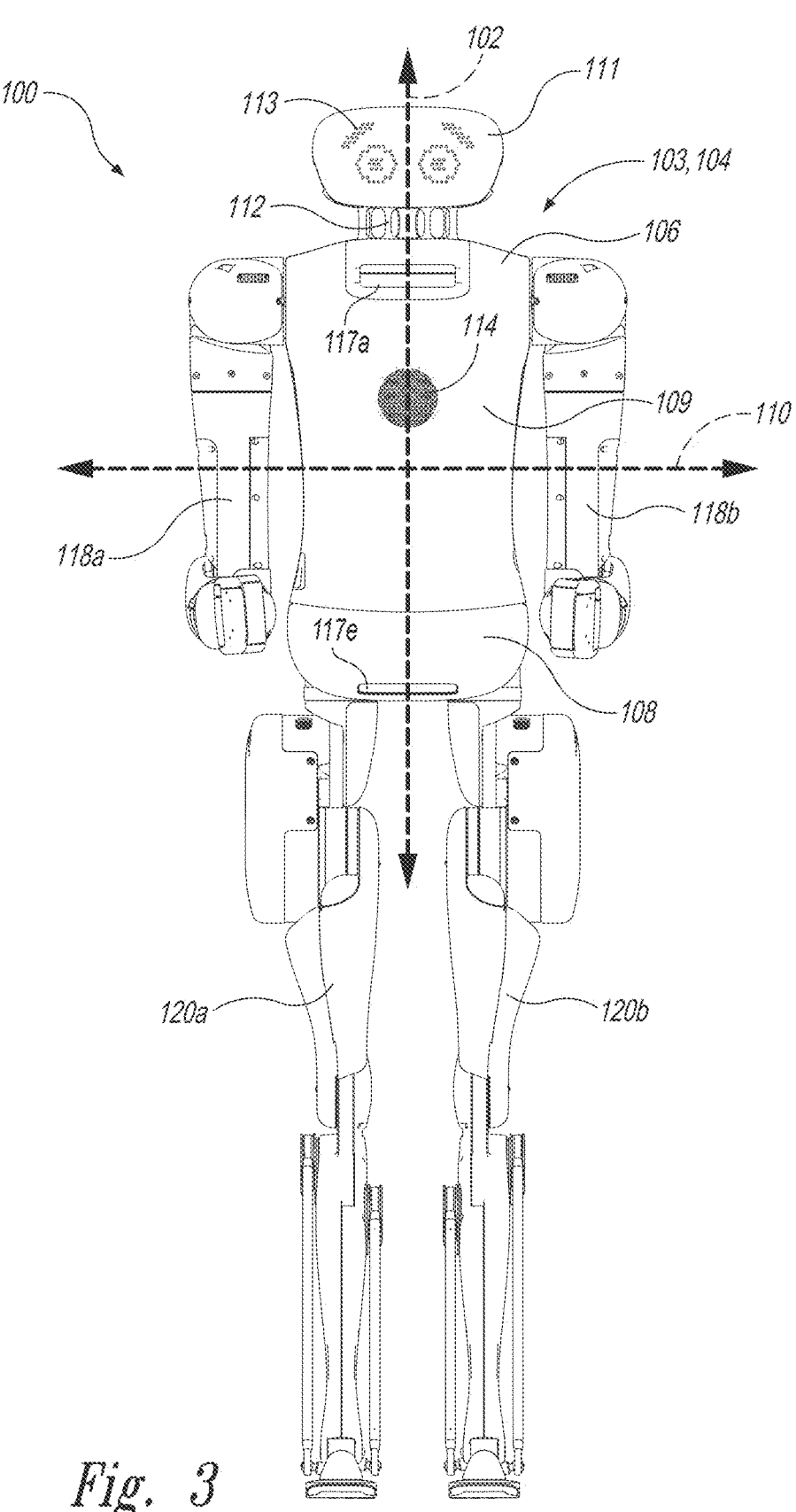
Figures 4, 5, 6, 7:
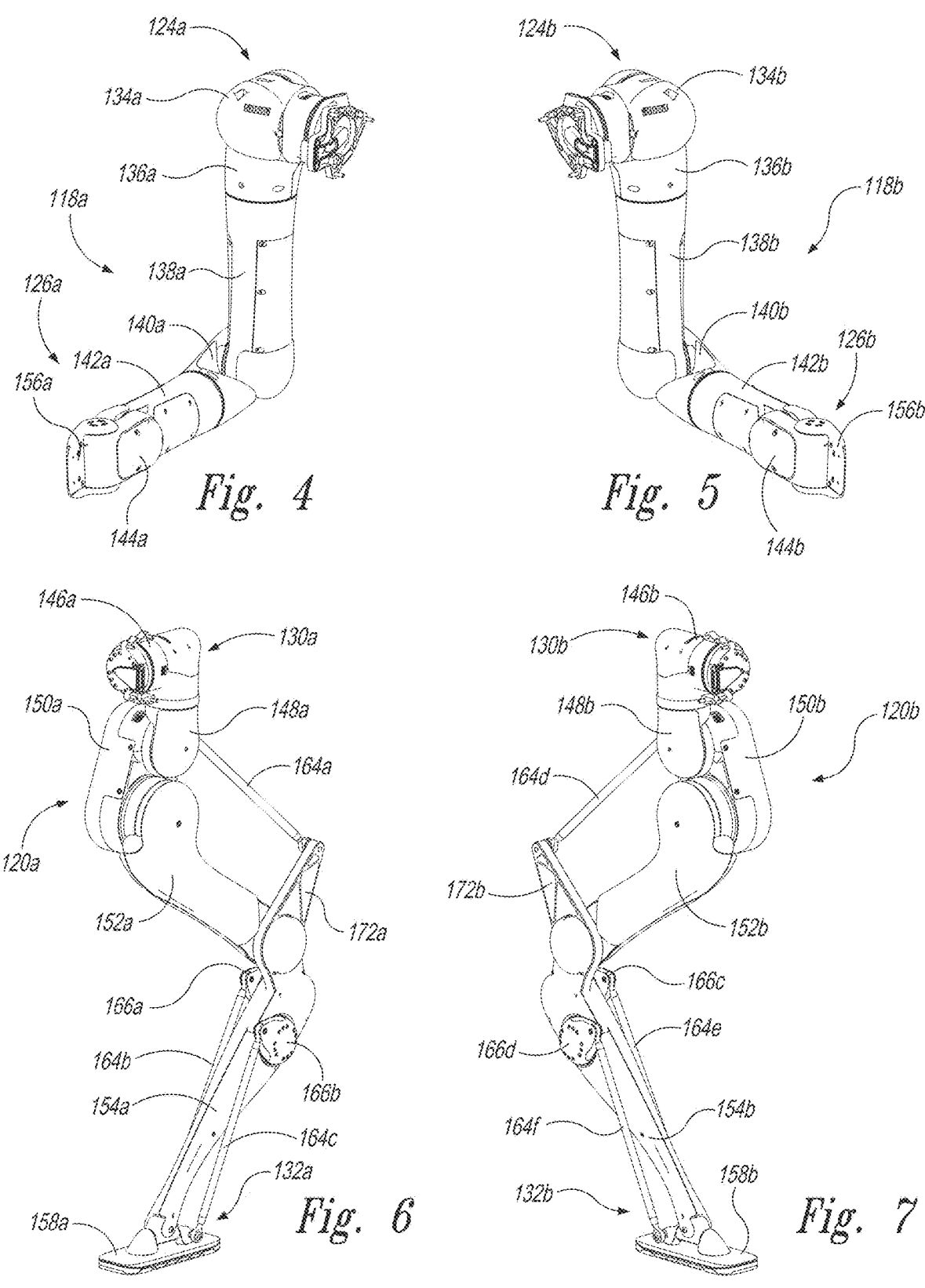
Figures 8, 9, 10, 11:
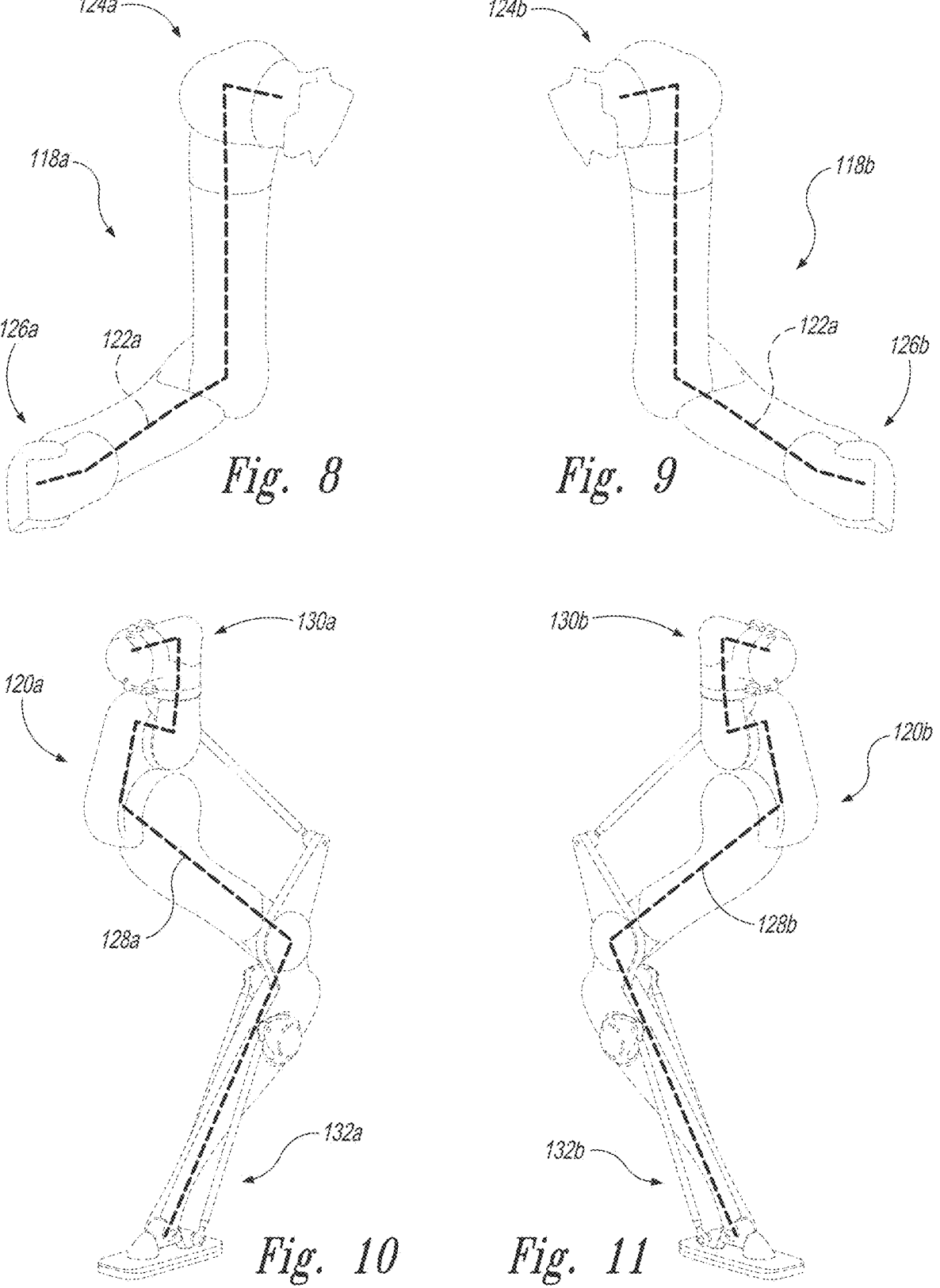

FIGS. 1-3 are, respectively, a first perspective view, a second perspective view, and a front profile view of a robot in accordance with at least some embodiments of the present technology with the robot being in a first state.

FIGS. 4-7 are perspective views of a first arm, a second arm, a first leg, and a second leg, respectively, of the robot shown in FIG. 1.

FIGS. 8-11 are silhouette views of the first arm, the second arm, the first leg, and the second leg, respectively, of the robot shown in FIG. 1 illustrating corresponding arm and leg lengths.

FIGS. 12-15 are partially schematic diagrams showing kinematic chains corresponding, respectively, to the first arm, the second arm, the first leg, and the second leg of the robot shown in FIG. 1.

FIGS. 16-19 are partially transparent perspective views of the first arm, the second arm, the first leg, and the second leg, respectively, of the robot shown in FIG. 1 illustrating corresponding arm and leg actuators.

Figures 18, 19, 20:
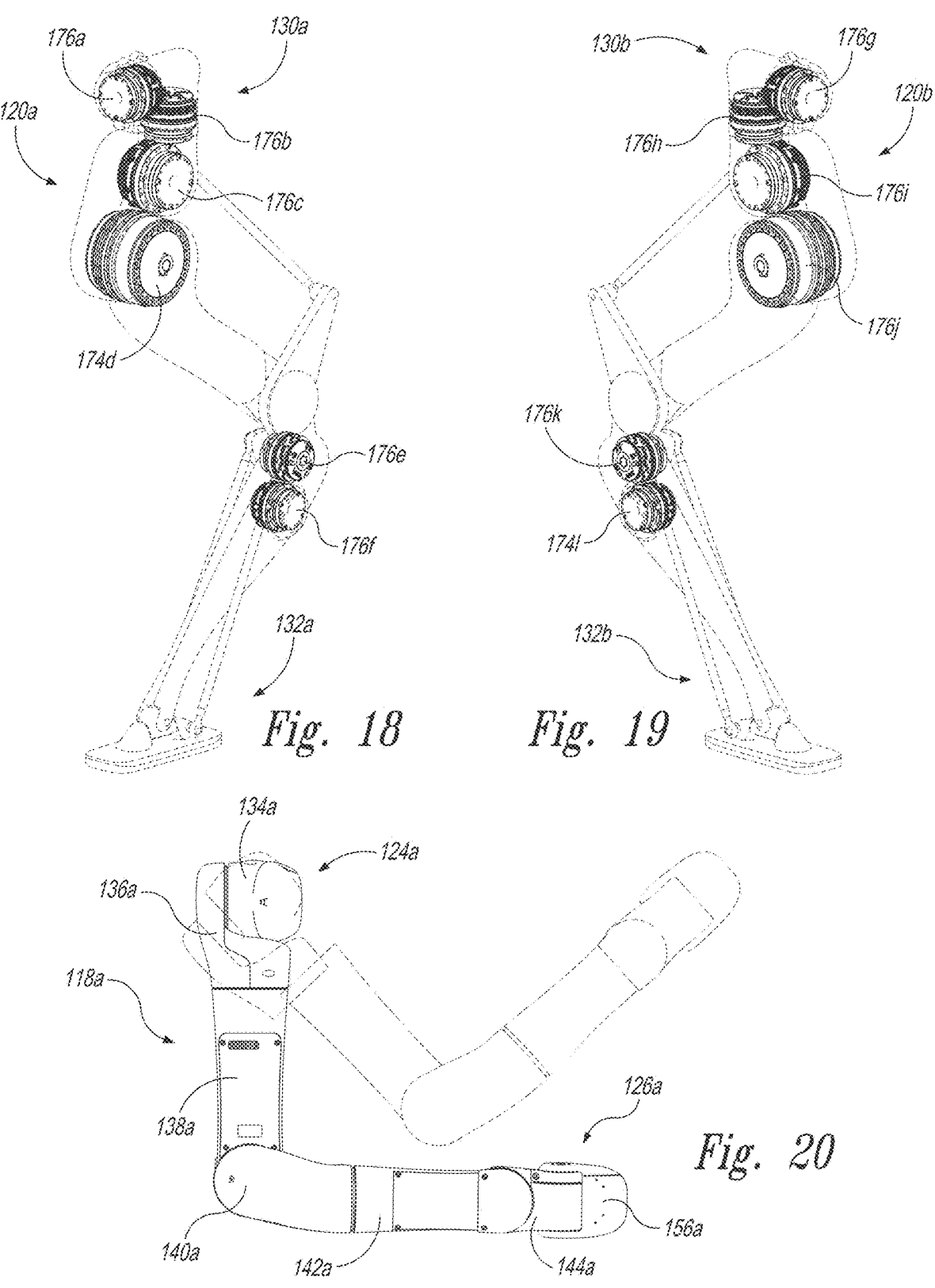

FIG. 20 is a side profile view of the first arm of the robot shown in FIG. 1 indicating isolated motion about an arm joint of the robot.

Figures 12, 13, 14, 15:
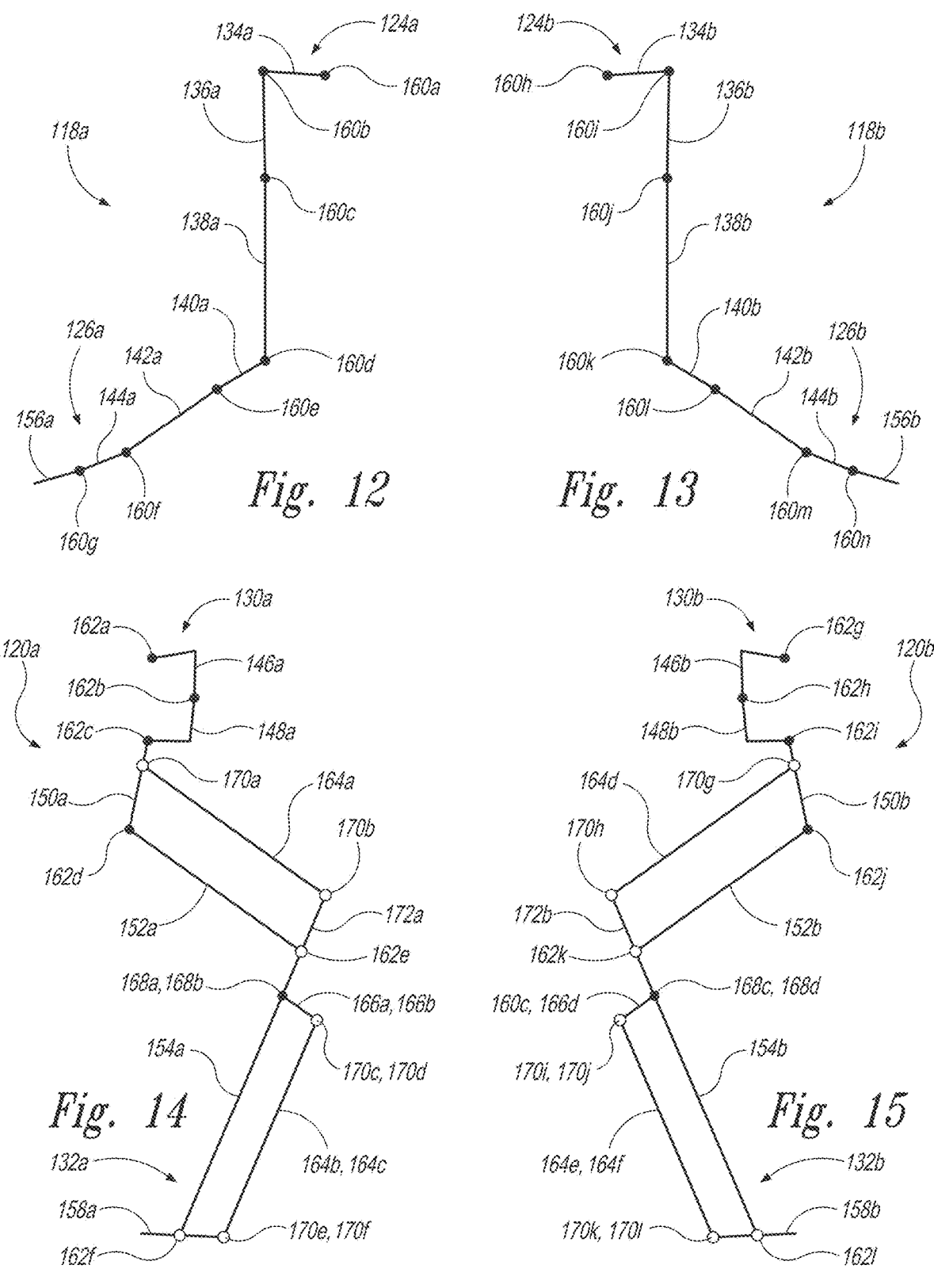
Figure 21:
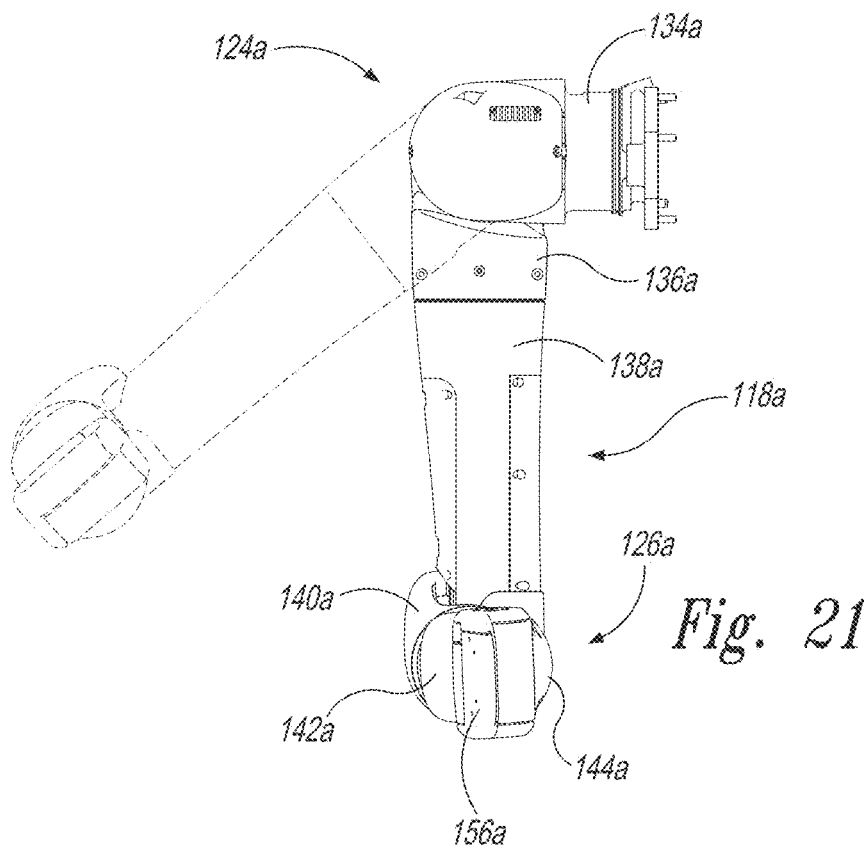

FIG. 21 is a front profile view of the first arm of the robot shown in FIG. 1 indicating isolated motion about an arm joint of the robot distal to the arm joint of FIG. 20 along the kinematic chain of FIG. 12.

Figure 22:
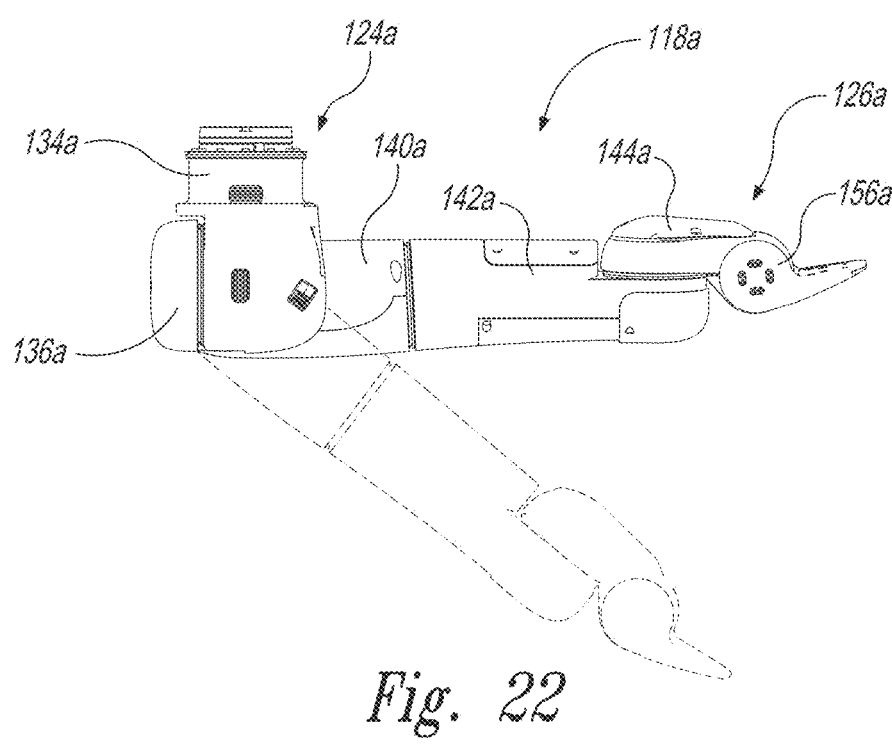

FIG. 22 is a top plan view of the first arm of the robot shown in FIG. 1 indicating isolated motion about an arm joint of the robot distal to the arm joint of FIG. 21 along the kinematic chain of FIG. 12.

Figures 23, 24, 25:
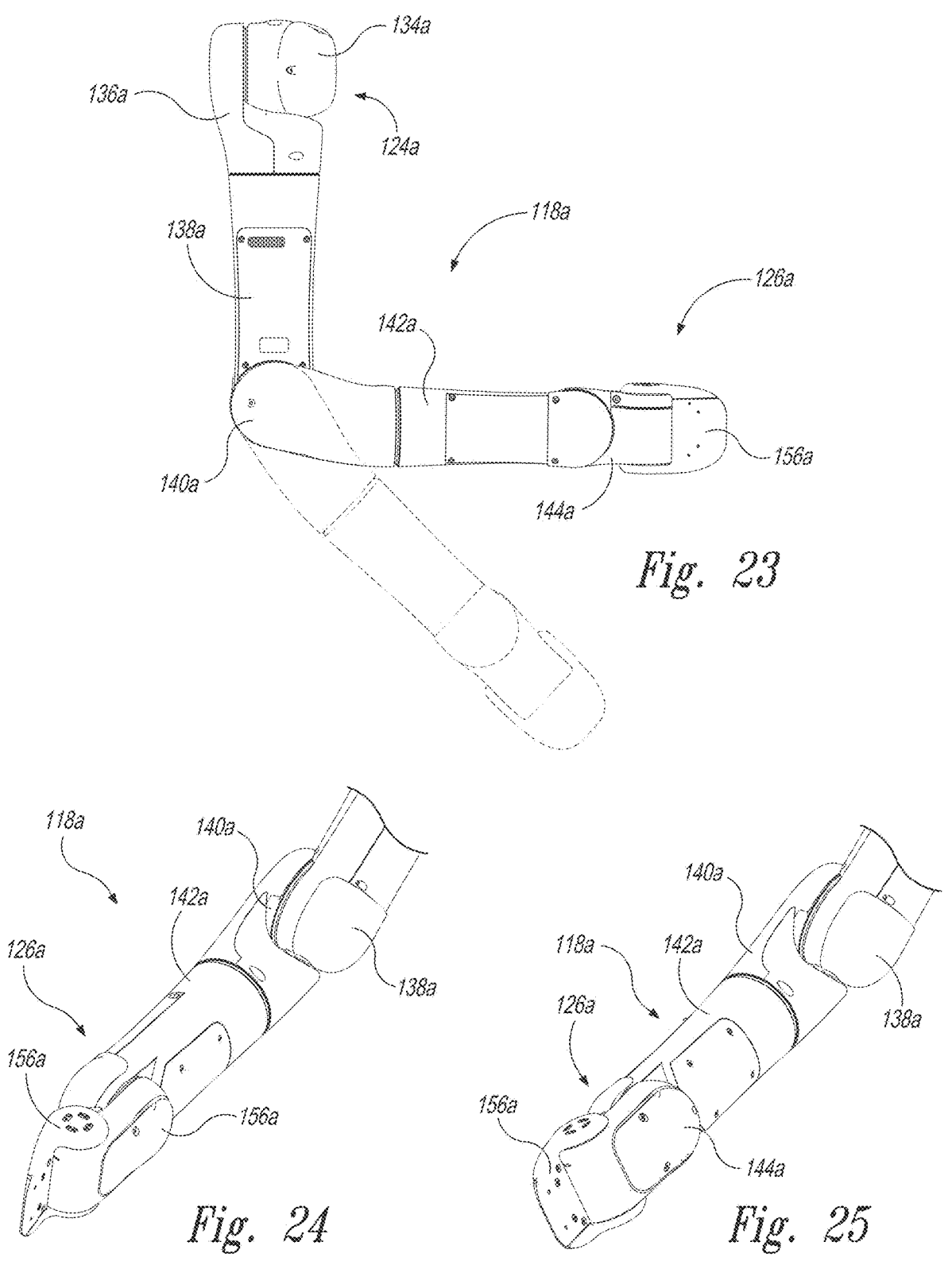

FIG. 23 is a side profile view of the first arm of the robot shown in FIG. 1 indicating isolated motion about an arm joint of the robot distal to the arm joint of FIG. 22 along the kinematic chain of FIG. 12.

FIGS. 24 and 25 are perspective views of a distal portion of the first arm of the robot shown in FIG. 1 indicating isolated motion about an arm joint of the robot distal to the arm joint of FIG. 23 along the kinematic chain of FIG. 12.

Figure 26:
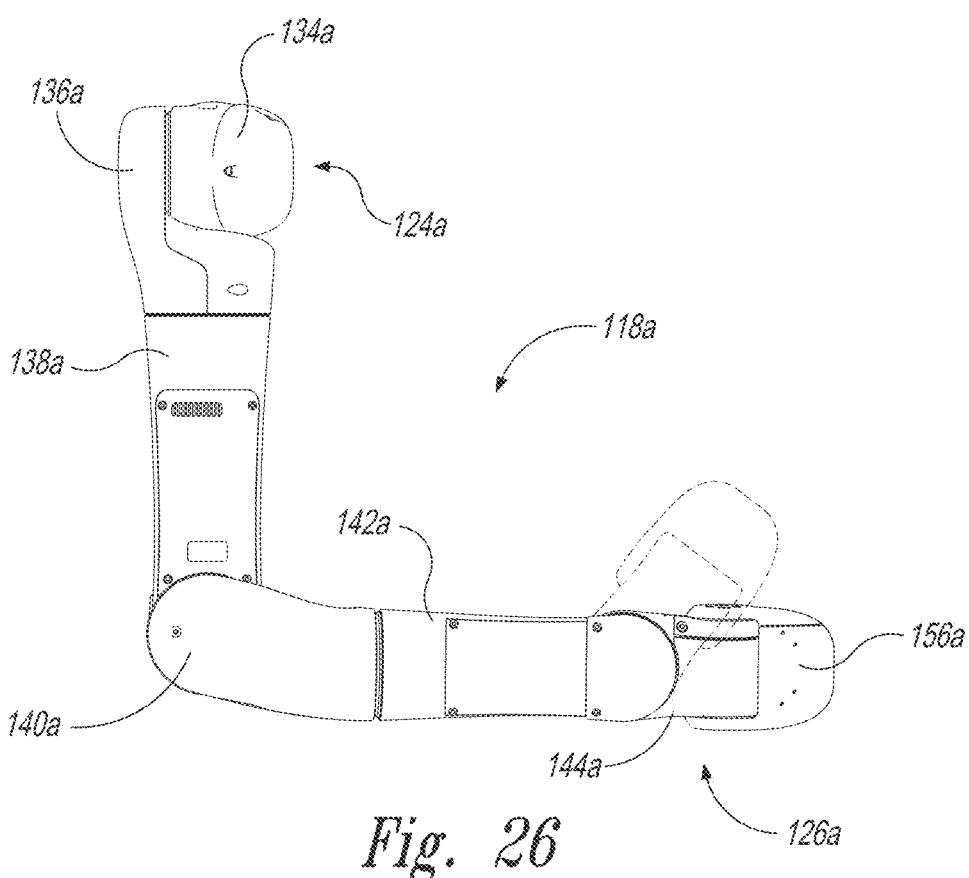

FIG. 26 is a side profile view of the first arm of the robot shown in FIG. 1 indicating isolated motion about an arm joint of the robot distal to the arm joint of FIGS. 24 and 25 along the kinematic chain of FIG. 12.

Figure 27:
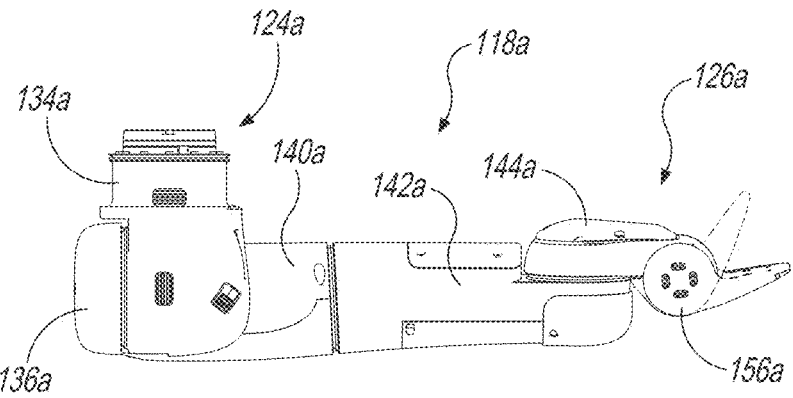

FIG. 27 is a top plan view of the first arm of the robot shown in FIG. 1 indicating isolated motion about an arm joint of the robot distal to the arm joint of FIG. 26 along the kinematic chain of FIG. 12.

Figures 28, 29:
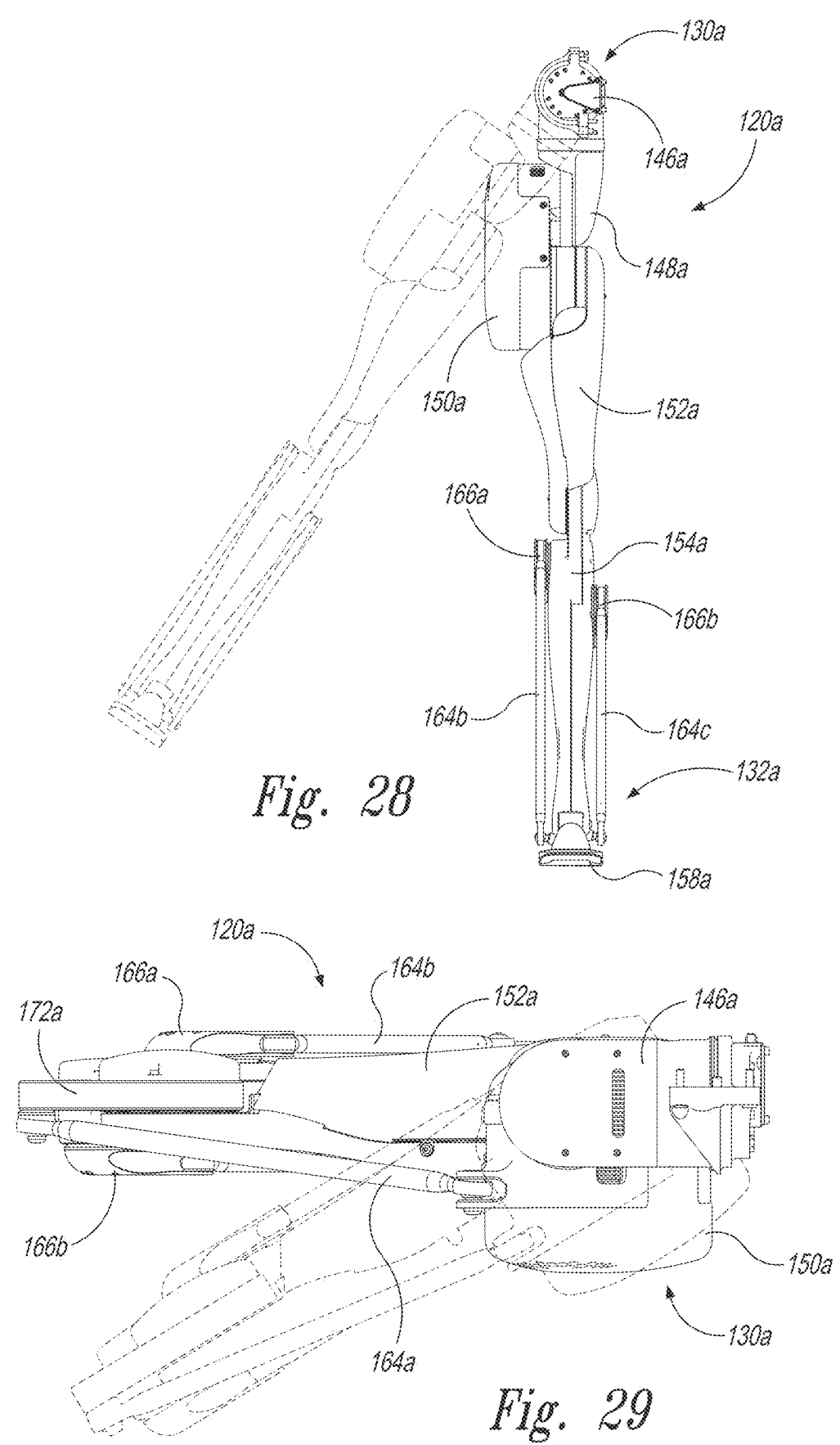

FIG. 28 is a front profile view of the first leg of the robot shown in FIG. 1 indicating isolated motion about a leg joint of the robot along the kinematic chain of FIG. 14.

FIG. 29 is a top plan view of the first leg of the robot shown in FIG. 1 indicating isolated motion about a leg joint of the robot distal to the leg joint of FIG. 28 along the kinematic chain of FIG. 14.

Figure 30:
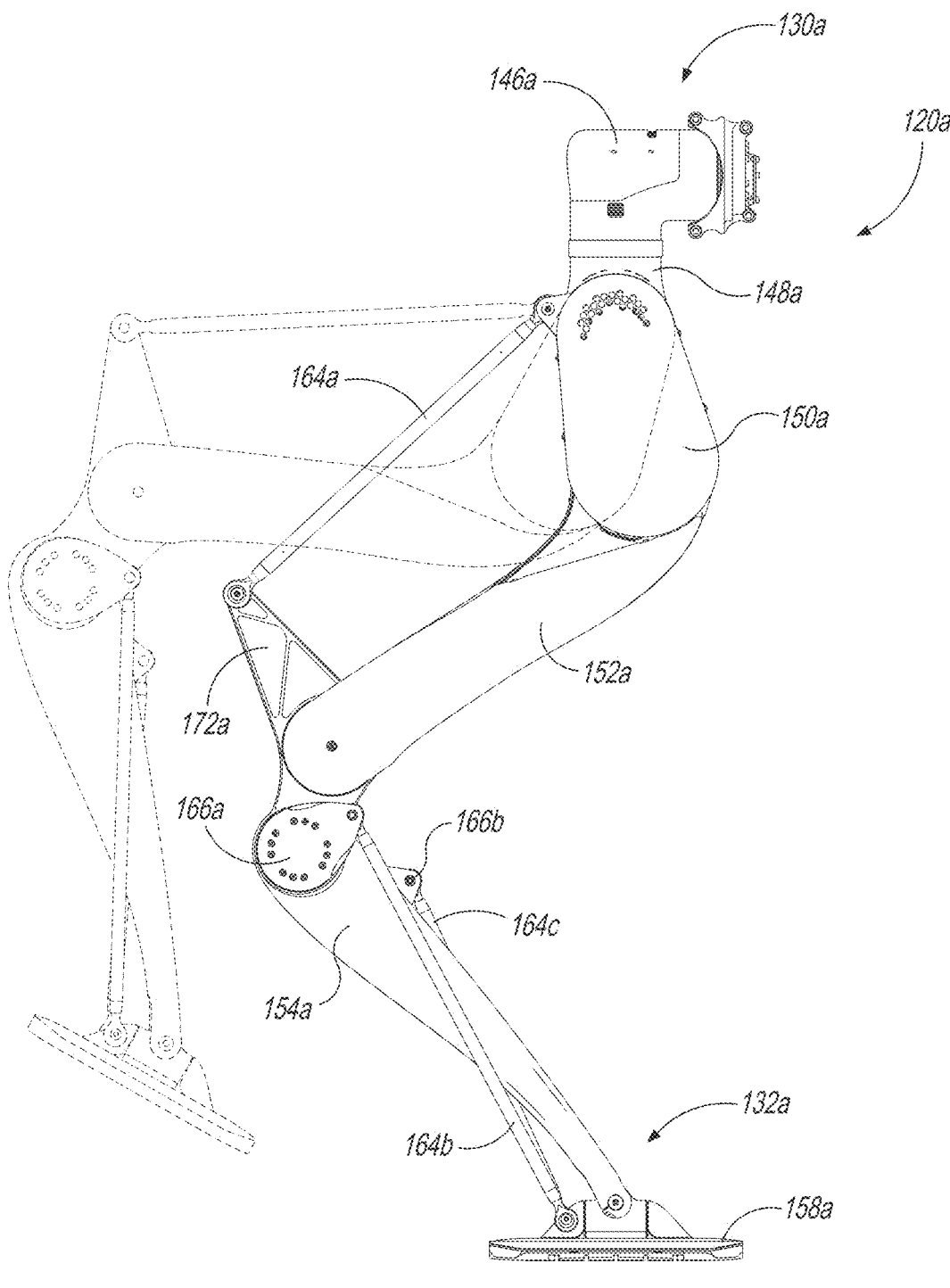

FIG. 30 is a side profile view of the first leg of the robot shown in FIG. 1 indicating isolated motion about a leg joint of the robot distal to the leg joint of FIG. 29 along the kinematic chain of FIG. 14.

Figure 31:
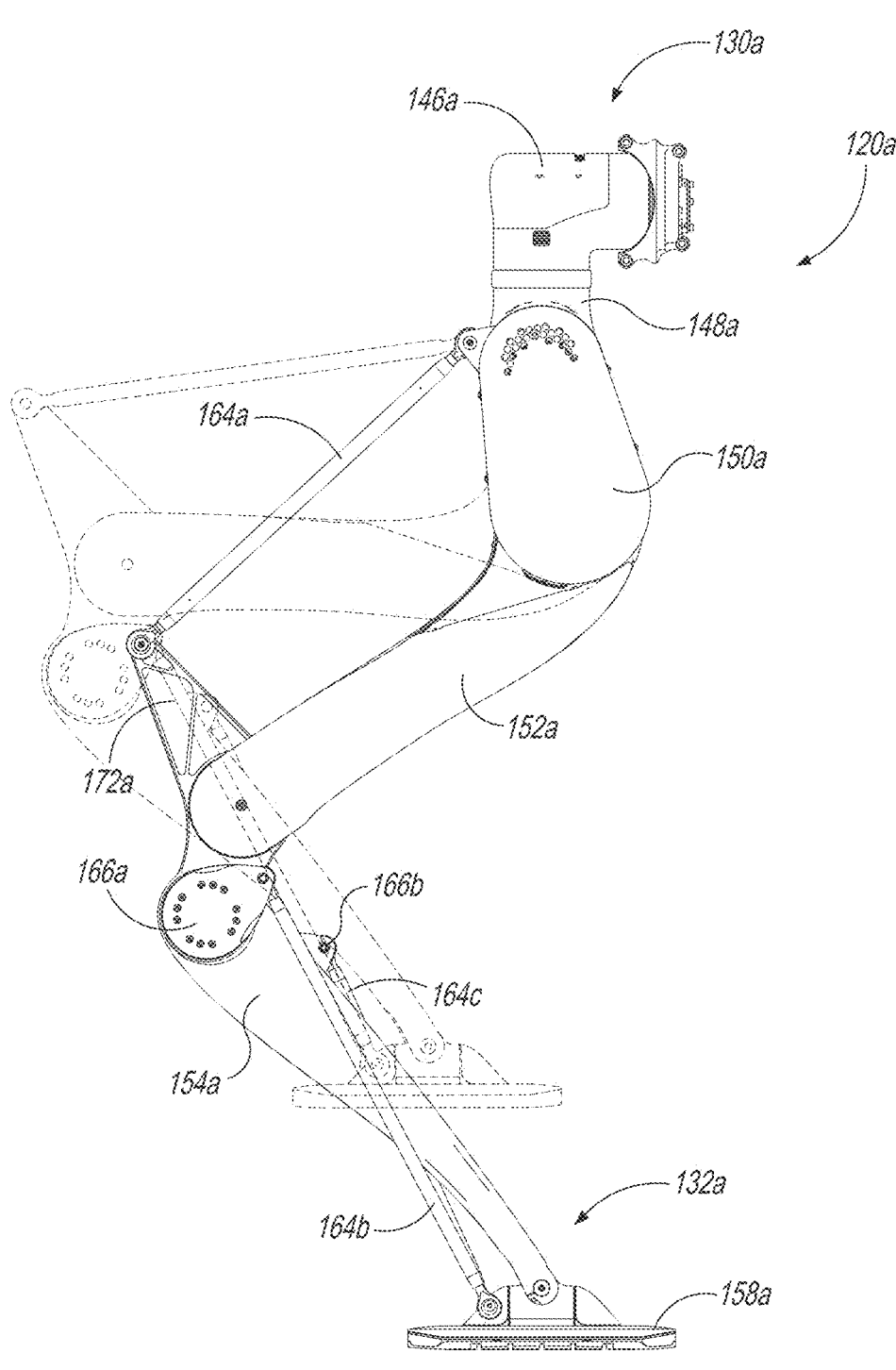

FIG. 31 is a side profile view of the first leg of the robot shown in FIG. 1 indicating isolated motion about two leg joints of the robot distal to the leg joint of FIG. 30 along the kinematic chain of FIG. 14.

Figures 32, 33:
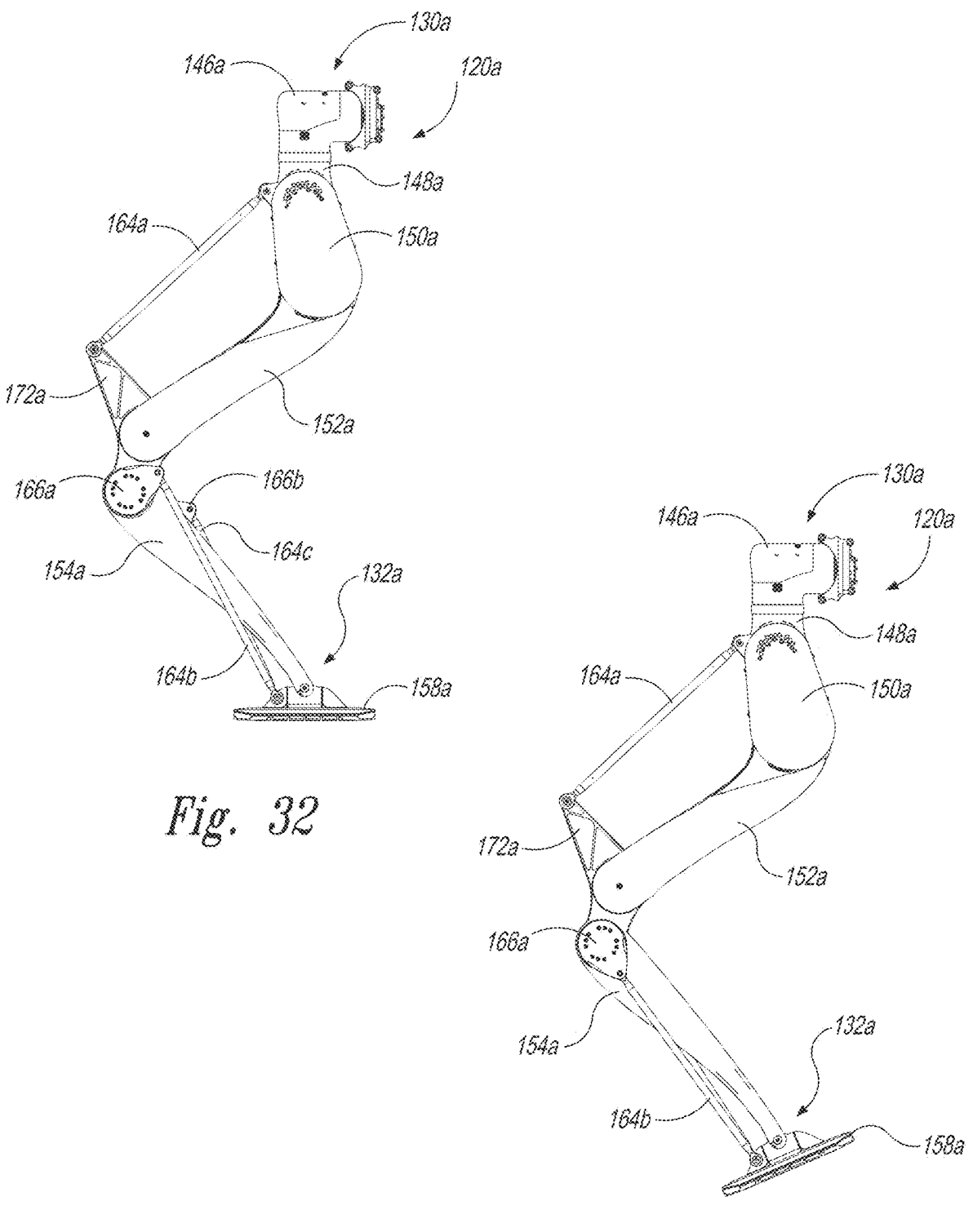

FIGS. 32 and 33 are side profile views of the first leg of the robot shown in FIG. 1 indicating isolated motion about a leg joint of the robot distal to the leg joints of FIG. 31 along the kinematic chain of FIG. 14.

FIG. 34 is a block diagram illustrating an electrical and computer system of the robot shown in FIG. 1.

Figure 35:
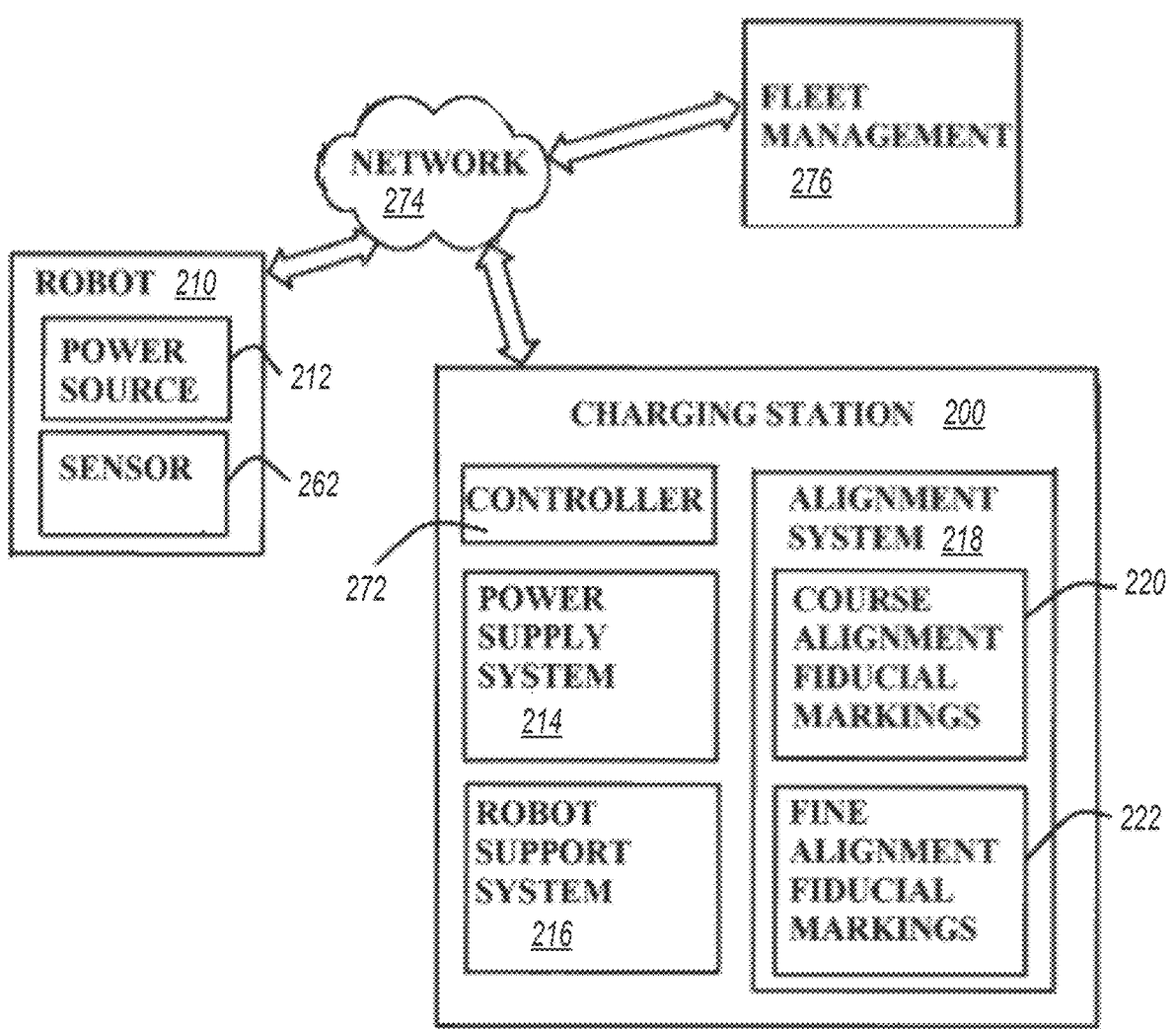

FIG. 35 is a block diagram corresponding to a mobile robot in relation to a dock in accordance with at least some embodiments of the present technology.

Figure 36:
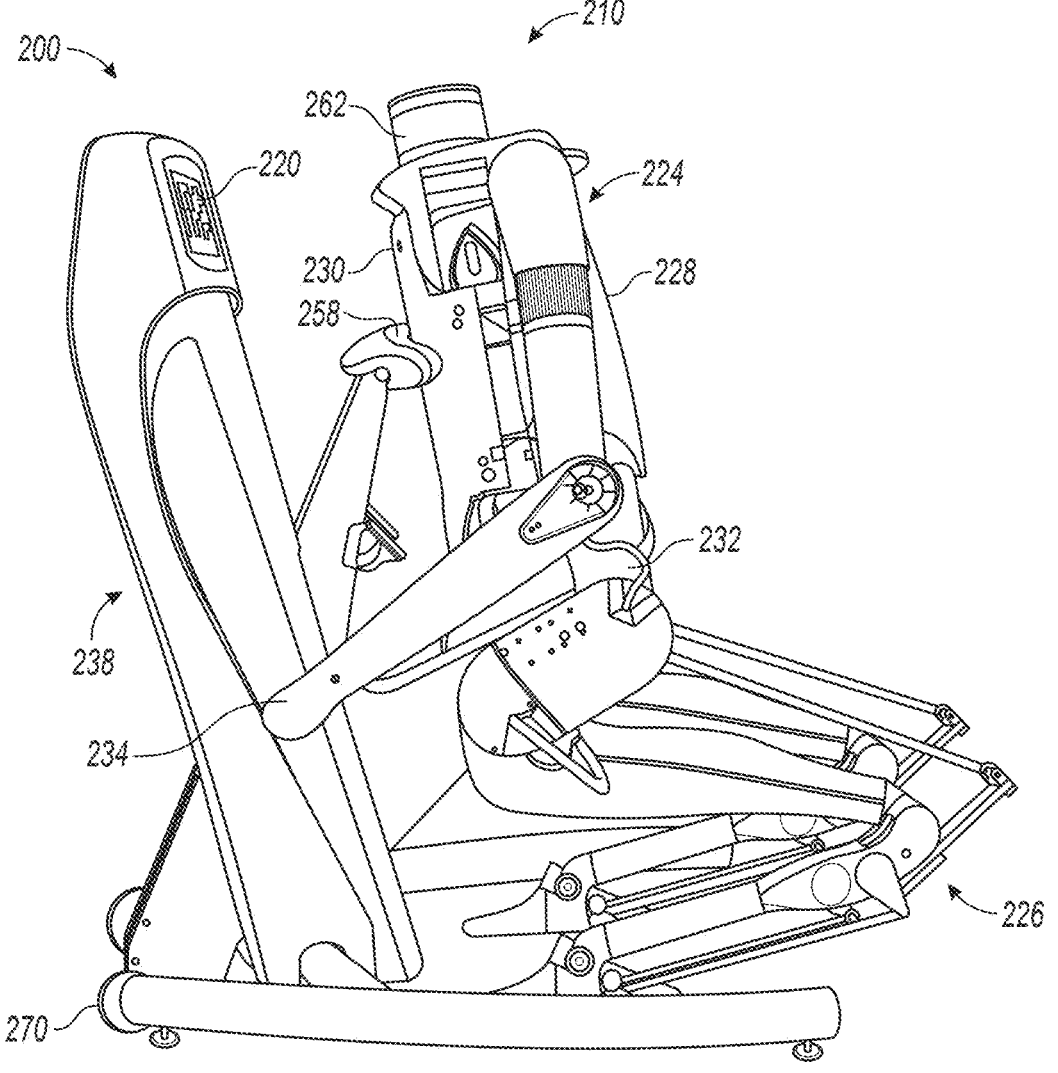

FIG. 36 is a side elevation view of the mobile robot docked with a dock in accordance with at least some embodiments of the present technology.

Figure 37:
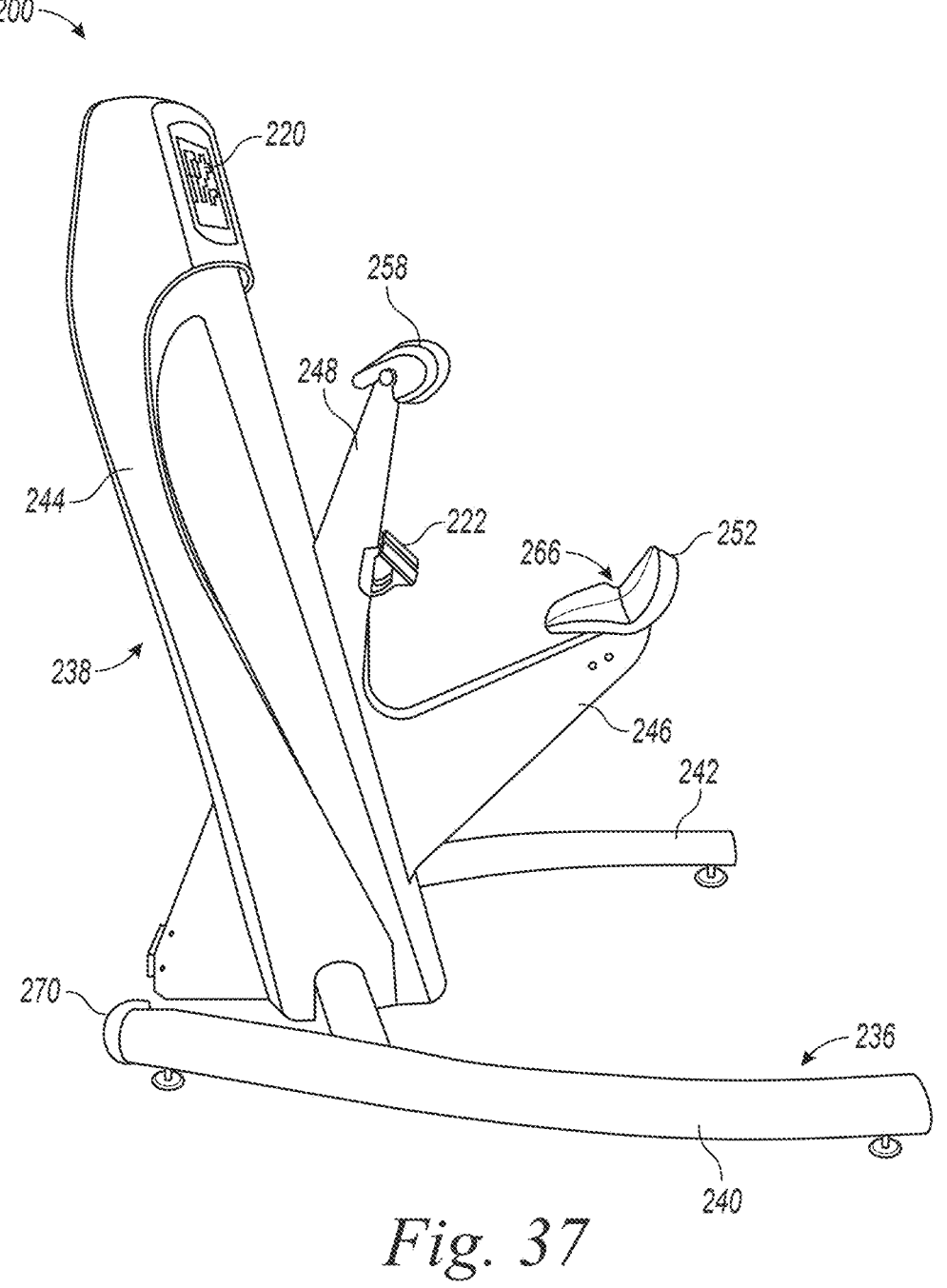

FIG. 37 is a side elevation view of the dock shown in FIG. 36.

Figure 38:
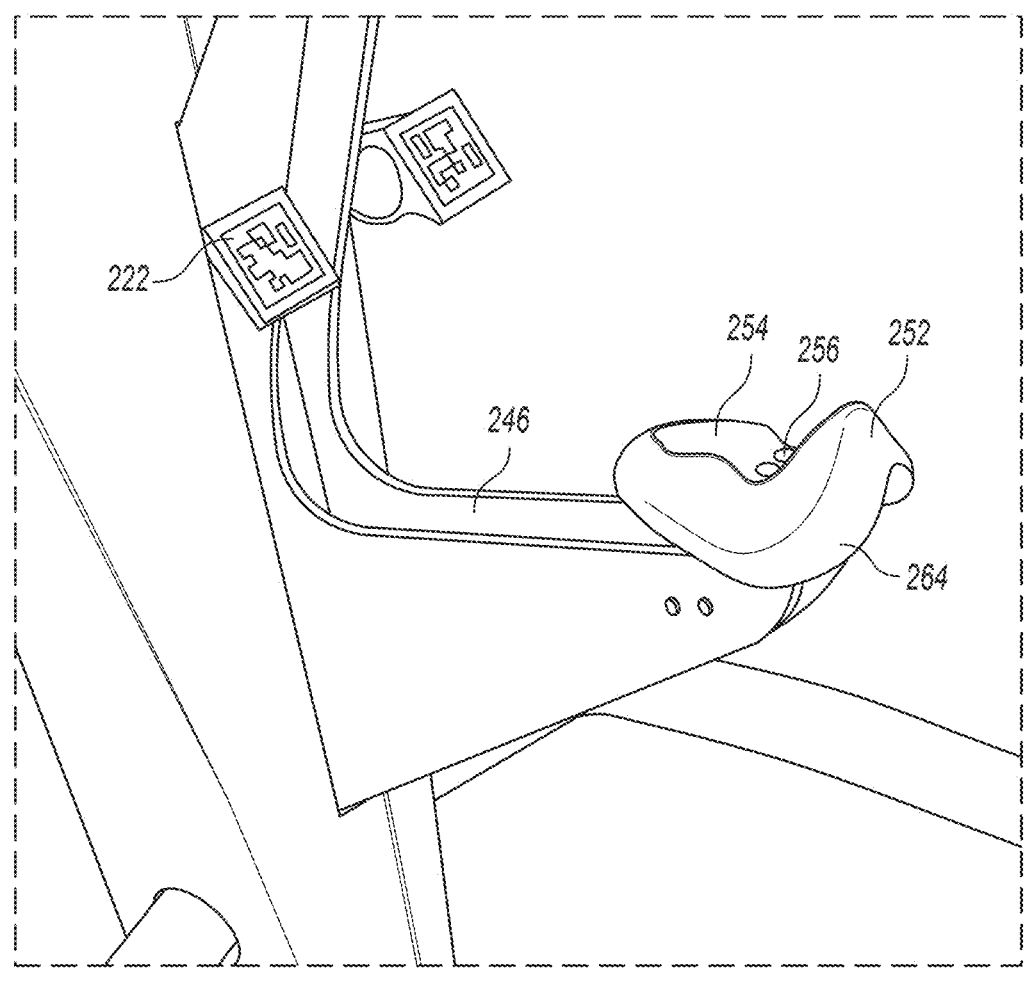

FIG. 38 is a fragmentary perspective view of a charging interface of the dock shown in FIG. 36.

Figure 39:
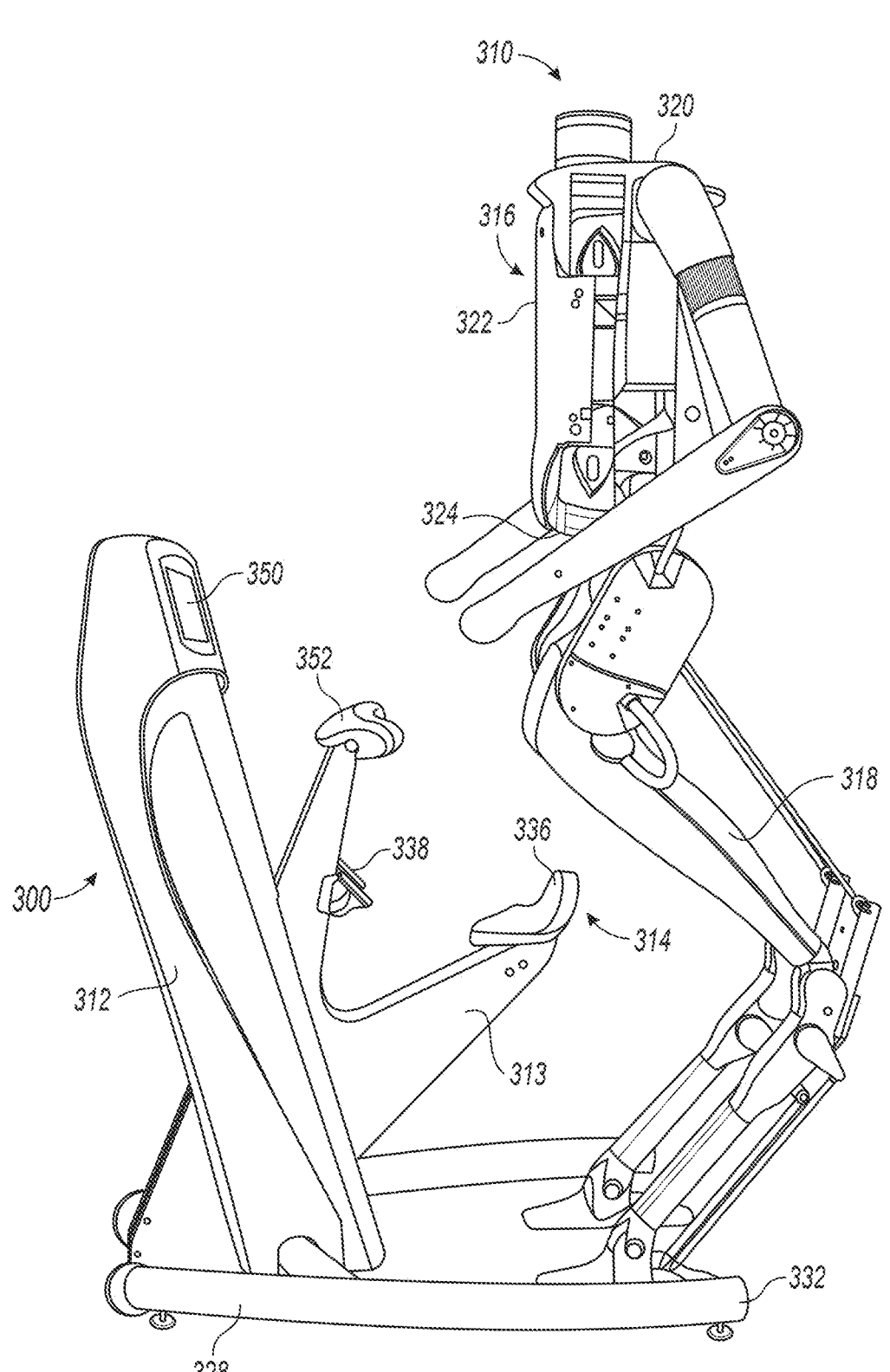

FIG. 39 is a side elevation view of a mobile robot approaching a dock in accordance with at least some embodiments of the present technology.

Figure 40:
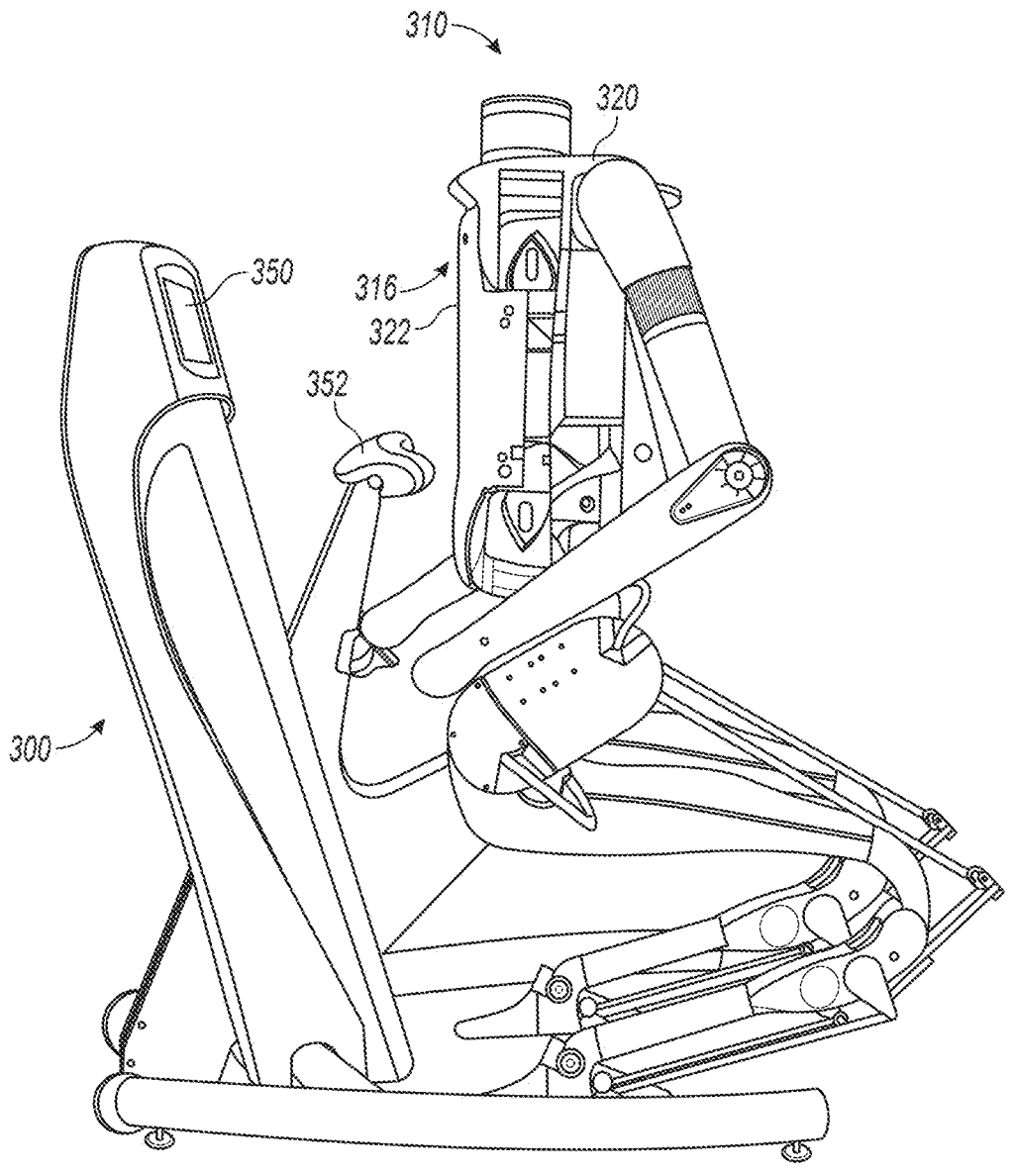

FIG. 40 is a side elevation view of the mobile robot and the dock shown in FIG. 39 as the mobile robot begins a docking process in accordance with at least some embodiments of the present technology.

Figure 41:
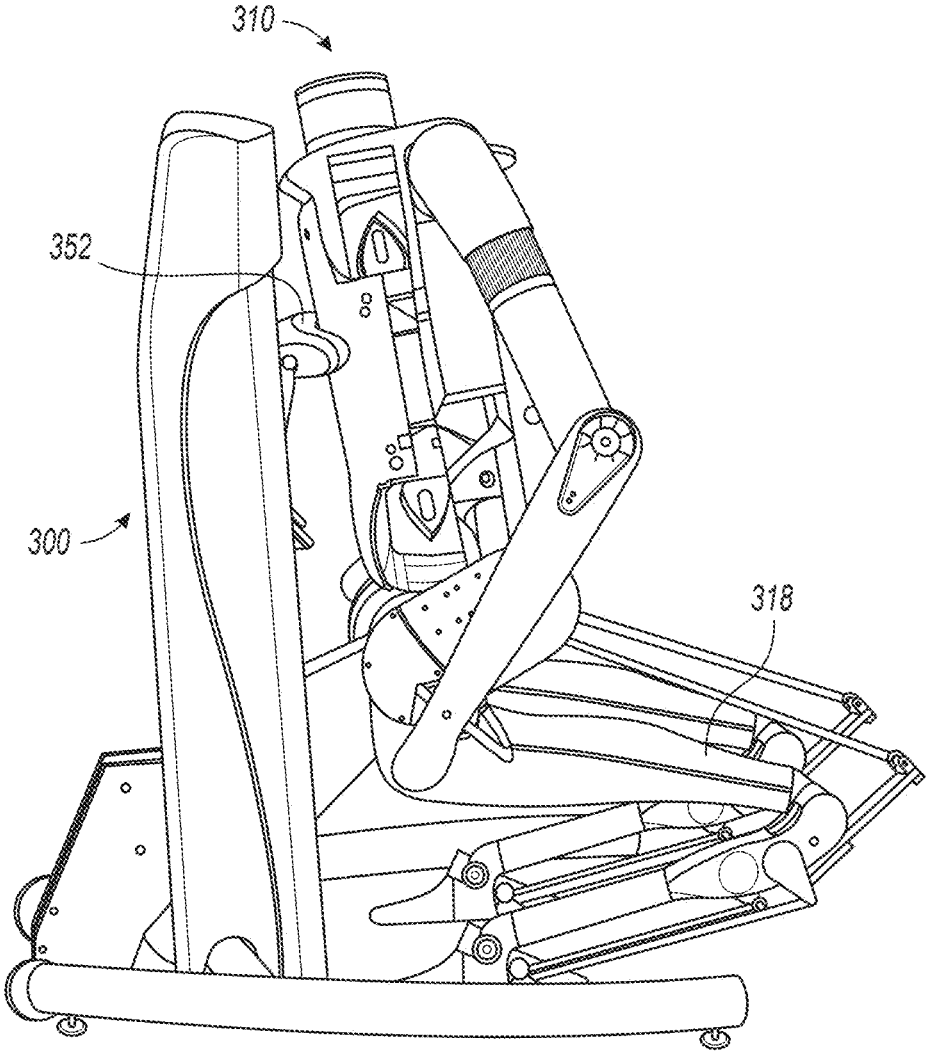

FIG. 41 is a side elevation view of the mobile robot and the dock shown in FIG. 39 with the mobile robot in a charging position at the dock in accordance with at least some embodiments of the present technology.

Figure 42:
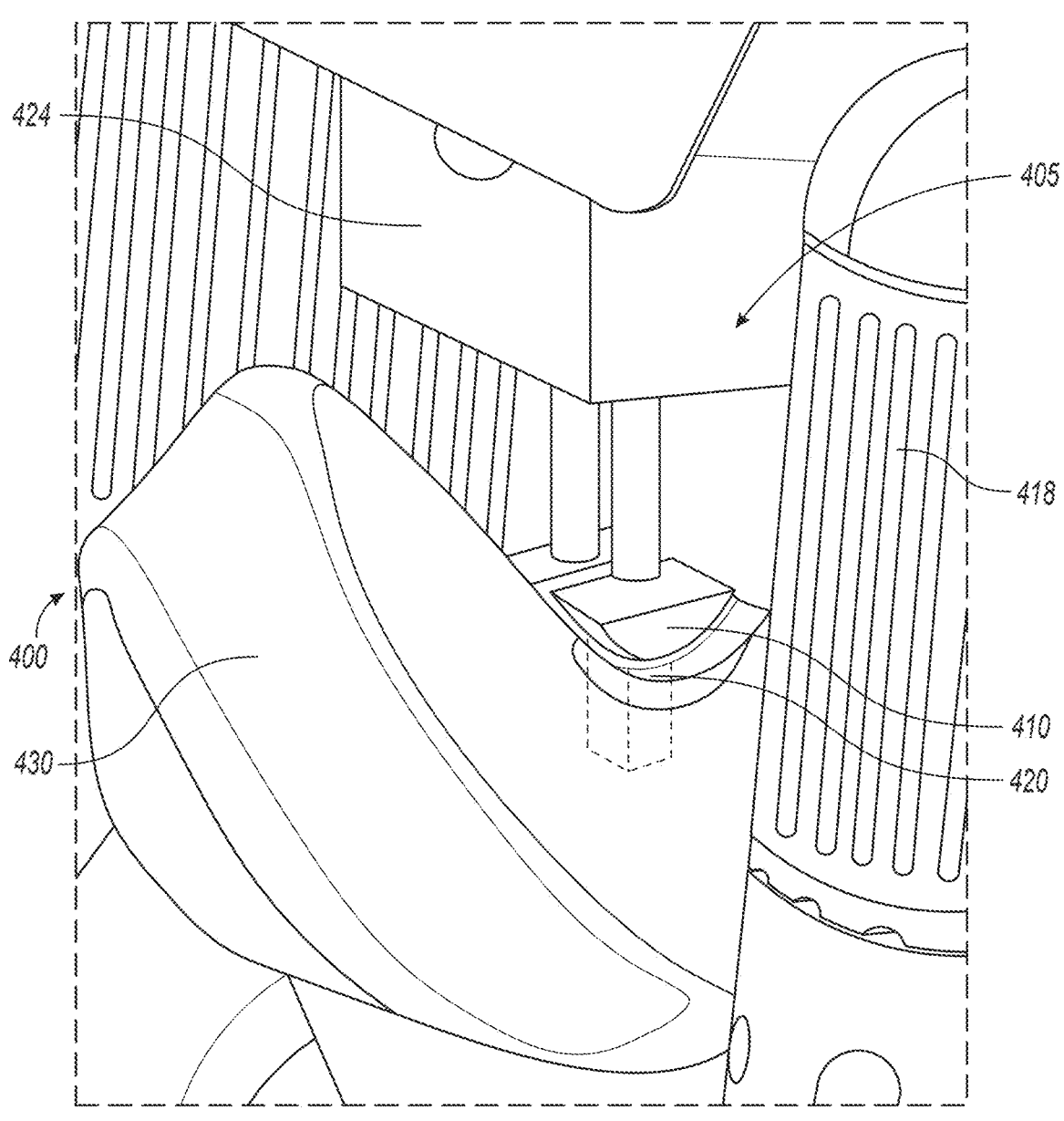

FIG. 42 is a fragmentary perspective view of an interface between the mobile robot and the dock shown in FIG. 39 with the mobile robot in an engaged position in accordance with at least some embodiments of the present technology.

Figure 43:
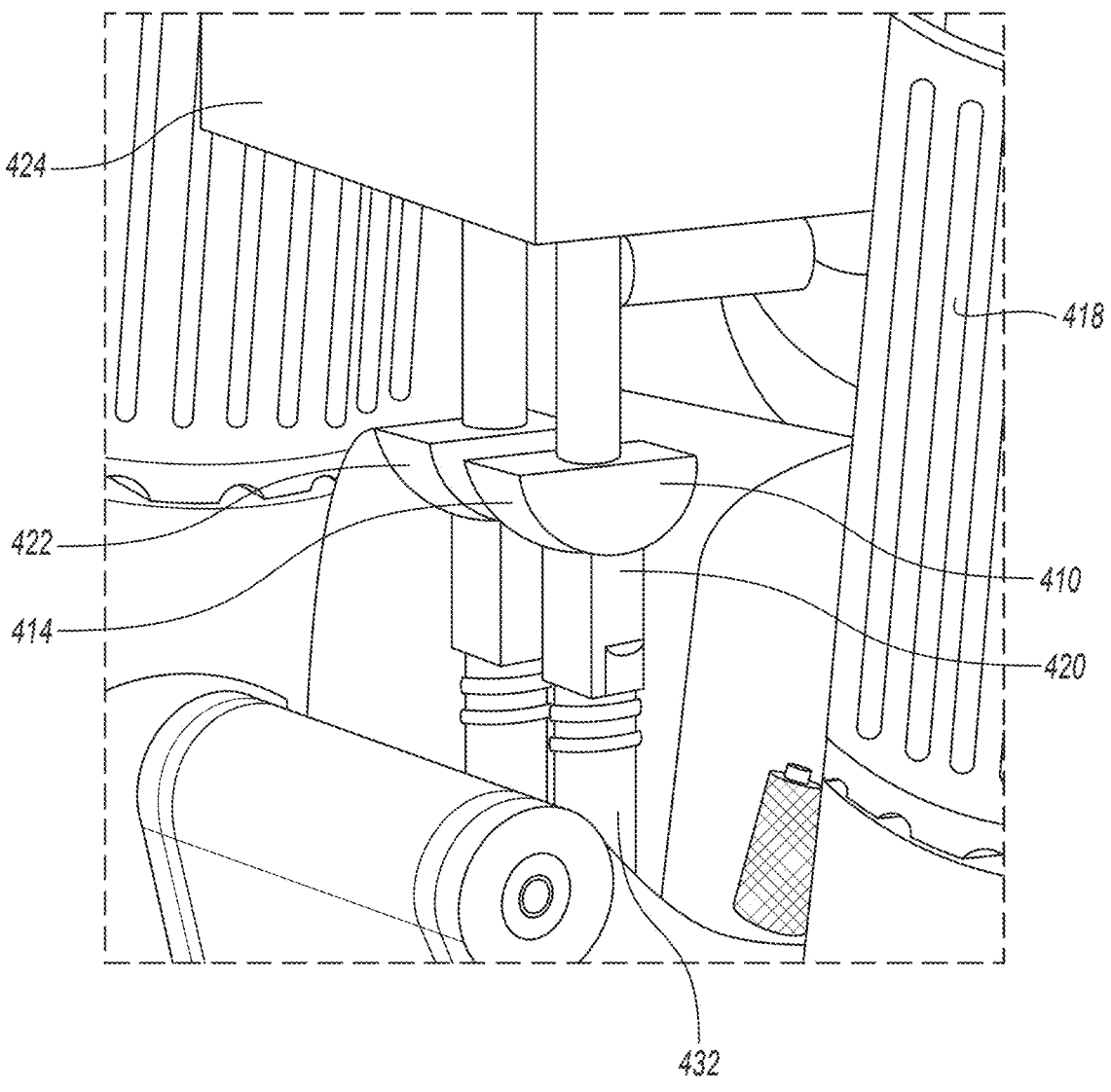

FIG. 43 is a fragmentary partially transparent perspective view of the interface shown in FIG. 42.

Figure 44:
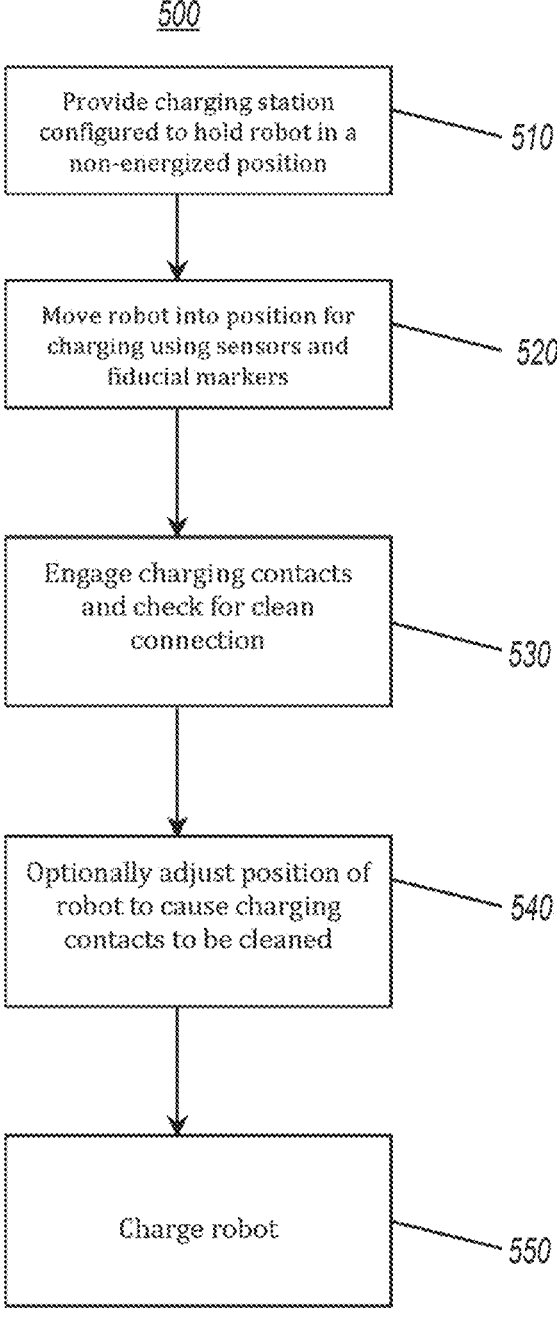

FIG. 44 is a process flow diagram corresponding to a method for charging a mobile robot in accordance with at least some embodiments of the present technology.

Figure 45:
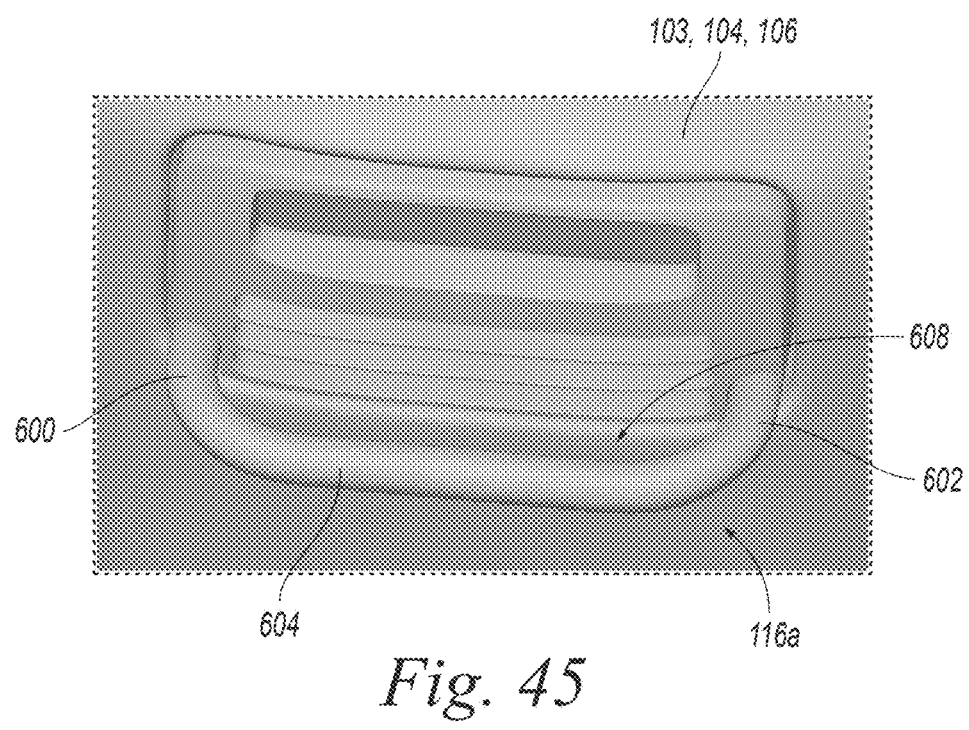
Figure 46:
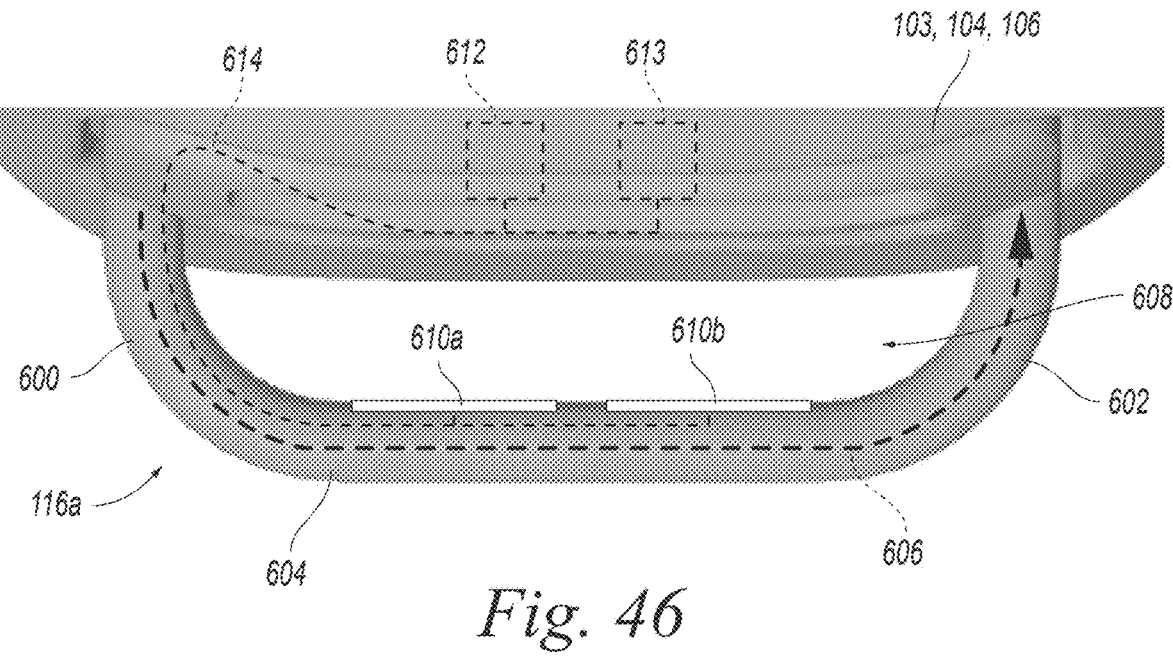

FIGS. 45 and 46 are, respectively, a perspective view and a top plan view of a superior projection and adjacent portions of the robot shown in FIG. 1.

Figures 47, 48:

FIG. 47 is a perspective view of a dock in accordance with at least some embodiments of the present technology.

Figure 49:
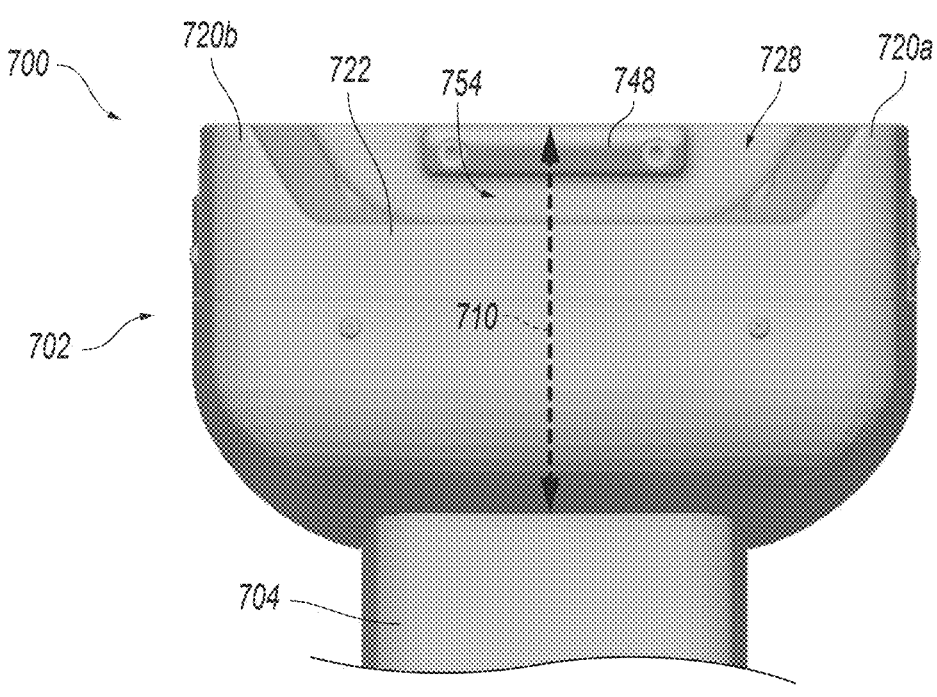
Figure 50:
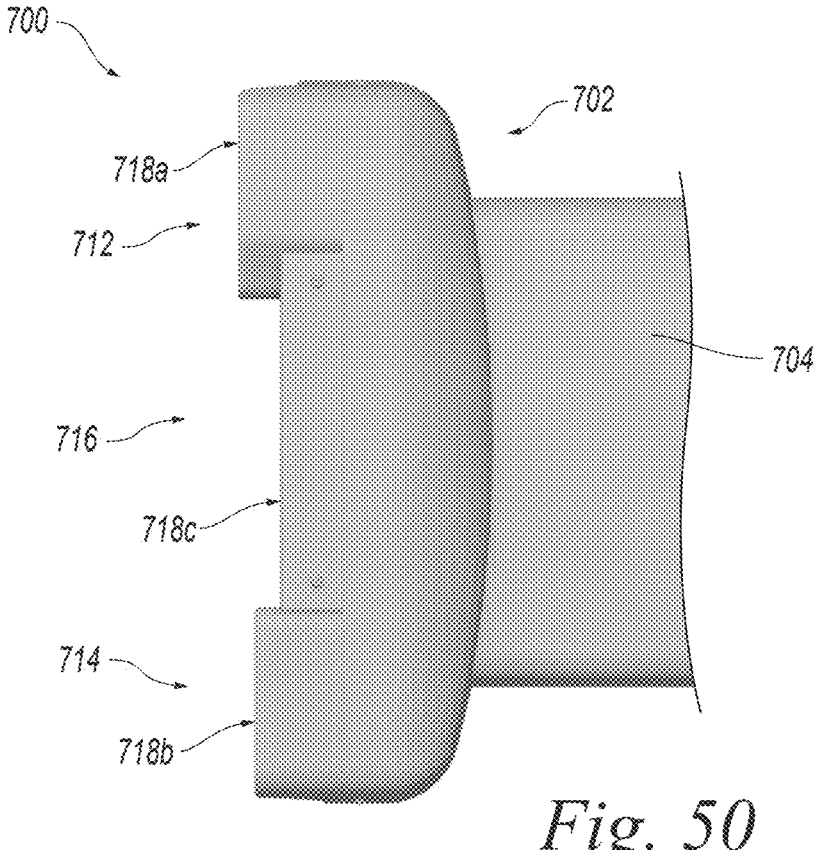

FIGS. 48-50 are, respectively, a front profile view, a top plan view, and a side profile view of the dock shown in FIG. 47.

Figures 51, 52:
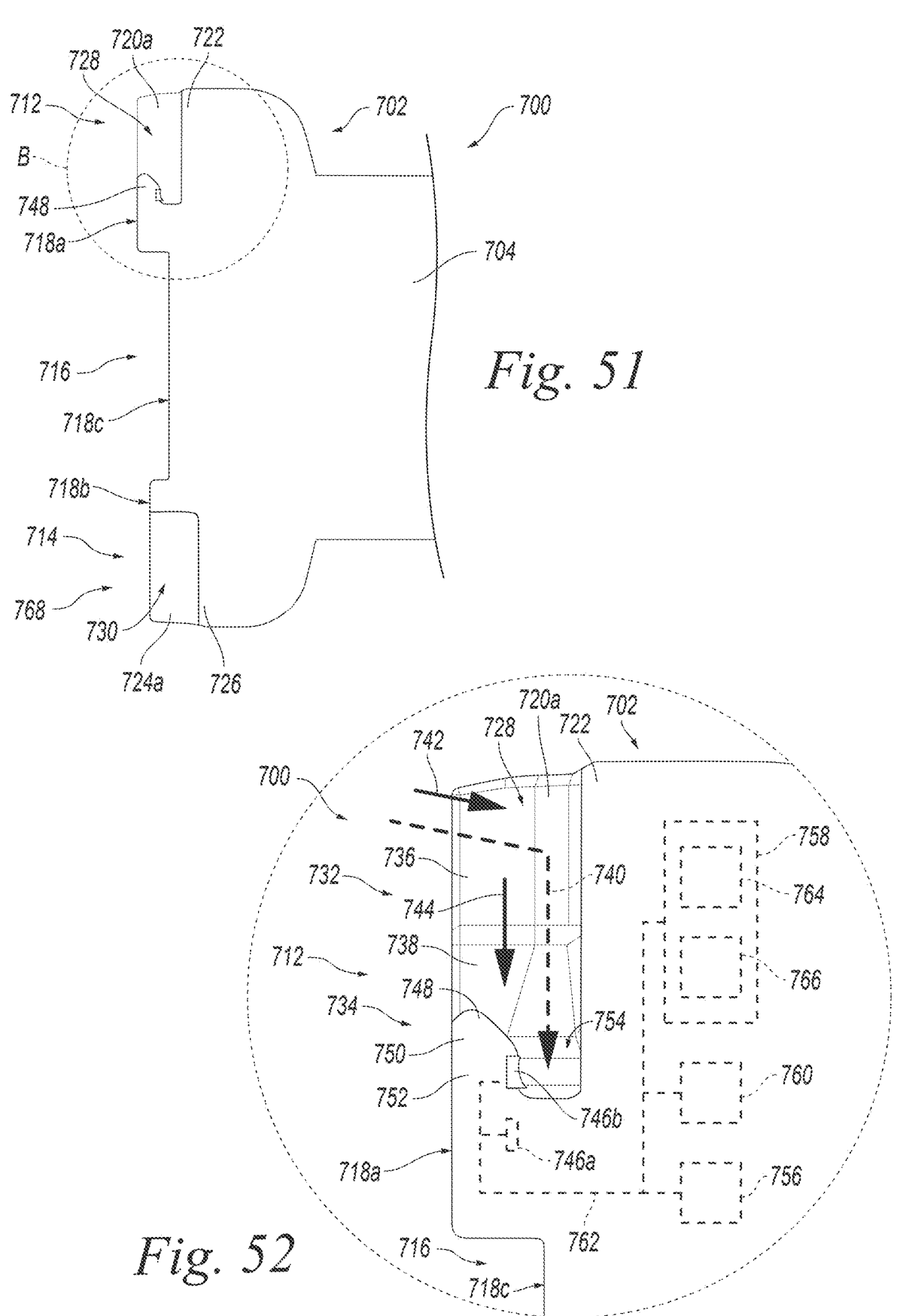

FIG. 51 is a simplified cross-sectional view of the dock shown in FIG. 47 taken along the line A-A in FIG. 48.

FIG. 52 is an enlargement of portion B of FIG. 51 showing additional detail of the dock shown in FIG. 47.

Figure 53:
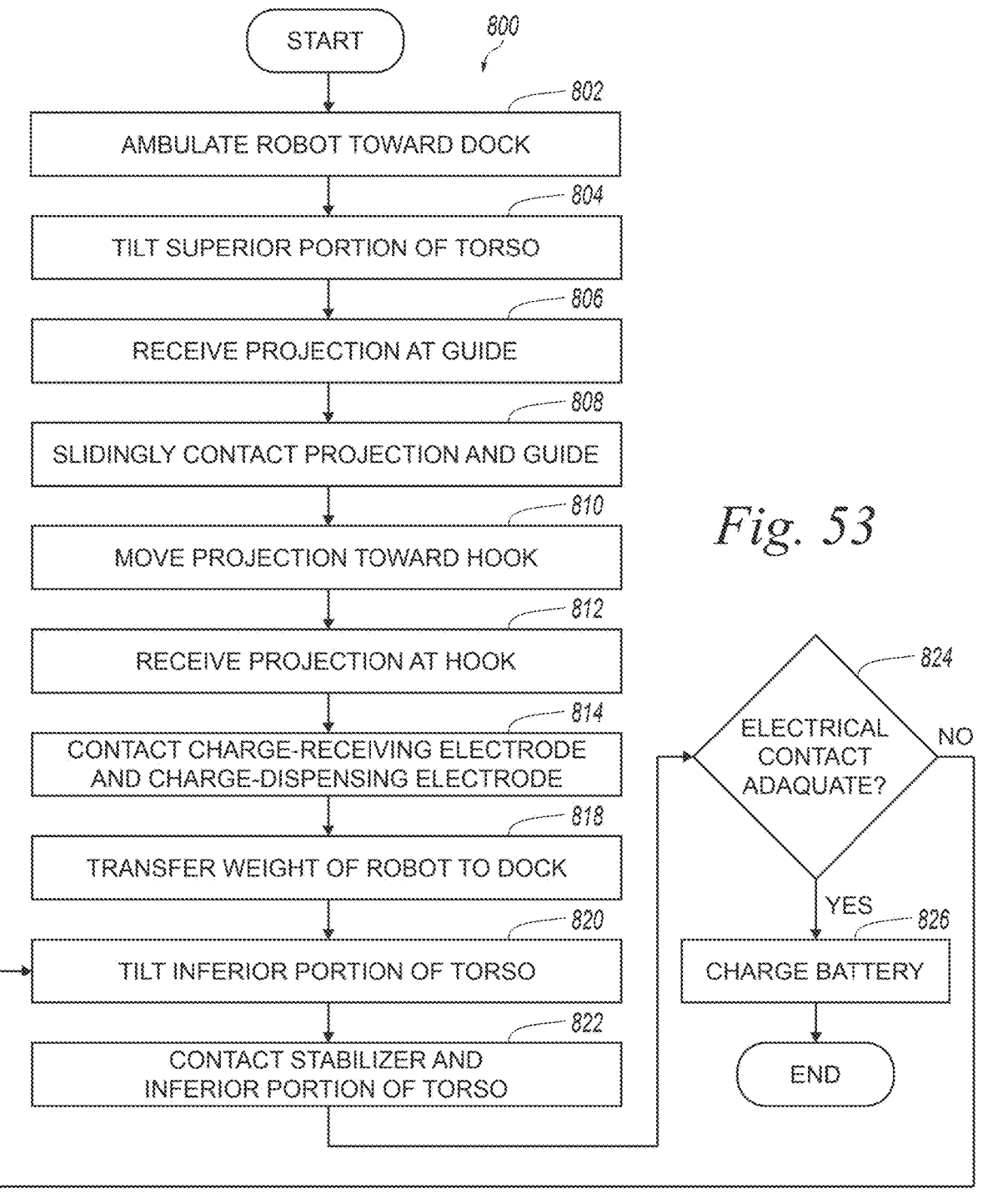

FIG. 53 is a block diagram corresponding to a method for docking and charging a robot in accordance with at least some embodiments of the present technology.

FIGS. 54-62 are side profile views and corresponding simplified cross-sectional views of a system including the dock shown in FIG. 47 and a robot at different respective times during the method corresponding to FIG. 53.

Figure 63:
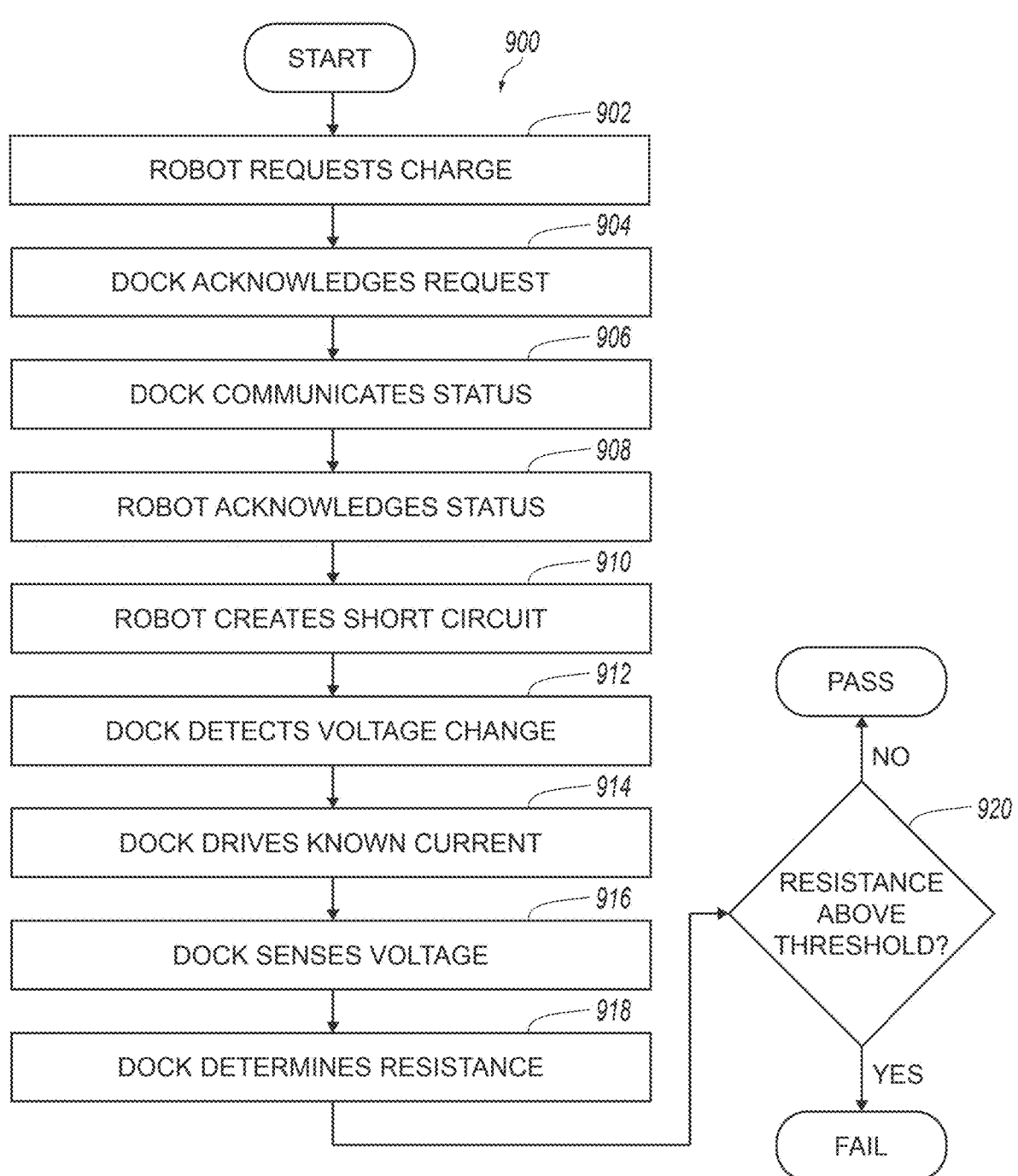
Figures 64, 65:
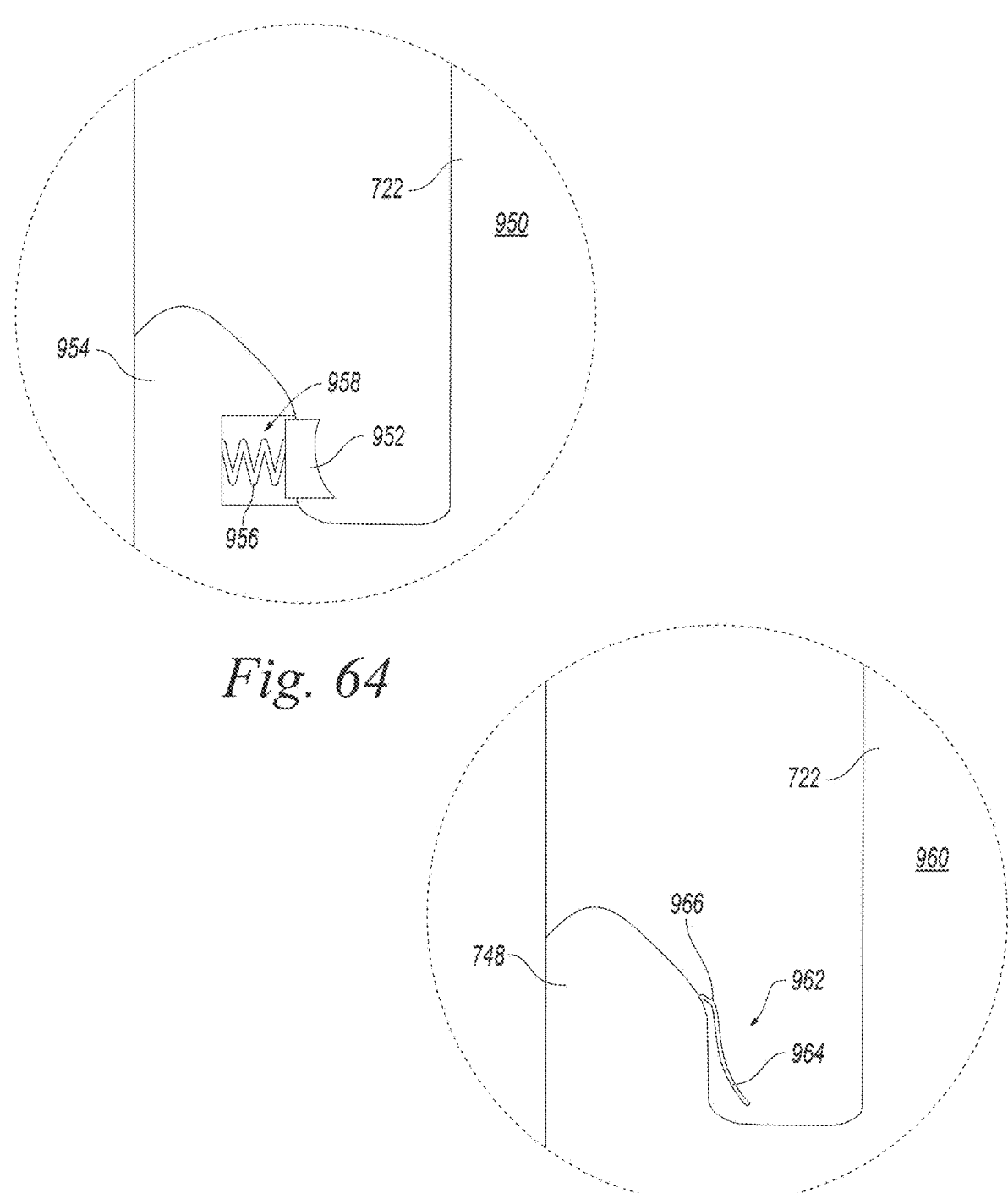

FIG. 63 is a block diagram corresponding to a method for testing electrical contact between a dock and a robot in accordance with at least some embodiments of the present technology.

FIGS. 64-67 are simplified cross-sectional views of other types of charge-dispensing electrodes of systems in accordance with at least some embodiments of the present technology.

DETAILED DESCRIPTION

Disclosed herein are robots, docks, and associated devices, systems, and methods. Systems in accordance with at least some embodiments of the present technology include innovative features related to engaging a mobile, legged robot and a dock. A system in accordance with at least some embodiments of the present technology includes a robot and a dock operably associated with one another. The system can be configured to transition between an undocked state and a docked state. In the undocked state, the robot can be spaced apart from the dock. In the docked state, the robot and the dock can be electrically connected to one another to allow the robot to be charged via the dock. Furthermore, the dock can support at least some of the robot's weight. For example, the robot can partially or completely hang from the dock and/or sit at the dock. While docked, the robot can recharge via the dock, receive maintenance, or simply be stowed.

Figures 66, 67:
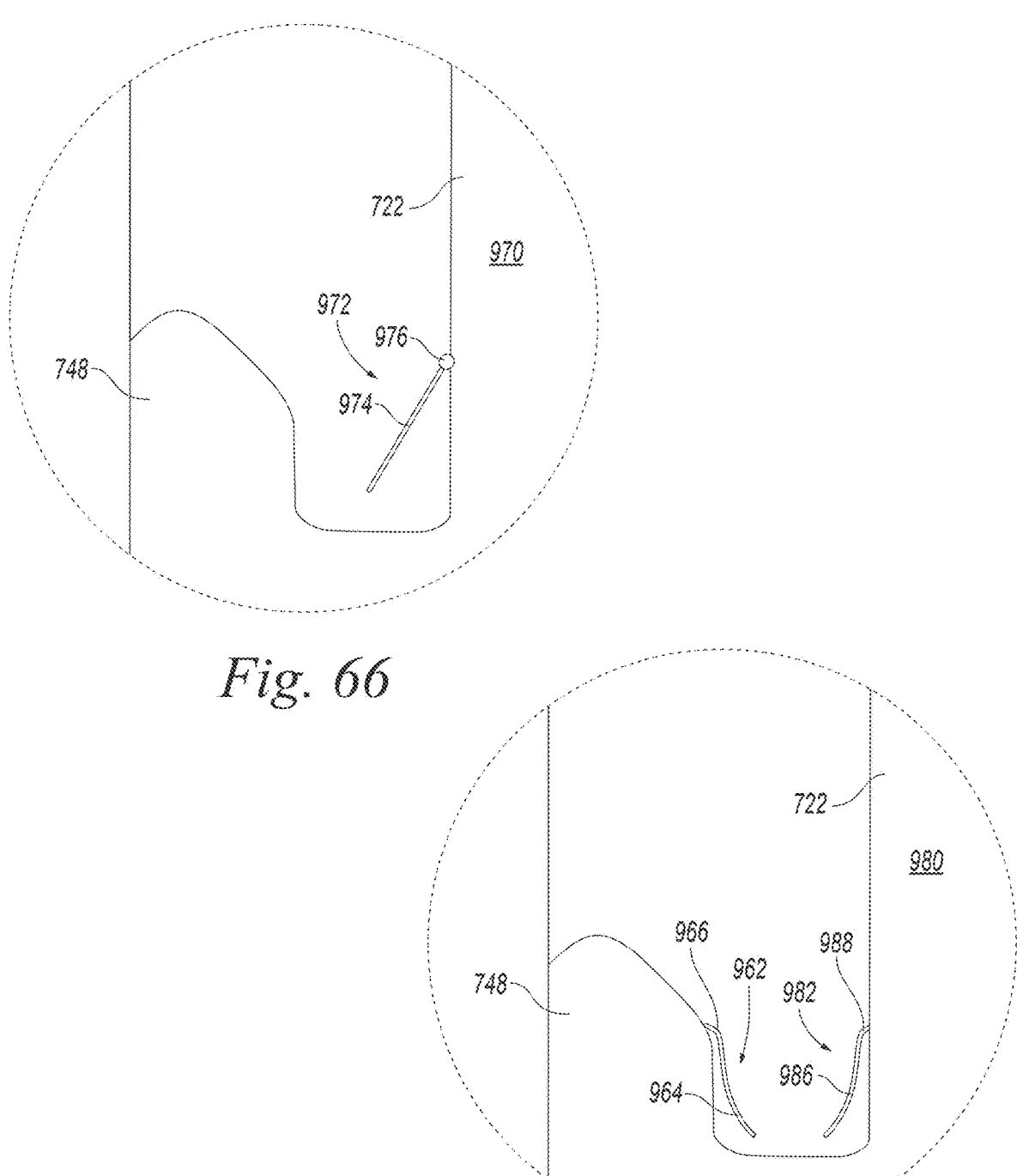

Features of robots, docks, and associated devices, systems, and methods in accordance with various embodiments of the present technology are described below with reference to FIGS. 1-67. Although devices, systems, and methods may be described herein primarily or entirely in the context of warehouse robots, other contexts are within the scope of the present technology. For example, suitable features of described devices, systems, and methods can be implemented in the context of robots that operate in non-warehouse environments, such as in the context of terrain-mapping robots, in the context of social robots, etc. Furthermore, it should be understood, in general, that other devices, systems, and methods in addition to those disclosed herein are within the scope of the present technology. For example, devices, systems, and methods in accordance with embodiments of the present technology can have different and/or additional configurations, components, procedures, etc. than those disclosed herein. Moreover, devices, systems, and methods in accordance with embodiments of the present technology can be without one or more of the configurations, components, procedures, etc. disclosed herein without deviating from the present technology.

Examples of Robot Systems

FIGS. 1 and 2 are different perspective views of a robot 100 in accordance with at least some embodiments of the present technology. FIG. 3 is a front profile view of the robot 100. As shown in FIGS. 1-3, the robot 100 can have a humanoid form. The robot 100 can include structures resembling human anatomy with respect to the features, positions, and/or other characteristics of such structures. In at least some cases, the robot 100 defines a midsagittal plane 102 about which the robot 100 is bilaterally symmetrical. In these and other cases, the robot 100 can be configured for bipedal locomotion similar to that of a human. Counterparts of the robot 100 can have other suitable forms and features. For example, a counterpart of the robot 100 can have a non-humanoid form, such as a canine form, an insectoid form, an arachnoid form, or a form with no animal analog. Furthermore a counterpart of the robot 100 can be asymmetrical or have symmetry other than bilateral. Still further, a counterpart of the robot 100 can be configured for non-bipedal locomotion. For example, a counterpart of the robot 100 can be configured for another type of legged locomotion (e.g., quadrupedal locomotion, octopedal locomotion, etc.) and/or non-legged locomotion (e.g., wheeled locomotion, continuous-track locomotion, etc.).

With reference again to FIGS. 1-3, the robot 100 can include a centrally disposed body 103 through which other structures of the robot 100 are interconnected. As all or a portion of the body 103, the robot 100 can include a torso 104 having a superior portion 106, an inferior portion 108, and an intermediate portion 109 therebetween. The robot 100 can define a transverse plane 110 from which the superior and inferior portions 106, 108 of the torso 104 are respectively superiorly and inferiorly spaced apart. The robot 100 can further include a head 111 superiorly spaced apart from the torso 104. The robot 100 can also include a neck 112 through which the head 111 is connected to the torso 104 via the superior portion 106 of the torso 104. The head 111 can have an anteriorly directed display 113 including light-emitting diodes selectively controllable to create a composite, pixelated image evocative of human facial expression. The robot 100 can further include an anteriorly directed audio transmissive window 114 at the intermediate portion 109 of the torso 104, a posteriorly directed exhaust vent 115 at the inferior portion 108 of the torso 104, and superior and inferior projections 116a, 116b extending, respectively, posteriorly from the superior portion 106 of the torso 104 and posteriorly from the inferior portion 108 of the torso 104. The robot 100 can still further include sensor arrays 117 (individually identified as sensor arrays 117a-117e) carried by the torso 104 and the head 111. The sensor arrays 117a, 117b can be at the superior portion 106 of the torso 104 and anteriorly and posteriorly directed, respectively. The sensor arrays 117c, 117d can be at opposite respective sides of the head 111 and can be directed in opposite respective lateral directions. The sensor array 117e can be at the inferior portion 108 of the torso 104 and directed anteriorly and inferiorly toward a ground level in front of the robot 100.

The robot 100 can further include articulated appendages carried by the torso 104. Among these articulated appendages, the robot 100 can include arms 118a, 118b and legs 120a, 120b. In at least some cases, the robot 100 is configured to manipulate objects via the arms 118a, 118b, such as bimanually. In these and other cases, the robot 100 can be configured to ambulate via the legs 120a, 120b, such as bipedally. FIGS. 4-15 show selected features of the arms 118a, 118b and legs 120a, 120b in greater detail. In particular, FIGS. 4-7 are perspective views of the arms 118a, 118b and legs 120a, 120b, respectively. FIGS. 8-11 are silhouette views of the arms 118a, 118b and legs 120a, 120b, respectively. Finally, FIGS. 12-15 are partially schematic diagrams showing kinematic chains corresponding to the arms 118a, 118b and legs 120a, 120b, respectively. In FIGS. 12-15, lines represent links, filled circles represent active joints, and open circles represent inactive joints.

With reference to FIGS. 1-15 together, the arms 118a, 118b can define respective arm lengths 122a, 122b extending from the torso 104. For clarity of illustration, the arm lengths 122a, 122b are only indicated in FIGS. 8 and 9, respectively. The arms 118a, 118b can have respective proximal end portions 124a, 124b and respective distal end portions 126a, 126b at opposite ends of the respective arm lengths 122a, 122b. The arms 118a, 118b can be connected to the torso 104 via the respective proximal end portions 124a, 124b thereof and the superior portion 106 of the torso 104. Similar to the arms 118a, 118b, the legs 120a, 120b can define respective leg lengths 128a, 128b extending from the torso 104. For clarity of illustration, the leg lengths 128a, 128b are only indicated in FIGS. 10 and 11, respectively. The legs 120a, 120b can have respective proximal end portions 130a, 130b and respective distal end portions 132a, 132b at opposite ends of the respective leg lengths 128a, 128b. The legs 120a, 120b can be connected to the torso 104 via the respective proximal end portions 130a, 130b thereof and the inferior portion 108 of the torso 104.

The arms 118a, 118b and the legs 120a, 120b can define kinematic chains. In at least some cases, the kinematic chains corresponding to the arms 118a, 118b provide at least five degrees of freedom, such as exactly five or exactly six degrees of freedom. In these and other cases, the kinematic chains corresponding to the legs 120a, 120b can provide at least four degrees of freedom, such as exactly four, exactly five, or exactly six degrees of freedom. The robot 100 can include links at progressively more distal (i.e., lower) levels within the kinematic chains corresponding to the arms 118a, 118b and the legs 120a, 120b and at progressively more distal (i.e., farther) positions along the arm lengths 122a, 122b and the leg lengths 128a, 128b. As parts of the arms 118a, 118b, the robot 100 can include proximal shoulder links 134a, 134b, distal shoulder links 136a, 136b, upper arm links 138a, 138b, elbow links 140a, 140b, lower arm links 142a, 142b, and wrist links 144a, 144b. Similarly, as parts of the legs 120a, 120b, the robot 100 can include proximal hip links 146a, 146b, distal hip links 148a, 148b, proximal thigh links 150a, 150b, distal thigh links 152a, 152b, and calf links 154a, 154b.

As further parts of the arms 118a, 118b, the robot 100 can include end effectors 156a, 156b opposite to the proximal end portions 124a, 124b along the arm lengths 122a, 122b and distal to the wrist links 144a, 144b. As further parts of the legs 120a, 120b, the robot 100 can include feet 158a, 158b opposite to the proximal end portions 130a, 130b along the leg lengths 128a, 128b and distal to the calf links 154a, 154b. The end effectors 156a, 156b can be at distalmost positions along the arm lengths 122a, 122b. Similarly, the feet 158a, 158b can be at distalmost positions along the leg lengths 128a, 128b. In the illustrated embodiment, the end effectors 156a, 156b and the feet 158a, 158b are not articulated. In other embodiments, counterparts of some or all of the end effectors 156a, 156b and the feet 158a, 158b can be articulated, such as with one or more movable fingers or toes.

With reference again to FIGS. 1-15, the robot 100 can include arm joints 160 (individually identified as arm joints 160a-160n) as parts of the arms 118a, 118b. The arm joints 160a-160n can be disposed between neighboring links within the kinematic chains corresponding to the arms 118a, 118b and at opposite ends of these kinematic chains. For clarity of illustration, the arm joints 160 are only indicated in FIGS. 12 and 13. The robot 100 can further include leg joints 162 (individually identified as leg joints 162a-162l) as parts of the legs 120a, 120b. Similar to the arm joints 160a-160n, the leg joints 162a-162l can be disposed between neighboring links within the kinematic chains corresponding to the legs 120a, 120b and at opposite ends of these kinematic chains. For clarity of illustration, the leg joints 162 are only indicated in FIGS. 14 and 15. The arm joints 160a-160n and the leg joints 162a-162l may be referenced herein in connection with the distally neighboring link along the kinematic chain of the corresponding one of the arms 118a, 118b and the legs 120a, 120b. For example, the arm joints 160f, 160m may be referenced herein as the wrist joints 160f, 160m.

In FIGS. 1-3, the robot 100 is shown in a first state, which can correspond to a home pose, a neutral pose, etc. well-suited to an object-manipulation task. In the first state, the proximal shoulder links 134a, 134b can extend laterally from the torso 104. Also, in the first state, the distal shoulder links 136a, 136b and the upper arm links 138a, 138b can extend inferiorly from the proximal shoulder links 134a, 134*b*. Also, in the first state, the elbow links 140*a*, 140*b*, the lower arm links 142*a*, 142*b*, and the wrist links 144*a*, 144*b* can extend anteriorly from the upper arm links 138*a*, 138*b*. Also, in the first state, the proximal hip links 146*a*, 146*b* can extend posteriorly from the torso 104. Also, in the first state, the distal hip links 148*a*, 148*b* and the proximal thigh links 150*a*, 150*b* can extend inferiorly from the proximal hip links 146*a*, 146*b*. Also, in the first state, the distal thigh links 152*a*, 152*b* can extend inferiorly and posteriorly from the proximal thigh links 150*a*, 150*b*. Finally, in the first state, the calf links 154*a*, 154*b* can extend inferiorly and anteriorly from the distal thigh links 152*a*, 152*b*.

In at least some cases, the calf joints 162*e*, 162*k* and the foot joints 162*f*, 162*l* are passive. As additional parts of the legs 120*a*, 120*b*, the robot 100 can include connection shafts 164 (individually identified as connection shafts 164*a*-164*f*), cranks 166 (individually identified as cranks 166*a*-166*d*), ancillary active joints 168 (individually identified as ancillary active joints 168*a*-168*d*), and ancillary passive joints 170 (individually identified as ancillary passive joints 170*a*-170*l*). The connection shafts 164*a*, 164*d* can extend between the proximal thigh links 150*a*, 150*b* and the calf links 154*a*, 154*b*. When the robot 100 is in the first state, the connection shafts 164*a*, 164*d* can be posteriorly spaced apart from the distal thigh links 152*a*, 152*b* and within 10 degrees of parallel to (e.g., within 5 degrees of parallel to and/or substantially parallel to) corresponding portions of the leg lengths 128*a*, 128*b*. Moving the distal thigh joints 162*d*, 162*j* from their positions when the robot 100 is in the first state can cause the connection shafts 164*a*, 164*d* to move increasingly off parallel from the corresponding portions of the leg lengths 128*a*, 128*b*.

The calf links 154*a*, 154*b* can include projections 172*a*, 172*b* extending posteriorly and superiorly from the calf joints 162*e*, 162*k*. The ancillary passive joints 170*a*, 170*b* can be at opposite ends of the connection shaft 164*a*. Similarly, the ancillary passive joints 170*g*, 170*h* can be at opposite ends of the connection shaft 164*d*. Due to their kinematic arrangement, an actuated position of the distal thigh joint 162*d* can dictate positions of the calf joint 162*e* and of the ancillary passive joints 170*a*, 170*b*. Similarly, due to their kinematic arrangement, an actuated position of the distal thigh joint 162*j* can dictate positions of the calf joint 162*k* and of the ancillary passive joints 170*g*, 170*h*. The calf links 154*a*, 155*b* can carry the cranks 166*a*, 166*c* laterally. The calf links 154*a*, 155*b* can further carry the cranks 166*b*, 166*d* medially. The ancillary active joints 168*a*, 168*b* can be between the cranks 166*a*, 166*b* and the calf link 154*a*. Similarly, the ancillary active joints 168*c*, 168*d* can be between the cranks 166*c*, 166*d* and the calf link 154*b*.

The connection shafts 164*b*, 164*c* can extend between the cranks 166*a*, 166*b* and the foot 158*a* and can be spaced apart laterally and medially, respectively, from the calf link 154*a*. Similarly, the connection shafts 164*e*, 164*f* can extend between the cranks 166*c*, 166*d* and the foot 158*b* and can be spaced apart laterally and medially, respectively, from the calf link 154*b*. The ancillary passive joints 170*c*, 170*e* can be at opposite ends of the connection shaft 164*b*. The ancillary passive joints 170*d*, 170*f* can be at opposite ends of the connection shaft 164*c*. The ancillary passive joints 170*i*, 170*k* can be at opposite ends of the connection shaft 164*e*. Finally, the ancillary passive joints 170*j*, 170*l* can be at opposite ends of the connection shaft 164*f*. The ancillary active joints 168*a*, 168*b* can be configured to operate in concert to move the foot 158*a* relative to the calf link 154*a*. Due to their kinematic arrangement, actuated positions of the ancillary active joints 168*a*, 168*b* can dictate positions of the foot joint 162*f* and of the ancillary passive joints 170*c*-170*f*. Similarly, the ancillary active joints 168*c*, 168*d* can be configured to operate in concert to move the foot 158*b* relative to the calf link 154*b*. Due to their kinematic arrangement, actuated positions of the ancillary active joints 168*c*, 168*d* can dictate positions of the foot joint 162*l* and of the ancillary passive joints 170*i*-170*l*.

The relative orientations of the arm joints 160*a*-160*l*, the relative positions of the arm joints 160*a*-160*l*, the dimensions of the links within the kinematic chains corresponding to the arms 118*a*, 118*b*, the shapes of these links, and/or other features of the arms 118*a*, 118*b* can provide advantages over conventional alternatives. Examples of these advantages include enhanced maneuverability, enhanced range of motion, enhanced economy of motion, reduced occurrence of kinematic singularities during certain operations (e.g., object lifting, object carrying, etc.), closer emulation of human arm kinematics, and closer emulation of human arm conformation, among others. Furthermore, the relative orientations of the leg joints 162*a*-162*l*, the relative positions of the leg joints 162*a*-162*l*, the dimensions of the links within the kinematic chains corresponding to the legs 120*a*, 120*b*, the shapes of these links, and/or other features of the legs 120*a*, 120*b* can provide advantages over conventional alternatives. Examples of these advantages include enhanced maneuverability, enhanced range of motion, enhanced economy of motion, reduced occurrence of kinematic singularities during certain operations (e.g., walking, running, etc.), closer emulation of human leg kinematics, and closer emulation of human leg conformation, among others.

Figures 16, 17:
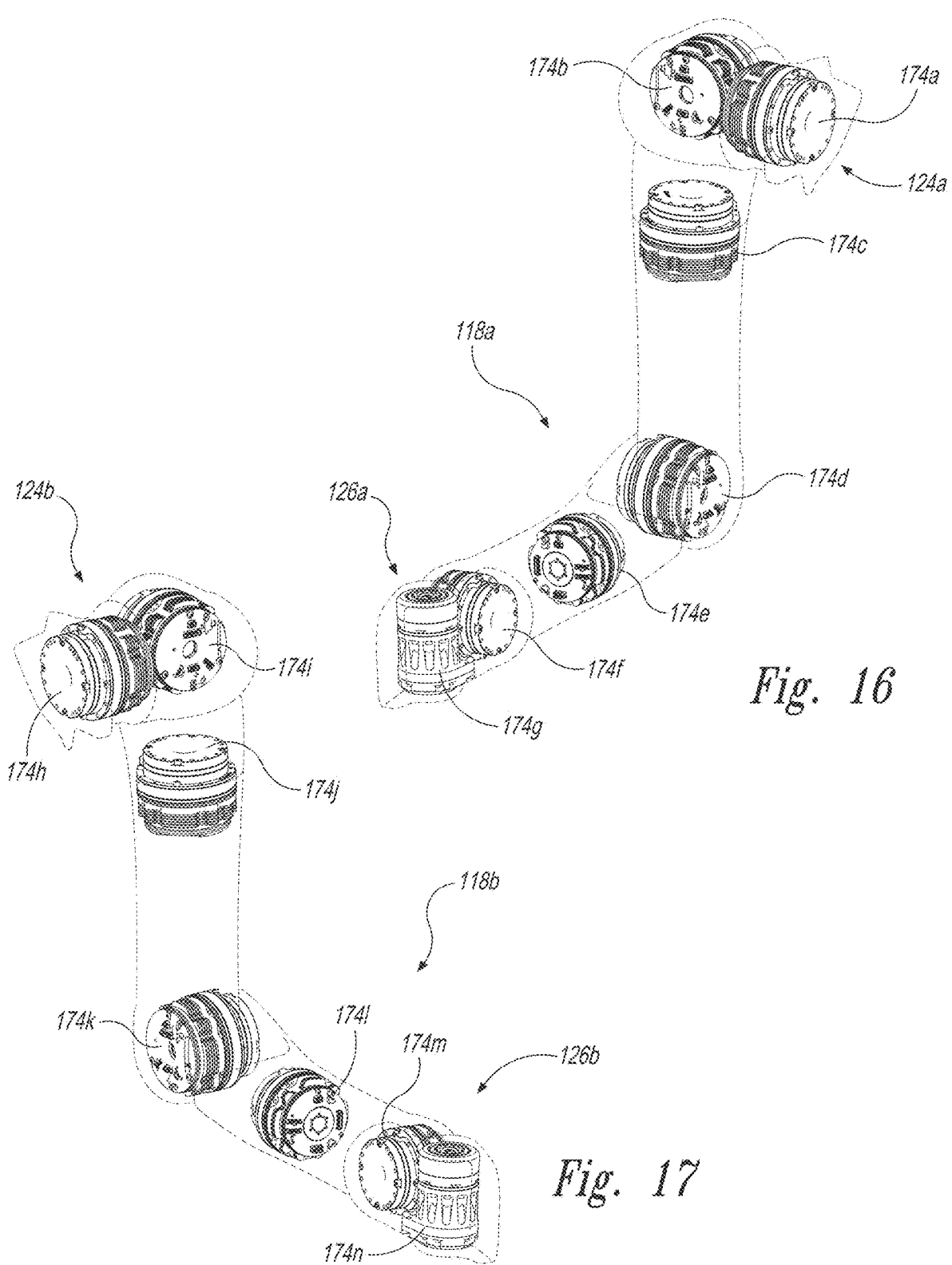

FIGS. 16 and 17 are partially transparent perspective views of the arms 118*a*, 118*b*, respectively. As shown in FIGS. 16 and 17, the robot 100 can include arm actuators 174 (individually identified as arm actuators 174*a*-174*n*) as parts of the arms 118*a*, 118*b*. The arm actuators 174*a*-174*n* can be embedded within, mounted to, or otherwise carried by the links within the kinematic chains corresponding to the arms 118*a*, 118*b*. In the illustrated embodiment, the arm actuators 174*a*-174*n* are incorporated into the arms 118*a*, 118*b* in the following manner. The arm actuators 174*a*, 174*h* are embedded within portions of the proximal shoulder links 134*a*, 134*b* at the proximal shoulder joints 160*a*, 160*h*. The arm actuators 174*b*, 174*i* are embedded within portions of the proximal shoulder links 134*a*, 134*b* at the distal shoulder joints 160*b*, 160*i*. The arm actuators 174*c*, 174*j* are embedded within portions of the upper arm links 138*a*, 138*b* at the upper arm joints 160*c*, 160*j*. The arm actuators 174*d*, 174*k* are embedded within portions of the upper arm links 138*a*, 138*b* at the elbow joints 160*d*, 160*k*. The arm actuators 174*e*, 174*l* are embedded within portions of the lower arm links 142*a*, 142*b* at the lower arm joints 160*e*, 160*l*. The arm actuators 174*f*, 174*m* are embedded within portions of the lower arm links 142*a*, 142*b* at the wrist joints 160*f*, 160*m*. Finally, the arm actuators 174*g*, 174*n* are embedded within portions of the wrist links 144*a*, 144*b* at the end effector joints 160*g*, 160*m*.

FIGS. 18 and 19 are partially transparent perspective views of the legs 120*a*, 120*b*, respectively. As shown in FIGS. 18 and 19, the robot 100 can include leg actuators 176 (individually identified as leg actuators 176*a*-176*l*) as parts of the legs 120*a*, 120*b*. The leg actuators 176*a*-176*l* can be embedded within, mounted to, or otherwise carried by the links within the kinematic chains corresponding to the legs 120*a*, 120*b*. In the illustrated embodiment, the leg actuators 176*a*-176*l* are incorporated into the legs 120*a*, 120*b* in the following manner. The leg actuators 176*a*, 176*g* are embedded within portions of the proximal hip links 146a, 146b at the proximal hip joints 162a, 162g. The leg actuators 176b, 176h are embedded within portions of the proximal hip links 146a, 146b at the distal hip joints 162b, 162h. The leg actuators 176c, 176i are embedded within portions of the proximal thigh links 150a, 150b at the proximal thigh joints 162c, 162i. The leg actuators 176d, 176j are embedded within portions of the proximal thigh links 150a, 150b at the distal thigh joints 162d, 162j. The leg actuators 176e, 176k are embedded within portions of the calf links 154a, 154b spaced apart from the foot joints 162f, 162l along the corresponding leg lengths 128a, 128b and are operably connected to the foot joints 162f, 162l via the cranks 166a, 166c and the connection shafts 164a, 164c. Finally, the leg actuators 176f, 176l are embedded within portions of the calf links 154a, 154b spaced apart from the foot joints 162f, 162l and distal to the leg actuators 176e, 176k along the corresponding leg lengths 128a, 128b and are operably connected to the foot joints 162f, 162l via the cranks 166b, 166d and the connection shafts 164b, 164d.

In at least some cases, the arm actuators 174a-174n and the leg actuators 176a-176l are rotary actuators including electric servo motors and corresponding harmonic gear units. This combination can be characterized by relatively high torque density, compact size, high efficiency, and low backlash, among other potentially advantageous features. Suitable actuators include those available from Harmonic Drive LLC (Beverly, Massachusetts). In other cases, counterparts of some or all of the arm actuators 174 and the leg actuators 176 can be pneumatic or hydraulic rather than electric, be linear rather than rotary, be stepper-type rather than servo-type, be direct drive rather than geared, and/or have different gearing than in the illustrated embodiment (e.g., cycloidal, spur, helical, miter, worm, rack, bevel, screw, etc.).

FIGS. 20-23 are various views of the arm 118a indicating isolated motion about the proximal shoulder joint 160a, the distal shoulder joint 160b, the upper arm joint 160c, and the elbow joint 160d, respectively. FIGS. 24 and 25 are perspective views of a distal portion of the arm 118a indicating isolated motion about the lower arm joint 160e. FIGS. 26 and 27 are a side profile view and a top plan view, respectively, of the arm 118a indicating isolated motion about the wrist joint 160f and the end effector joint 160g, respectively. Motion about the arm joints 160h-160n of the arm 118b can correspond symmetrically about the midsagittal plane 102 (FIG. 3) to the motion about the arm joints 160a-160g of the arm 118a shown in FIGS. 20-27. In at least some cases, the proximal shoulder joints 160a, 160h, the upper arm joints 160c, 160j, and the lower arm joints 160e, 160l are configured to rotate about respective axes parallel to the corresponding arm lengths 122a, 122b. In these and other cases, the distal shoulder joints 160b, 160i, the elbow joints 160d, 160k, the wrist joints 160f, 160m, and the end effector joints 160g, 160n can be configured to rotate about respective axes off-parallel to (e.g., within 10 degrees of perpendicular to, within 5 degrees of perpendicular to and/or substantially perpendicular to) the corresponding arm lengths 122a, 122b.

FIGS. 28-30 are various views of the leg 120a indicating isolated motion about the proximal hip joint 162a, the distal hip joint 162b, and the proximal thigh joint 162c, respectively. FIG. 31 is a side profile view of the leg 120a indicating isolated motion about both the distal thigh joint 162d and the calf joint 162e. FIGS. 32 and 33 are side profile views of the leg 120a indicating isolated motion about the foot joint 162f. Motion about the leg joints 162g-162l of the leg 120b can correspond symmetrically about the midsagittal plane 102 (FIG. 3) to the motion about the leg joints 162a-160f of the leg 120a shown in FIGS. 28-33. In at least some cases, the proximal hip joints 162a, 162g and the distal hip joints 162b, 162h are configured to rotate about respective axes parallel to the corresponding leg lengths 128a, 128b. In these and other cases, proximal thigh joints 162c, 162i, the distal thigh joints 162d, 162j, the calf joints 162e, 162k, and the foot joints 162f, 162l can be configured to rotate about respective axes off-parallel to (e.g., within 10 degrees of perpendicular to, within 5 degrees of perpendicular to and/or substantially perpendicular to) the corresponding leg lengths 128a, 128b.

Examples of Electrical and Computer Systems

FIG. 34 is a block diagram illustrating an electrical and computer system 177 of the robot 100. When suitable, operations described elsewhere in this disclosure (e.g., movements of the robot 100) can be implemented via this electrical and computer system 177 autonomously and/or in response to instructions from a user. As shown in FIG. 34, the electrical and computer system 177 can include computing components 178. The computing components 178 can include a processor 179, such as one or more general-purpose and/or special-purpose integrated circuits including digital logic gates for executing programs and/or for otherwise processing data. The computing components 178 can further include memory 180, such as one or more integrated circuits for storing data in use. The memory 180 can include a multithreaded program, an operating system including a kernel, device drivers, etc. The computing components 178 can further include persistent storage 181, such as a hard drive for persistently storing data. Examples of data that can be stored by the persistent storage 181 include diagnostic data, sensor data, configuration data, environmental data, and current-state data. The computing components 178 can collectively define a computer configured to manage, control, receive information from, deliver information to, and/or otherwise usefully interact with other components of the electrical and computer system 177.

The electrical and computer system 177 can further include communication components 182. The communication components 182 can include a computer-readable media drive 183 for reading computer programs and/or other data stored on computer-readable media. As one example, the computer-readable media drive 183 can be a flash-memory drive. The communication components 182 can further include a network connection 184 for connecting the robot 100 to other devices and systems, such as other robots and/or other computer systems. The network connection 184 can be wired and/or wireless and can be via the Internet, a Local Area Network (LAN), a Wide Area Network (WAN), BLUETOOTH, WiFi, a cell phone network, etc. The network connection 184 can include networking hardware, such as routers, switches, transmitters, receivers, computer-readable transmission media, etc. The communication components 182 can further include the display 113 discussed above and/or other suitable components for communicating with a user. The robot 100 can use the communication components 182 for internal operations and/or to interact with devices and/or systems external to the robot 100, such as systems for providing contextual information about the environment in which the robot 100 operates and/or systems for changing operating conditions of the robot 100.

The electrical and computer system 177 can further include electromechanical components 185. The electromechanical components 185 can include the arm actuators 174 and the leg actuators 176 discussed above and/or other suitable components for implementing mechanical action within the robot 100. The electrical and computer system 177 can further include power components 186. The power components 186 can include a battery 187 and a charger 188. The battery 187 can be a lithium-ion battery, a lead-acid battery, or another suitable type. The charger 188 can include a connector (not shown) compatible with a power source (e.g., a wall outlet) and leads (also not shown) extending between the connector and the battery 187. In at least some cases, the robot 100 is configured to operate wirelessly via the battery 187 and to recharge occasionally via the charger 188.

Finally, the electrical and computer system 177 can include sensor components 189 for capturing, providing, and/or analyzing information about the robot 100 itself and/or the environment in which the robot 100 is operating. The sensor components 189 can include the sensor arrays 117 discussed above. At the sensor arrays 117 or at one or more other suitable locations, the robot 100 can include among the sensor components 189 a light sensor (e.g., a photoresistor), a sound sensor (e.g., a microphone), an accelerometer, a gyroscope, a tilt sensor, a location sensor (e.g., using the Global Positioning System), a distance sensor, a contact sensor, and/or a proximity sensor, among other examples. The robot 100 can include one or more sensors in a sensor system, such as a vision system, a light detection and ranging (LIDAR) system, a sound navigation and ranging (SONAR) system, etc. In at least some cases, the robot 100 monitors itself and/or its environment in real-time or in near real-time. Moreover, the robot 100 may use acquired sensor data as a basis for decision-making via the computing components 178.

Components of the electrical and computer system 177 can be connected to one another and/or to other components of the robot 100 via suitable conductors, transmitters, receivers, circuitry, etc. While the electrical and computer system 177 configured as described above may be used to support operation of the robot 100, it should be appreciated that the robot 100 may be operated using devices of various types and configurations and that such devices may have various components and levels of responsibility. For example, the robot 100 may employ individual computer systems or controllers to manage discrete aspects of its operations, such as an individual computer system or controller to perform computer vision operations, a separate computer system or controller to perform power management, etc. In some cases, the robot 100 employs the electrical and computer system 177 to control physical aspects of the robot 100 according to one or more designated rules encoded in software. For example, these rules can include minimums and/or maximums, such as a maximum degree of rotation for a joint, a maximum speed at which a component is allowed to move, a maximum acceleration rate for one or more components, etc. The robot 100 may include any number of mechanical aspects and associated rules, which may be based on or otherwise configured in accordance with the purpose of and/or functions performed by the robot 100.

Software features of the robot 100 may take the form of computer-executable instructions, such as program modules executable by the computing components 178. Generally, program modules include routines, programs, objects, components, data structures, and/or the like configured to perform particular tasks or to implement particular abstract data types and may be encrypted. Furthermore, the functionality of the program modules may be combined or distributed in various examples. Moreover, control scripts may be implemented in any suitable manner, such as in C/C++ or Python. The functionality of the program modules may be combined or distributed in various embodiments, including cloud-based implementations, web applications, mobile applications for mobile devices, etc.

Furthermore, certain aspects of the present technology can be embodied in a special purpose computer or data processor, such as application-specific integrated circuits (ASIC), digital signal processors (DSP), field-programmable gate arrays (FPGA), graphics processing units (GPU), many core processors, etc. specifically programmed, configured, or constructed to perform one or more computer-executable instructions. While aspects of the present technology, such as certain functions, may be described as being performed on a single device, these aspects, when suitable, can also be practiced in distributed computing environments where functions or modules are shared among different processing devices linked through a communications network such as a Local Area Network (LAN), Wide Area Network (WAN), or the Internet. In a distributed computing environment, program modules and other components may be located in both local and remote memory storage and other devices, which may be in communication via one or more wired and/or wireless communication channels.

Aspects of the present technology may be stored or distributed on tangible computer-readable media, which can include volatile and/or non-volatile storage components, such as magnetically or optically readable computer media, hard-wired or preprogrammed chips (e.g., EEPROM semiconductor chips), nanotechnology memory, biological memory, or other computer-readable storage media. Alternatively, computer-implemented instructions, data structures, screen displays, and other data under aspects of the present technology may be distributed (encrypted or otherwise) over the Internet or over other networks (including wireless networks), on a propagated signal on a propagation medium (e.g., electromagnetic wave(s), sound wave(s), etc.) over a period of time, or they may be provided on any analog or digital network (packet switched, circuit switched, or other scheme). Furthermore, the term computer-readable storage medium does not encompass signals (e.g., propagating signals) or transitory media. One of ordinary skill in the art will recognize that various components of the robot 100 may communicate via any number of wired and/or wireless communication techniques and that elements of the robot 100 may be distributed rather than located in a single monolithic entity. Finally, electrical and computing aspects of robots in accordance with various embodiments of the present technology may operate in environments and/or according to processes other than the environments and processes described above.

Examples of Docks and Docking Methods

A dock in accordance with at least some embodiments of the present technology is configured for use with a legged, mobile robot, such as a robot having biped body and leg configurations. In at least some cases, the dock includes an alignment system for guiding the robot into a docking position. The alignment system can include fiducial markings that provide course alignment when the robot is walking into the dock. The dock can further include a frame that provides the robot with sufficient leg room to "sway" or to "rock" as the robot enters the dock. Bipedal robots, in particular, typically move in this manner to remain upright. The alignment system can further include secondary fiducial markings that provide fine alignment as the robot moves into the docking position. In some cases, the docking position is a seated position. In these and other cases, the secondary fiducial markings can guide the robot into contact with a seat. Furthermore, the seat can be configured to guide or to assist with guiding the robot. For example, the seat can be shaped to coordinate with structural aspects of the robot to align charging contacts of the robot with charging contacts of the dock.

The robot can charge via the dock while the robot's feet are in contact with the ground in a stable position. In this state, the robot may be completely unactuated and use zero power when charging. Furthermore, moving the robot into the docking position can include leaning a torso of the robot forward (e.g., by about fifteen degrees) before charging. This movement can be useful, for example, to cause a wiping movement at a charging interface and thereby clean electrical contacts of the robot and/or electrical contacts of the dock at the charging interface. Methods of promoting good charging connection between a dock and a robot in accordance with at least some embodiments of the present technology include this and other robot movements (e.g. leaning back and forth, wiggling, etc.) relative to a seat of a dock. These other movements can likewise cause wiping movement at the charging interface that cleans the interface and improves electrical contact between the robot and the dock. In at least some cases, the system tests the electrical contact and executes a cleaning movement in response to a result of this test.

When seated for charging and in other cases, the robot can be well positioned to work with its upper body. Furthermore, the dock can recognize when the robot contacts the seat and increase the power flow to the seat upon contact. The dock can be configured to support the robot's weight via engagement between the dock and the robot outside the charging interface. For example, the dock can be configured to support the weight of the robot via the seat and can include a spring operably associated with an electrode of the dock. The electrode can resiliently deflect in response to contact with an electrode of the robot as the robot moves into the docking position. In these and other cases, the spring force rather than the weight of the robot can dictate a contact force at the charging interface. In other cases, the docking position can be a non-seated position, such as a hanging position as described in detail below. Furthermore, a charging interface between a dock and a robot can be configured to carry some or all of the weight of the robot. Indeed, high contact force at a charging interface in these and other cases can be useful to facilitate strong electrical contact, electrode cleaning, and/or for other reasons.

Referring now to FIGS. 35-38, a dock, generally designated by the numeral 200, for charging a mobile robot 210 is shown. In certain embodiments, the mobile robot 210 is an autonomous legged robot that has the ability to move in proximity to the dock 200 to receive power for an on-board or internal power source 212, such as a battery. The power source 212 receives power from the dock 200 through a power supply system 214.

In some embodiments, the mobile robot 210 inserts itself into, mounts itself on, or otherwise positions itself relative to the dock 200 so that charging can take place. The dock 200 can support the mobile robot 210 in a fully supported position with a robot support system 216. In certain embodiments, the dock 200 guides the mobile robot 210 into the robot support system 216 using an alignment system 218. The alignment system 218 provides assistance to the mobile robot 210 for docking or otherwise connecting with the robot support system 216. Coarse alignment fiducial markings 220 of the alignment system 218 can work in conjunction with one or more sensors 262 of the robot 210 to position the robot 210 with respect to the power supply system 214. Additionally, fine alignment fiducial markings 222 of the alignment system 218 can work in conjunction with the same or different sensors 262 of the robot to guide the robot 210 into a connected position for charging by the power supply system 214.

The power supply system 214 can include a built-in power supply, such as its own battery, for maintaining a charge during power failures. In some embodiments, a single charge of the power supply system 214 has enough capacity to recharge multiple mobile robots. In these and other embodiments, the dock 200 can be one of a plurality of docks that form a smart grid that hosts a mesh network for communication and coordination with multiple mobile robots in a coverage area of the smart grid. A robot 210 can select and navigate to a given one of docks 200 in the network based on proximity (e.g., the closest dock), availability, capacity, and/or other factors.

As shown in FIG. 36, certain embodiments of the mobile robot 210 have a biped configuration with a body 224 and a pair of legs 226. The body 224 has a torso or an upper portion 228 with a chest 230 and a lower portion 232 that connects to each one of the pair of legs 226, so that the legs 226 can move the body 224 in a gait that is similar to an avian gait or, in other embodiments, a human gait. The mobile robot lower portion 232 connects to the dock 200 to receive power from the power supply system 214 through a charging interface that is part of the robot support system 216.

As shown in FIGS. 36-38, the dock 200 supports the mobile robot 210 while the power source 212, shown in FIG. 35, for the mobile robot 210 receives power from the dock 200. In some embodiments, the dock 200 supports the mobile robot 210 in a completely unactuated (i.e., unpowered) position while it is charging. In some embodiments, such as in FIG. 2, the torso 228 of the mobile robot 210 rotates forward (e.g., about fifteen degrees) before or while charging so that the chest 230 of the robot rests against chest pad 258 providing full support when the mobile robot 210 is charging.

In certain embodiments, the dock 200 includes base 236 and member assembly 238 projecting upwardly from the base 236 and forming at least a portion of the robot support system 216. The base 236 can include a pair of prongs 240-242. The member assembly 238 can include a plurality of members 244-248 that extend upward away from the prongs 240-242. A first member 244 can project upwardly at a predetermined angle relative to the ground 250 from the base 236.

As shown in FIGS. 37 and 38, a second member 246 can project upwardly from the base 236 and away from first member 244 to support a seat 252 that engages the mobile robot 210 during charging. In certain embodiments, the configuration of the seat 252 resembles a bicycle seat. In these and other embodiments, the seat 252 can include a housing 254 with a pair of contacts 256 therein. The seat 252 can be shaped to restrict movement of the lower portion 232 of the torso of the robot 210 in a direction distal to the first member 244 when the robot 210 is engaged with the dock 200.

The charging contacts 256 can function as a conduit for recharging the mobile robot 210. In some embodiments, the contacts 256 have a constant minimum voltage, such as 5 volts through a 200 ohm current-limiting resistor, that is insufficient to shock or to otherwise harm humans when touched. The contacts 256 can be configured to increase the voltage when the mobile robot 210 contacts the housing 254. In some embodiments, the dock 200 is configured to detect a specific response from the mobile robot 210 before the voltage is increased to further enhance safety.

In a particular embodiment, prior to charging the dock 200 and the robot 210 authenticate using a very low voltage, low power current supplied by the dock 200. Then the robot activates a very low milliohm MOSFET across the charging contacts. On the dock side, a one amp current source is driven through the contacts to the robot with current return right back to the dock 200 through the robot side MOSFET. The voltage present across the contacts during this one amp test current is amplified by an instrumentation amplifier, then analog-to-digital converted by the microcontroller. At this point, a go or no go decision for charging is made if the contact resistance is above a predetermined threshold. Under normal circumstances, the robot 210 connecting with the contacts should create a sub 1 milliohm connection.

The second member 246 can extend from first member 244 to position the seat 252 in a predetermined position to facilitate the positioning of the mobile robot 210 in a stable position during charging. The predetermined position can be one that places the seat 252 at a relatively low position relative to the height of the mobile robot lower portion 232 where the charging contacts on the robot 210 are located. Thus, the mobile robot 210 may need only position itself over the seat 252 and lower straight down onto the seat 252 as an initial step of getting in position to charge.

In some embodiments, the first and second members 244, 246 can be positioned, sized, or otherwise configured to allow the mobile robot 210 to move the upper portion 228 of the body 224 and/or the arms 234 to perform tasks (e.g., sorting) during charging operations. In these and other embodiments, the mobile robot 210 can be configured to perform calibrations of extremities by touching certain places on the dock 200 while docked.

In certain embodiments, the dock 200 can hold the mobile robot 210 in a position to facilitate the performance of maintenance functions on the mobile robot 210 when it is positioned on the seat 252 for charging by the power supply system 214. Maintenance operations can include such functions as replacing filters, cleaning filters, checking wear, cleaning lenses, and removing limbs, actuators, or other mechanical parts. Furthermore, the dock 200 can be configured to cool the power supply system 214 while the mobile robot 210. For example, the dock can include one or more fans (not shown) that blow air on the power supply system 214 during charging. The maintenance functions can be performed by human technicians or by automated processes.

The third member 248 can project upwardly from the base 236 and/or from the first member 244 to support a chest pad 258 for engaging the chest 230 thereon. The chest pad 258 can support the mobile robot 210 when the mobile robot 210 is in a static or stable position. This can facilitate charging by the power supply system 214 while no actuation is necessary for the mobile robot 210 to stay in a suitable position. It should be understood that while the dock 200 includes members 246-248 projecting upwardly from the base 236 through the first member 244, members 246-248 can alternatively extend from the base 236, the first member 244, or both.

As shown in FIGS. 36-38, the alignment system 218 can include fiducial markings 220, 222 for guiding the mobile robot 210 into position within range of the dock 200. In operation, the mobile robot 210 can determine its position relative to the dock 200 before approaching the dock 200 to initiate a charging operation. Then, the mobile robot 210 can move toward the dock 200 via a walking motion. The alignment system 218 can be helpful in guiding the mobile robot 210 into the dock 200.

As the mobile robot 210 approaches the dock 200, it can use the alignment system 218 to position the legs 226 between the prongs 240-242 before engaging the power supply system 214 and/or the robot support system 216. In certain embodiments, the mobile robot 210 employs one or more sensors 262 to read the coarse alignment markings 220 as it approaches the dock 200. In these and other embodiments, the mobile robot 210 can use optical sensors and maintain the body 224 in an upright position or configuration during this alignment.

When the sensors 262 indicate the mobile robot 210 is in position, the legs 226 can begin to retract and lower the body 224. The lower portion 232 then can engage the seat 252 to activate the power supply system 214. In certain embodiments, it is helpful to locate and read the fine alignment fiducial markings 222 to align the mobile robot 210 using more precise motions until the mobile robot 210 engages the seat 252. In certain embodiments, the fine alignment fiducial markings 222 may be read by a different sensor than the coarse alignment fiducial markings 220.

If the mobile robot 210 determines that it is misaligned with the seat 252 during the fine alignment step, such as if no connection with the seat 252 is detected, the legs 226 can cause the body 224 to rise (e.g., to stand up straight). Then, the mobile robot 210 can attempt to reposition the legs 226, so that the body 224 can be properly aligned before being lowered to engage the seat 252 again. In certain embodiments, the mobile robot 210 maintains the legs 226 with feet on the ground in this lowered configuration during the fine alignment using the fine alignment markings 222.

Once the fine alignment step is complete, the mobile robot 210 may be seated and resting in a stable position and can remain stable even when unpowered. In the stable position, the mobile robot 210 can be shut off while being charged. In certain embodiments, the mobile robot 210 rocks or leans the body 224 forward (e.g., about fifteen degrees from vertical) to engage the chest pad 258 during the fine alignment. Further, it should be understood that mobile robot 210 can lean the body 224 during or after the fine alignment step. Similarly, the mobile robot 210 can lean the body 224 at other angles relative to the ground 250 during the alignment process.

In some embodiments, the fiducial markings 220-222 include codes, such as ArUco codes or QR-codes. Alternatively or in addition, the dock 200 or portions thereof can have predetermined three-dimensional configurations to function as landmarks to guide or to align the mobile robot 210 to engage the dock 200.

As shown in FIG. 38, the seat 252 can include an outer surface 264 that is contoured to further guide the mobile robot 210 as it moves into a charging position during the fine alignment. The outer surface 264 can include a trough 266 that guides the mobile robot 210 in a forward and backward direction (i.e. in the sagittal plane) as the lower portion 232 engages the seat 252. In these and other embodiments, the trough 266 is open on the sides, so that it does not restrict or inhibit the side-to-side movement of the mobile robot 210. Once the mobile robot 210 is fully charged, the mobile robot 210 can perform alignment operations in reverse order to rise from the stable, stationary position to leave the dock 200.

As shown in FIGS. 36-37, the dock 200 can include wheels 270 to form a dolly for moving the dock 200. Additionally, the wheels 270 can be used to move the mobile robot 210 both during charging operations and at non-charging times. In certain embodiments, the dock 200 can further include additional wheels on the prongs or the base and a propulsion system (not shown) to assist with moving the dock 200 from place to place. Furthermore, the dock 200 can move the robot 210 from a first workplace to a second workplace while the robot 210 is charging. The dock 200 can include a controller 272 that communicates with one or more robots 210 over a network 274. Through this communication and/or in another suitable manner, the dock 200 can autonomously reposition itself to be in sufficient proximity to the one or more mobile robots 210 to facilitate charging, thereby reducing non-working time for the mobile robots 210. Alternatively or in addition, the robots 210 can find open, unused docks 200 when needed.

As shown in FIG. 35, the positioning of the dock 200 and the mobile robot 210 can be coordinated with a fleet management device 276. In some embodiments, the dock 200 is directed to travel to a predetermined location where the robots 210 are expected to be working when they need to be recharged. In these and other embodiments, the fleet management device 276 can monitor several robots 210 and coordinate or stagger charging times to minimize or eliminate downtime and waiting. The fleet management device 276 can also manage multiple docks, each dock 200 able to charge multiple robots for purposes of scaling a robot workforce for larger projects.

Referring now to FIGS. 39-41 with continuing reference to the foregoing figures, there is shown another embodiment of a dock, generally designated by the numeral 300, which can be configured to receive a bipedal mobile robot 310 for charging. In this embodiment, the bipedal mobile robot 310 approaches the dock 300 to engage a charging seat assembly 314 attached at an end of a seat member 313 extending from an elongated upright member 312 of the dock 300. The bipedal mobile robot 310 can be the mobile robot 210 shown and referred to in FIGS. 35-38.

The bipedal mobile robot 310 has a biped configuration with a body 316 and a pair of legs 318. The body 316 has an upper portion 320 with a chest 322 and a lower portion 324 that connects to each one of the pair of legs 318, so that the legs 318 can move the body 316 in an ambulatory fashion. The bipedal mobile robot 310 includes a sensor not only to assist with navigation, but also for detecting properties associated with the dock 300 in order to assist with alignment. In certain embodiments, the sensor is an optical sensor.

The dock 300 can include a base 328 and an elongated upright member 312 projecting upwardly from the base 328. The base 328 includes a pair of opposing prongs 332 that are arranged in a substantially symmetrical arrangement having sufficient width to accommodate the bipedal mobile robot legs 318 in between as the robot 310 approaches the dock 300.

In certain embodiments, the dock further includes the charging seat assembly 314, attached to seat member 313, which includes a seat 336 for engaging the bipedal mobile robot body lower portion 324. The seat member 313 supports the seat 336. In some embodiments, the curvature or shape of the bipedal mobile robot body lower portion 324 conforms to the shape of the seat 336.

As shown in FIGS. 39-41, the sensor (not shown) can detect visual markings, such as coarse alignment fiducial markings 350 and fine alignment fiducial markings 338 to assist with alignment of the bipedal mobile robot 310 as it lowers the body 316 to engage the seat 336. The shape of the seat 336 can assist with proper alignment both side to side (e.g., in a coronal plane) and front to back (e.g., in a sagittal plane). In some embodiments, a sensor can determine whether the seat 336 includes dirty contacts through thermal measurements once the robot 310 is charging. The thermal measurements can correlate to increased resistance due to corrosion, dirt, etc. In addition or alternatively, the dock 300 can detect whether the contacts are dirty, corroded, and/or otherwise damaged through visual inspection, physical property measurements, and/or chemical property measurements.

FIGS. 39-41 also demonstrate the process of the robot 310 approaching the dock 300, getting into proper position using coarse alignment fiducial markers 350 in conjunction with optical sensors on the body 316. Unlike wheeled or some quadrupedal robots, bipedal robots tend to sway from side to side as they balance, which can necessitate additional clearance from side to side in the dock. Due to the avian construction of the legs on the robot 310 depicted in FIGS. 39-41, the dock 300 does not impede the balancing motion of the robot 310.

Next, as shown in FIG. 40, the robot 310 can lower itself onto the seat 336, further using the fine alignment fiducial markers 338 in conjunction with sensors located near the lower portion 324 of the body to facilitate proper positioning. Finally, as shown in FIG. 41, the body 316 can rotate (e.g., in the range of 15 degrees forward) toward the elongated member 312. The chest 322 can lean against a chest pad 352 extending away from the elongated member 312 or otherwise disposed on the dock 300. In the position illustrated in FIG. 41, the robot 310 can be completely supported such that no actuators need to be energized to keep the robot 310 in this position, making for quicker recharging.

In certain embodiments, the bipedal mobile robot 310 can be programmed or configured to rotate the body 316 back and forth between the first position of FIG. 40 and the second position of FIG. 41 to clean electrical contacts (not shown) at the lower portion 324 of the body. In addition or alternatively, this motion can clean electrical contacts in the seat (e.g, contacts 256 shown in FIG. 38) when the sensor 326 detects an indicator that the contacts may be dirty. This rotation can occur when the contacts on the robot are touching the charging contacts on the dock 300. The rotating motion of the body 316 can wipe the contacts on both the robot 310 and the dock 300 for better conductivity, which results in better and faster recharging as well as reduced heat buildup. In certain embodiments, a thermal or voltage sensor on the robot or the dock 300 determines whether the robot is charging optimally. In at least some of these embodiments, if the temperature of the charging contacts 256 exceeds a threshold (e.g., 60 degrees Celsius), charging will cease. This safety function can be implemented both in pure hardware and also through the controller 272. In some embodiments, the robot 310 will repeat the rotation movement in an attempt to clean the contacts. In other embodiments, the robot 310 may repeat the entire docking and rocking process in order to obtain a better electrical connection.

In some embodiments, the seat 336 is positioned in a manner that provides the biped mobile robot 310 with sufficient room for the legs 318 to support the body 316 for certain predetermined movements. Such movements can include "swaying" or "rocking" the body 316 when the bipedal mobile robot 310 is engaged with the seat 336 for charging. Alternatively or in addition, the bipedal mobile robot 310 can utilize physical structure, such as wings (not shown) in the area of the lower portion 324 of the body to line up on the seat 336 in an optimal position for charging to assist with the fine alignment step, as described in relation to FIGS. 35-38 above.

Still further, the charging dock 300 and mobile robot 310 can be cooperatively designed to reduce problems with alignment for purposes of recharging. With reference to FIG. 39, the structure of the legs 318 can be such that the robot 310 can walk toward the dock 300 and get into position with the coarse alignment markings 350 without the legs 318 overlapping the seat 336 at all. Due to the constant balancing typical of bipedal robots, it is common for such robots to rock back and forth, shifting weight from left foot to right, which can make alignment difficult if the legs were to bang into the seat while the robot 310 was balancing. The design of the dock for the illustrated robot can reduce or eliminate this issue and thereby facilitate alignment.

Referring now to FIGS. 42-43 with continuing reference to the foregoing figures, there is shown a fragmentary close-up view of a portion of a dock 400 and a mobile robot 405. In this view, taken from slightly behind and to one side of the robot, the body has been made transparent so that only the robot charging contacts 410 can be seen as the interface with the seat charging contacts 420 located in the seat interface 430 of the dock 400. In certain embodiments, the robot charging contacts 410 have a curved surface 422 that matches a curved surface of the seat charging contacts 420.

FIGS. 42 and 43 illustrate how the mobile robot 405 can engage the dock 400 without applying weight on the robot charging contacts 410. In this embodiment, the mobile robot 405 can be charged by the dock 400 without damaging or otherwise diminishing the flow of energy through the robot charging contacts 410. The dock 400 can support the mobile robot 405 without putting any weight on the robot charging contacts 410. Like the embodiments shown in FIGS. 35-41, the mobile robot 405 can have a biped configuration with a body 418. The body 418 can have a lower portion 424. The mobile robot body lower portion 424 can be configured to match a shape of the seat interface 430 to ensure the robot 405 is in position to receive power through the seat charging contacts 420. Furthermore, the shape can be rounded so that rotation of the robot lower portion 424 can occur without causing loss of charging connection at the contacts 420, 422. The mobile robot body lower portion 424 can include curved contacts 422. In some embodiments, the robot body lower portion 424 includes wings or other structural guidance elements (not shown) that physically guide the body 418 to the correct position during a fine alignment when the mobile robot 405 engages the dock 400.

The seat charging contacts 420 can be aligned along a center axis with the robot curved contacts 422 when the mobile robot 405 aligns with the dock 400 in a manner that is similar to the alignment process depicted in FIGS. 39-41. In such embodiments, the robot curved contacts 422 can be rotated or otherwise moved in relation to the seat charging contacts 420 when the mobile robot body 418 leans forward during a fine alignment process, so that the robot curved contacts 422 frictionally rub against the seat charging contacts 414. This can clean the contacts, such as through wiping or scraping action. Accordingly, the mobile robot 405 can remove dirt or corrosion on the charging contacts 420, 422 to improve the charging performance of the dock 400. Moreover, the mobile robot 405 can clean the surface of the seat charging contacts 414 without having to disengage, fully, from the dock 400.

With continued reference to FIG. 43, the seat interface 430 (transparent in this view) can include a pair of contact pins 420. Each contact pin 420 can be actuated with a spring 432 so that it is biased to project away from the seat to engage the robot curved contacts 422 and to facilitate charging without applying undue pressure on the contact pins 420 from the weight of the robot 405.

While mobile robots have been disclosed that have charging contacts located at the bottom of the lower portion of the torso, those of skill in the art will recognize that the charging contacts on a robot can be placed elsewhere. In certain embodiments, the location of the charging contacts can be related to the use case of the robot. By way of non-limiting example, reference is made to U.S. patent application Ser. No. 17/609,728, entitled "Method and Apparatus for Releasably Securing a Robot in a Delivery Vehicle," the entirety of which is incorporated as if more fully set forth herein. The autonomous bipedal robot disclosed therein can be disposed on an extendable rack in the back of a delivery van during transport. A connection between the robot and the rack can be just under a location where the robot's arms meet its body, also referred to as the "armpits." In such an implementation, the robot can be configured with charging contacts at the armpits. Charging contacts on the rack can be placed on the extending arms such that charging occurs when the robot is disposed on the rack.

To address the potential issue of dirty contacts in this "hanging" configuration, the contacts could be placed in a substantially vertical orientation, permitting the wiping motion to occur with the robot extending its legs and raising the body vertically, while at the same time maintaining contact with the charging contacts. This up and down motion can effectively rub the contacts against each other and clean them to the extent the controller determines such cleaning is needed. Other configurations are possible depending on the use case for the robot. When a dock is implemented in a delivery van, it can be mounted inside the vehicle rather than being mobile. Likewise, certain other embodiments of the charging dock are not mobile. Charging docks in accordance with embodiments of the present technology can be floor-mounted, wall-mounted, ceiling-mounted, etc. depending on the needs of the work task being accomplished by the robot.

Now referring to FIG. 44, a method 700 can be employed to charge a mobile robot in a dock. The mobile robot can be the mobile robot 210 shown in FIGS. 35-38, the bipedal mobile robot 310 shown in FIGS. 39-41, and/or the mobile robot 310 shown in FIGS. 42-43. The method 500 can include providing a dock configured to hold the robot in a non-energized position where the robot is stable at rest (block 510). The dock can be the dock 200 shown in FIGS. 35-38, the dock 300 shown in FIGS. 39-41, the dock 300 shown in FIGS. 42-43, or another dock in accordance with at least some embodiments of the present technology. The dock may also be a modified deployment rack such as is set forth in U.S. patent application Ser. No. 17/609,728.

Next, the bipedal mobile robot can be moved into the frame so that it has a pair of legs positioned between two prongs extending from the frame (block 520). The bipedal mobile robot can be coarsely aligned within the frame with one of the two pairs of fiducial markings and moved into position for charging further using the fine alignment fiducial markers discussed herein. The body portion of the bipedal mobile robot can then be retracted or otherwise moved into a stable resting position with the charging contacts engaged with those of the dock. Then, the bipedal mobile robot can be aligned, finely, with the other one of the two pairs of fiducial markers.

A sensor can check the charging system and contacts for excess heat or reduced voltage transfer as described above. In the event the sensor detects inefficient charging, it is determined the contacts are not clean and the robot is directed to adjust its position to cause the contacts on the robot to brush or rub against the contacts on the dock (block 540). The sensor that detects increased heat may be located either in the dock, in which case it may communicate with the robot, or in the robot. An increased heat reading can cause the controller of the robot to direct that it undertake a cleaning action, such as by adjusting its position in relation to the charging contacts. Finally, power can be supplied to the bipedal mobile robot (block 550).

It should be understood that while the above-described embodiments depict robots engaging docks by sitting or engaged with a deployment mechanism, the dock and/or robot can be configured to allow the robot to engage the docks through contact with appendages or portions thereof (i.e., elbows), kneeling, bending, crouching, squatting, laying in a prone position or other configurations.

Robots in accordance with at least some embodiments of the present technology are configured to dock in an upright position rather than in a seated position. In these and other cases, a docking position of a robot can be a hanging position in which a dock supports at least some (e.g., at least most or all) of the robot's weight. For example, the robot 100 shown in FIGS. 1-3 can be configured to hang from the superior projection 116*a*. Correspondingly, the superior projection 116*a* can be a hanger configured to be received at a dock. Furthermore, the superior projection 116*a* can be a handle through which the robot 100 can be manually controlled. To support these and/or other functions, the superior projection 116*a* can be structurally connected to an internal frame (not shown) of the robot 100. The superior projection 116*a*, the internal frame, and the connection therebetween can be strong enough to support at least some (e.g., at least most or all) of a weight of the robot 100. Selected embodiments in which the robot 100 docks and charges via the superior projection 116*a* are described below with reference to FIGS. 45-67.

FIGS. 45 and 46 are, respectively, a perspective view and a top plan view of the superior projection 116*a* and adjacent portions of the robot 100. With reference to FIGS. 1-3, 45 and 46 together, the superior projection 116*a* can be carried by the body 103. Furthermore, the superior projection 116*a* can be connected to the body 103 via the superior portion 106 of the torso 104. In at least some cases, the superior projection 116*a* extends posteriorly from the body 103. For example, the superior projection 116*a* can include a first stem 600 and a second stem 602 laterally spaced apart from one another and individually extending posteriorly from the body 103. The superior projection 116*a* can further include a rail 604 spaced apart posteriorly from the body 103 and extending between the first and second stems 600, 602. The superior projection 116*a* can define a path 606 along which the first stem 600, the rail 604, and the second stem 602 extend in series. Between the rail 604 and a posterior surface of the body 103, the superior projection 116*a* can define a through opening 608. The through opening 608 can extend along a superior-inferior dimension defined by the robot 100. The path 606 at the rail 604 can be within 20 degrees of parallel to (e.g., within 10 degrees of parallel to and/or substantially parallel to) the transverse plane 110. In addition or alternatively, the path 606 at the rail 604 can be within 20 degrees of perpendicular to (e.g., within 10 degrees of perpendicular to and/or substantially perpendicular to) the midsagittal plane 102.

In the illustrated case, the superior projection 116*a* is curved at respective junctions between the rail 604 and the first and second stems 600, 602. Correspondingly, the path

606 can be at least substantially shaped as a semi-stadium. The superior projection 116*a* can be ovoid (e.g., circular) in planes transverse to the path 606. The placement, shape, orientation, size, and/or other features of the superior projection 116*a* can be useful to facilitate manual gripping, to facilitate secure engagement with a hook, to facilitate rearward docking and forward undocking, to facilitate smooth engagement with a guiding feature of a dock, to reduce interference with objects the robot 100 manipulates via the arms 118*a*, 118*b*, and/or to stabilize the robot 100 against tilting about an axis perpendicular to the transverse plane 110 when the robot is docked, among other purposes. In other embodiments, counterparts of the superior projection 116*a* can have other suitable features. For example, a counterpart of the superior projection 116*a* can extend from the body 103 without defining a through opening. The counterpart can, for example, be shaped as a solid flange with a posterior lip. As another example, a counterpart of the superior projection 116*a* can be expansive in a superior-inferior dimension of the robot 100 in addition to or instead of being expansive in a lateral dimension of the robot 100. For example, a counterpart of the superior projection 116*a* can include a rail (not shown) spaced apart from the body 103 and perpendicular to the rail 604. A rail with this orientation can be useful, for example, to stabilize the robot 100 against tilting about an axis perpendicular to the midsagittal plane 102.

As discussed above, it can be useful in at least some cases for a charge-receiving electrode of the robot 100 to be at a portion of the robot 100 that is received at a dock. In the illustrated embodiment, the robot 100 includes charge-receiving electrodes 610 (individually identified as charge-receiving electrodes 610*a*, 610*b*) at the superior projection 116*a*. The charge-receiving electrodes 610 can be at the rail 604, such as at an anterior side of the rail 604. The robot 100 can further include a battery 612 and a computer 613 at the body 103. The charge-receiving electrodes 610, the battery 612, and the computer 613 can correspond to the computing and power components 178, 186 described above with reference to FIG. 34. The battery 612 can be configured to be charged via the charge-receiving electrodes 610. For example, the robot 100 can include an electrical connector 614, such as one or more wires, extending between the battery 612, the computer 613, and the charge-receiving electrodes 610 via the first stem 600. Including two charge-receiving electrodes 610*a*, 610*b* can be useful, for example, to facilitate testing an electrical connection between the robot 100 and a dock, as discussed below. In at least some cases, the charge-receiving electrodes 610*a*, 610*b* are curved about an axis perpendicular to the midsagittal plane 102. In these and other cases, the charge-receiving electrodes 610*a*, 610*b* can be outwardly convex in the midsagittal plane 102.

The placement, shape, orientation, size, and/or other features of the charge-receiving electrodes 610*a*, 610*b* can be useful to protect the charge-receiving electrodes 610*a*, 610*b* from damage (e.g., impact damage), to facilitate cleaning of an interface between the charge-receiving electrodes 610*a*, 610*b* and dock electrodes, to increase an area of such an interface, and/or to facilitating strong and stable electrical contact between the charge-receiving electrodes 610*a*, 610*b* and dock electrodes, among other purposes. In other embodiments, counterparts of the charge-receiving electrodes 610*a*, 610*b* can have other suitable features. For example, counterparts of the charge-receiving electrodes 610*a*, 610*b* can be fully circumferential about the path 606. As another example, counterparts of the charge-receiving electrodes 610*a*, 610*b* can be at a posterior side of the body 103 in addition to or instead of being at an anterior side of the rail 604. As yet another example, counterparts of the charge-receiving electrodes 610a, 610b can be plugs (not shown) that extend posteriorly from the inferior portion 108 of the torso 104. In these and other cases, the superior projection 116a can guide the robot 100 into alignment with a dock such that the plugs can be inserted into corresponding sockets of a dock to establish an electrical connection between the robot 100 and the dock.

FIG. 47-50 are a perspective view, a front profile view, a top plan view, and a side profile view of a dock 700 in accordance with at least some embodiments of the present technology. FIG. 51 is a simplified cross-sectional view of the dock 700 taken along the line A-A in FIG. 48. FIG. 52 is an enlargement of portion B of FIG. 51 showing additional detail of the dock 700. With reference to FIGS. 1-3 and 45-52 together, the dock 700 can be configured to engage with the robot 100 at least primarily via a posterior side of the robot 100, such as at least primarily via a posterior side of the torso 104. This can be useful, for example, to promote compactness and stability of the robot 100 when docked and during docking. As another potential benefit, the dock 700 can facilitate docking of the robot 100 in a ready position, such as a position from which the robot 100 can be quickly and efficiently redeployed after docking. As another potential benefit, the dock 700 can allow the robot 100 to perform useful work (e.g., sorting) via the arms 118a, 118b while the robot 100 is docked. As another potential benefit, the dock 700 can facilitate face-to-face human-robot interaction while the robot 100 is docked. As yet another potential benefit, the dock 700 can facilitate maintenance of the robot 100 while the robot 100 is docked. For example, because the robot 100 carries the arms 118a, 118b, legs 120a, 120b, neck 112, and head 111 via the torso 104, supporting the robot 100 via the torso 104 while the robot 100 is docked can allow some or all of these appendages to be removed for servicing or replacement without undermining support for the overall robot 100. Furthermore, a location of the dock 700 at a posterior side of the torso 104 while the robot 100 is docked can facilitate convenient access to these appendages.

The dock 700 can include a main housing 702 and a support 704 carrying the main housing 702. In some cases, the main housing 702 is cantilevered from a base (not shown) via the support 704. The base can be wheeled to facilitate moving the robot 100 while the robot 100 is docked. In other cases, the main housing 702 can be suspended from an overhead structure (e.g., a ceiling beam) via the support 704. In still other cases, the support 704 can be omitted. In these and other cases, the main housing 702 can be directly connected to a base or directly connected to a beam or cable connected to an overhead structure. With reference again to the illustrated embodiment, the main housing 702 can define a height 706, a width 708, and a depth 710 perpendicular to one another. When the robot 100 is docked, the height 706 and the width 708 of the main housing 702 can be parallel to the midsagittal and transverse planes 102, 110, respectively. The dock 700 can include an upper portion 712, a lower portion 714, and an intermediate portion 716 therebetween along the height 706. The upper, lower, and intermediate portions 712, 714, 716 of the main housing 702 can have respective faces 718 (individually identified as faces 718a-718c) closest to the robot 100 while the robot 100 is docked. In at least some cases, the face 718b is inset along the depth 710 relative to the faces 718a, 718c.

At the upper portion 712 of the main housing 702, the dock 700 can include upper sidewalls 720 (individually identified as upper sidewalls 720a, 720b) spaced apart from one another along the width 708. Also at the upper portion 712 of the main housing 702, the dock 700 can include an upper backplate 722 extending between the upper sidewalls 720a, 720b along the width 708 and inset from the face 718a along the depth 710. At the lower portion 714 of the main housing 702, the dock 700 can include lower sidewalls 724 (individually identified as lower sidewalls 724a, 724b) spaced apart from one another along the width 708. Also at the lower portion 714 of the main housing 702, the dock 700 can include a lower backplate 726 extending between the lower sidewalls 724a, 724b along the width 708 and inset from the face 718c along the depth 710. At the upper portion 712 of the main housing 702, the dock 700 can define an upper recess 728 between the upper sidewalls 720a, 720b along the width 708 and between the face 718a and the upper backplate 722 along the depth 710. Similarly, at the lower portion 714 of the main housing 702, the dock 700 can define a lower recess 730 between the lower sidewalls 724a, 724b along the width 708 and between the face 718b and the lower backplate 726 along the depth 710

In at least some cases, the dock 700 is configured to receive the superior projection 116a at the upper recess 728 and to receive the inferior projection 116b at the lower recess 730. In these and other cases, the dock 700 can include a guide 732 and a hook 734 at the upper recess 728 neighboring one another along the height 706. The guide 732, in turn, can have a first region 736 and a second region 738 neighboring one another along the height 706. The dock 700 can be configured to receive the superior projection 116a and the charge-receiving electrodes 610 along a receiving path 740. The guide 732 can be upstream from the hook 734 along the receiving path 740. Furthermore, the first region 736 of the guide 732 can be upstream from the second region 738 of the guide 732 along the receiving path 740. In some cases, the receiving path 740 is nonlinear. For example, the guide 732 can be configured to receive the superior projection 116a and the charge-receiving electrodes 610 in a first receiving direction 742 whereas the hook 734 is configured to receive the superior projection 116a and the charge-receiving electrodes 610 thereafter in a second receiving direction 744 different than the first receiving direction 742. The second receiving direction 744 can be within 10 degrees (e.g., within 20 degrees or within 30 degrees) of perpendicular to the first receiving direction 742. Furthermore, the first receiving direction 742 can be within 10 degrees (e.g., within 20 degrees or within 30 degrees) of parallel to the transverse plane 110.

The guide 732 can be configured to align the superior projection 116a and the charge-receiving electrodes 610 with the hook 734 as the superior projection 116a and the charge-receiving electrodes 610 move along the receiving path 740. For example, the guide 732 at the first region 736 can be tapered inwardly in the first receiving direction 742. The guide 732 at the second region 738 can be tapered inwardly both in the first receiving direction 742 and in the second receiving direction 744. Sliding contact between the upper sidewall 720a and the first stem 600 and/or between the upper sidewall 720a and the curved junction between the first stem 600 and the rail 604 can urge the superior projection 116a and the charge-receiving electrodes 610 in a direction along the width 708 toward alignment with the hook 734. Correspondingly, sliding contact between the upper sidewall 720b and the second stem 602 and/or between the upper sidewall 720b and the curved junction between the second stem 602 and the rail 604 can urge the superior projection 116a and the charge-receiving electrodes 610 in an opposite direction along the width 708 toward alignment with the hook 734. In this and/or another way, the guide 732 can at least partially compensate for imperfect alignment of the superior projection 116a with the dock 700 as the robot 100 initially engages with the dock 700.

The dock 700 can include charge-dispensing electrodes 746 (individually identified as charge-dispensing electrodes 746a, 746b) at the hook 734. The charge-dispensing electrode 746b (shown schematically in FIG. 52) can be aligned with the charge-dispensing electrode 746a along the width 708 of the dock 700 such that the charge-dispensing electrodes 746a, 746b are positioned to contact the charge-receiving electrodes 610a, 610b, respectively, when the robot 100 is docked. The hook 734 can include a protrusion 748 configured to extend into the through opening 608 defined by the superior projection 116a when the robot 100 is docked. The dock 700 can support at least some (e.g., at least post or substantially all) of a weight of the robot 100 via the rail 604, the hook 734, the protrusion 748, and the superior projection 116a.

The protrusion 748 can be elongate along the width 708 of the dock 700 and can include a first region 750 and a second region 752 neighboring one another along the height 706 of the dock 700. The first region 750 of the protrusion 748 can be tapered outwardly and, to a greater extent, tapered inwardly along the height 706 of the dock 700. Between the second region 752 of the protrusion 748 and the upper backplate 722, the dock 700 can define a channel 754 shaped to snugly receive the rail 604 of the superior projection 116a. Through the first and second regions 736, 738 of the guide 732 and the first and second regions 750, 752 of the protrusion 748, the dock 700 can capture the superior projection 116a with progressively greater degrees of constraint as the superior projection 116a moves along the receiving path 740. When the robot 100 and the dock 700 are fully engaged (e.g., when the rail 604 is snugly received at the channel 754), the laterally elongate shape of the rail 604 and the corresponding shape of the channel 754 can inhibit rotation of the robot 100 about an axis perpendicular to the transverse plane 110. In these and other cases, the hook 734, in contrast, can be configured to allow the robot 100 to rotate about an axis perpendicular to the midsagittal plane 102 when the robot 100 is docked.

The charge-dispensing electrodes 746 can be at the channel 754, such as at an inwardly facing side of the protrusion 748 at the channel 754. Furthermore, the charge-dispensing electrodes 746 can be shaped to contact the charge-receiving electrodes 610 via a curved interface. For example, the charge-dispensing electrodes 746 can be curved in a plane perpendicular to the width 708 of the dock 700. In the illustrated case, the charge-dispensing electrodes 746 are fixedly connected to the dock 700. Contact between the charge-dispensing electrodes 746 and the charge-receiving electrodes 610, therefore, can be at least primarily dependent on a position of the charge-receiving electrodes 610 relative to the dock 700. Moreover, contact force between the charge-dispensing electrodes 746 and the charge-receiving electrodes 610 can be dependent on force that a weight of the robot 852 exerts on the dock 700 at least partially via a charging interface between the charge-dispensing electrodes 746 and the charge-receiving electrodes 610. In other embodiments, a counterpart of the charge-dispensing electrodes 746 can be resiliently carried by the dock 700. For example a counterpart of the charge-dispensing electrodes 746 can include an integrated or non-integrated spring that urges the counterpart of the charge-dispensing electrodes 746 into contact with the charge-receiving electrodes 610 by a predictable spring force in addition to or instead of force that a weight of the robot 852 exerts via the charging interface. This can be useful, for example, to decouple contact force at the charging interface from the manner in which the dock 700 supports the weight of the robot 852, thereby allowing the contact force at the charging interface to be adjusted via the spring to a level that promotes efficient charging and/or reduces the potential for electrode damage. Examples of resiliently carried charge-dispensing electrodes 746 are further described below with reference to FIGS. 64-67.

With reference again to the illustrated embodiment, the dock 700 can include a sensor 756, a computer 758, and a power source 760 operably associated with the charge-dispensing electrodes 746. The dock 700 can further include an electrical connector 762 (e.g., one or more wires) interconnecting the sensor 756, the computer 758, the power source 760, and the charge-dispensing electrodes 746. The sensor 756 can be configured to sense a characteristic of electrical contact between the charge-receiving electrodes 610 and the charge-dispensing electrodes 746. In some cases, the sensor 756 is a heat sensor configured to detect poor electrical contact between the charge-receiving electrodes 610 and the charge-dispensing electrodes 746 via heat generated at an interface between the charge-receiving electrodes 610 and the charge-dispensing electrodes 746. In addition or alternatively, the sensor 756 can be configured to measure electrical resistance between the charge-receiving electrodes 610 and the charge-dispensing electrodes 746 directly or in an indirect manner other than thermal.

The computer 758 can include processing circuitry 764 and non-transitory memory 766. In at least some cases, the non-transitory memory 766 stores instructions that, when executed via the processing circuitry 764, at least partially cause a rate of charging the battery 612 via the charge-receiving electrodes 610 and via the charge-dispensing electrodes 746 to increase when a characteristic of contact between the charge-receiving electrodes 610 and the charge-dispensing electrodes 746 indicates adequate electrical contact. The instructions can further cause sliding contact between the charge-receiving electrodes 610 and the charge-dispensing electrodes 746 when the sensed characteristic indicates inadequate electrical contact. Furthermore, the processing circuitry 764 and non-transitory memory 766 can have any suitable feature of the computing components 178 of the robot 100 described above with reference to FIG. 34. For example, counterparts of the processing circuitry 764 and the non-transitory memory 766 can be cloud-based rather than integrated into the dock 700. In addition or alternatively, counterparts of the sensor 756 and the computer 758 can be independent components of a system including the robot 100 and the dock 700 and can be operably associated with one another and with the robot 100 and the dock 700 within such a system.

At the lower recess 730, the lower sidewalls 724 and the lower backplate 726 can collectively serve as a stabilizer 768 spaced apart from the guide and from the hook 732, 734 along the height 706 of the dock 700. The stabilizer 768 can be configured to inhibit rotation of the robot 100 relative to the dock 700 about an axis perpendicular to the midsagittal plane 102. This can be useful, for example, to facilitate maintaining the robot 100 in a desirable upright position when docked. Furthermore, through the lower sidewalls 724 or otherwise, the stabilizer 768 can inhibit rotation of the robot 100 relative to the dock 700 about an axis parallel to the midsagittal and transverse planes 102, 110. This can be useful, for example, to reduce or prevent the robot 100 from twisting out of engagement with the dock 700 when a weight distribution of the robot 100 becomes unbalanced, such as when one of the arms 118a, 118b is removed for maintenance while the other remains attached to the torso 104. In the illustrated embodiment, the stabilizer 768 is configured to contact the inferior portion 108 of the torso 104 via the inferior projection 116b. In other embodiments, a counterpart of the stabilizer 768 can contact the inferior portion 108 of the torso 104 directly. For example, the inferior projection 116b can be omitted and the lower recess 730 can be replaced with a cushion or a cradle shaped to receive the inferior portion 108 of the torso 104. Furthermore, a counterpart of the stabilizer 768 can be configured to capture the inferior projection 116b or another structure of the robot 100 such that the robot 100 is effectively locked in engagement with the dock 700. For example, a counterpart of the stabilizer 768 can include a clasp (not shown) and an actuator configured to open or close the clasp and thereby secure or release the inferior projection 116b. When secured, the clasp and the protrusion 748 can together prevent movement of the robot 100 out of engagement with the dock 700.

Figure 56:
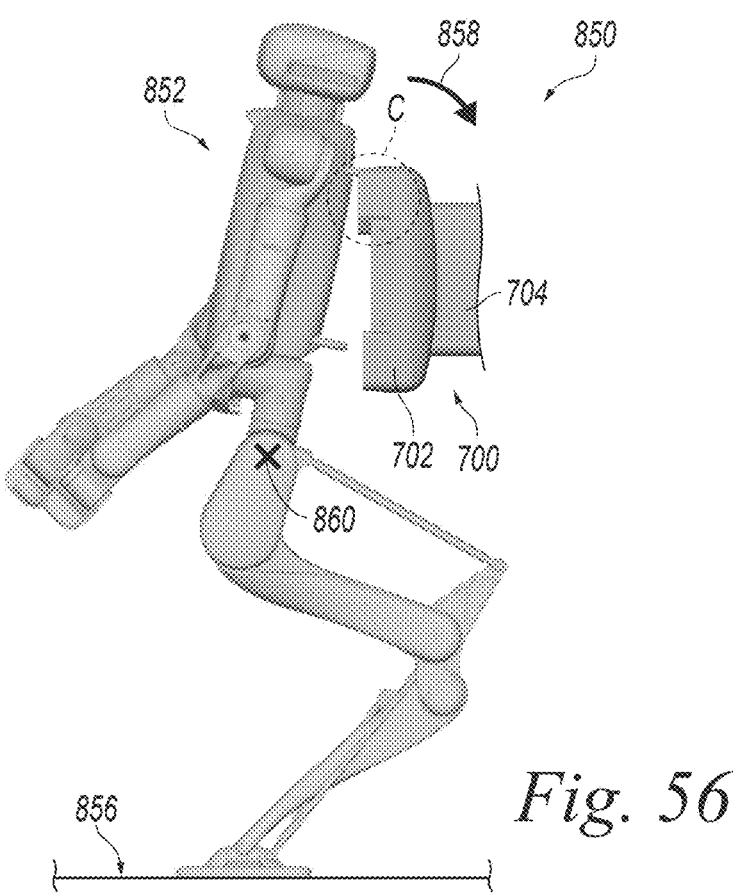
Figure 57:
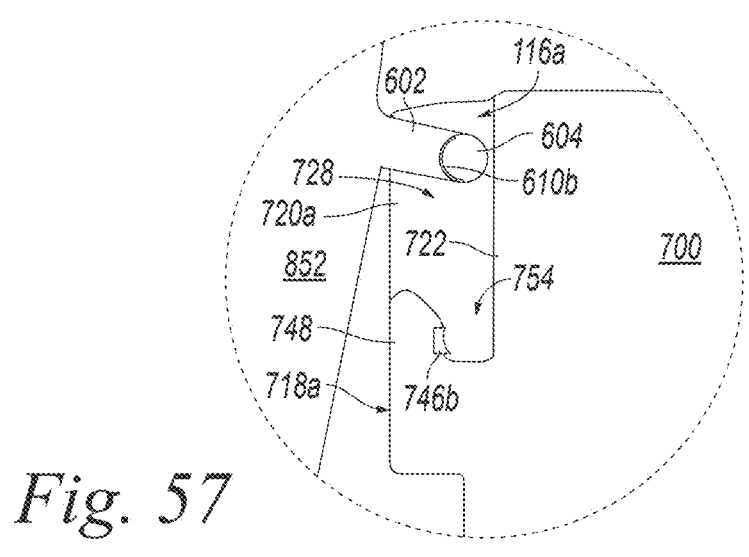
Figure 58:
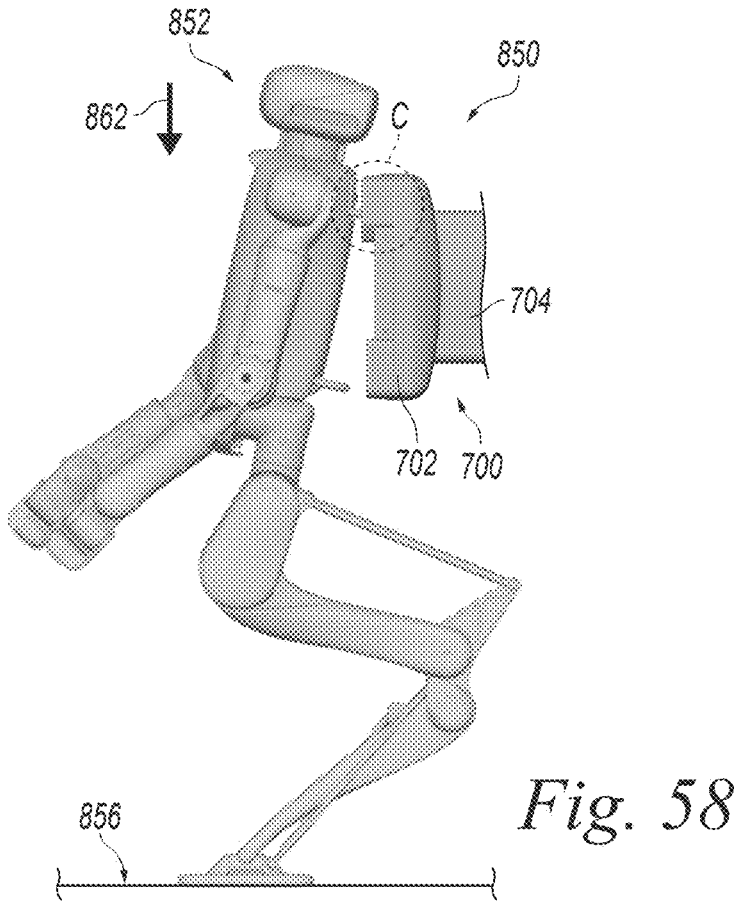
Figure 59:
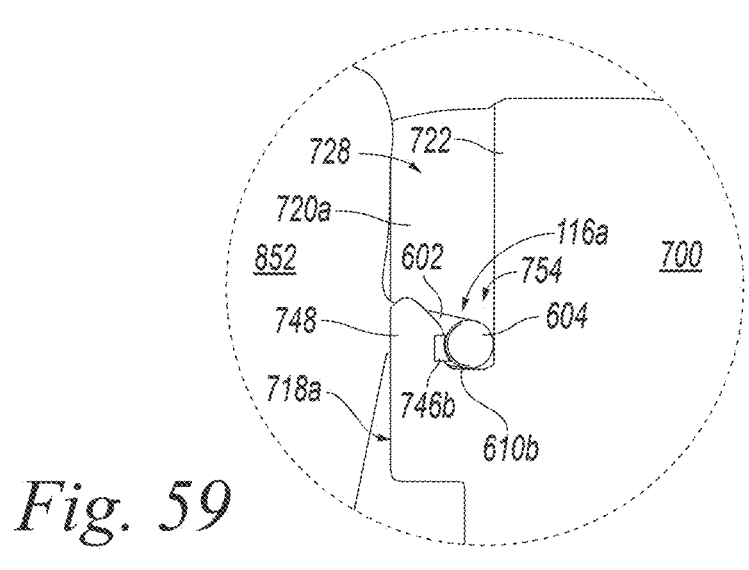
Figure 60:
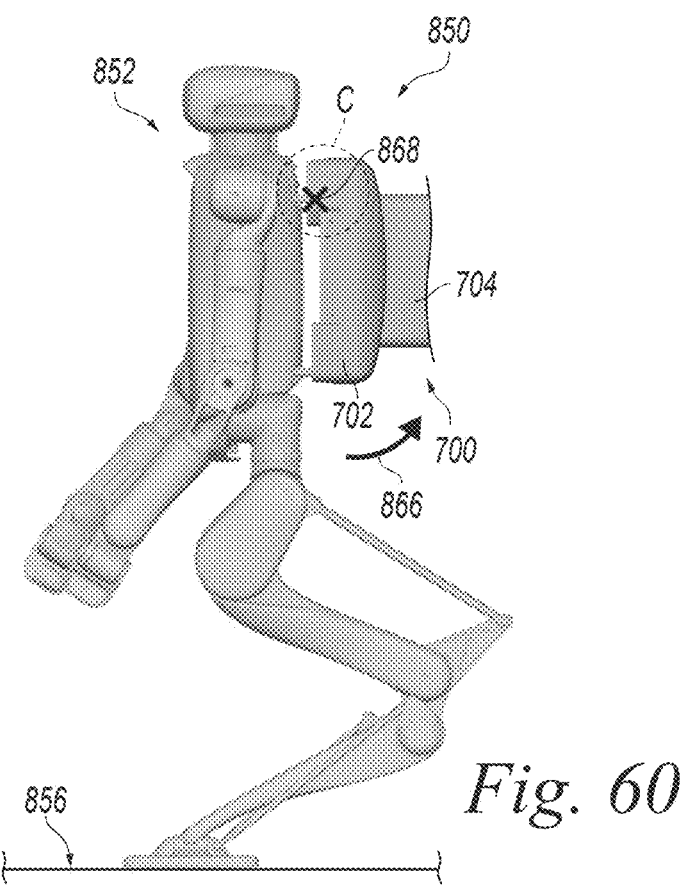

FIG. 53 is a block diagram corresponding to a method 800 for docking and charging a robot in accordance with at least some embodiments of the present technology. The block diagram includes blocks 802-826 corresponding to operations within the method 800. FIGS. 54-62 are side profile views and corresponding simplified cross-sectional views of a system 850 including the dock 700 and a robot 852 similar to the robot 100 at different respective times during the method 800. In particular, FIGS. 56, 58 and 60 show details at a region C of the system 850 at times during the method 800 corresponding to the times shown in FIGS. 56, 58 and 60, respectively. Reference numbers introduced above for the robot 100 may be used herein to identify similar or identical features of the robot 852. The system 850 can be transitionable between an undocked state in which the robot 852 and the dock 700 are spaced apart from one another and a docked state. When the robot 852 is in the docked state, the superior projection 116a (serving as a hanger) can be received at the hook 734. Also in the docked state, the dock 700 can support at least a portion of a weight of the robot 852 via the hook 734. Finally in the docked state, the charge-receiving electrodes 610 can be electrically connected to the charge-dispensing electrodes 746.

Figures 54, 55:
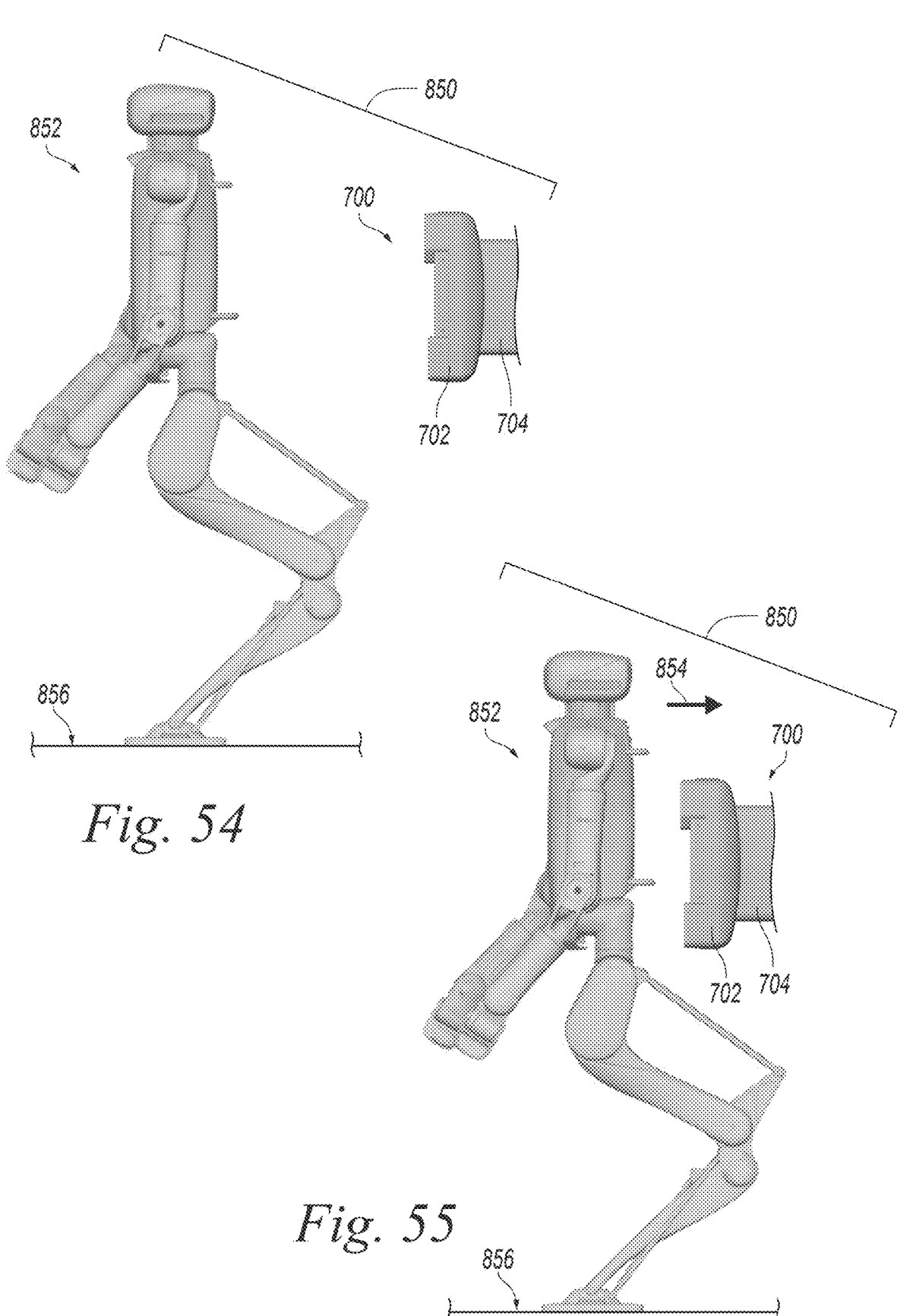

With reference to FIGS. 1-3 and 45-62 together, the method 800 can include ambulating the robot 852 toward the dock 700 (block 802) via movement of the legs 120a, 120b (e.g., bipedally). As shown in FIGS. 54 and 55, this operation can include ambulating the robot 852 over a ground surface 856 in the direction of arrow 854 and toward dock 700. In at least some cases, the robot 852 ambulates posteriorly along an anterior-posterior dimension defined by the robot 852. The dock 700 can include one or more fiducial markings (not shown) that the robot 852 detects to cause the robot 852 to move to a reference position relative to the dock 700. In at least some cases, the robot 852, when in a charge-seeking state, recognizes the fiducial markings and switches from a forward ambulation mode to a rearward ambulation mode. Once the robot 852 is in the reference position, the robot 852 can execute a predetermined docking process independent of the fiducial markings. As part of such a predetermined docking process or otherwise, the method 800 can include tilting the superior portion 106 of the torso 104 relative to the inferior portion 108 of the torso 104 (block 804). As shown in FIG. 56, this tilting can occur in connection with rotating the superior portion 106 of the torso 104 in the direction of arrow 858 about an axis 860 perpendicular to the midsagittal plane 102, such as via the leg actuators 176c, 176i and the proximal thigh joints 162c, 162i. The tilting can end at a predetermined extent and/or in response to feedback associated with contact between the superior projection 116a and the dock 700.

The method 800 can include receiving the superior projection 116a at the dock 700 in connection with tilting the superior portion 106 of the torso 104 relative to the inferior portion 108 of the torso 104. In at least some cases, this includes receiving the superior projection 116a at the guide 732 in the first receiving direction 742 (block 806). The method 800 can further include slidingly contacting the superior projection 116a and the guide 732 (block 808) while moving the superior projection 116a in the first receiving direction 742. Through this sliding contact, the guide 732 can urge the superior projection 116a into alignment with the hook 734. As shown in FIGS. 58 and 59, the method 800 can next include moving the superior projection 116a in the second receiving direction 744 toward the hook 734 (block 810) and receiving the superior projection 116a at the hook 734 (block 812). In at least some cases, the robot 852 bends the legs 120a, 120b to cause the torso 104 to move in the direction of arrow 862. While moving in the second receiving direction 744 from the guide 732 toward the hook 734, the superior projection 116a can further contact the guide 732 and thereby further align with the hook 734. The method 800 can then include contacting the charge-receiving electrodes 610 and the charge-dispensing electrodes 746 (block 814) at a charging interface 864. The charging interface 864 can be curved about an axis perpendicular to the midsagittal plane 102 and to the width 708 of the dock 700. In some cases, the charging interface 864 is stationary relative to the dock 700. In other cases, a counterpart of the charging interface 864 moves relative to the dock 700. For example, the method 800 can include deflecting (e.g., resiliently deflecting) a counterpart of the charge-dispensing electrodes 746. This deflection can occur, for example, while the counterpart of the charge-dispensing electrodes 746 is in contact with the charge-receiving electrodes 610.

Figure 61:
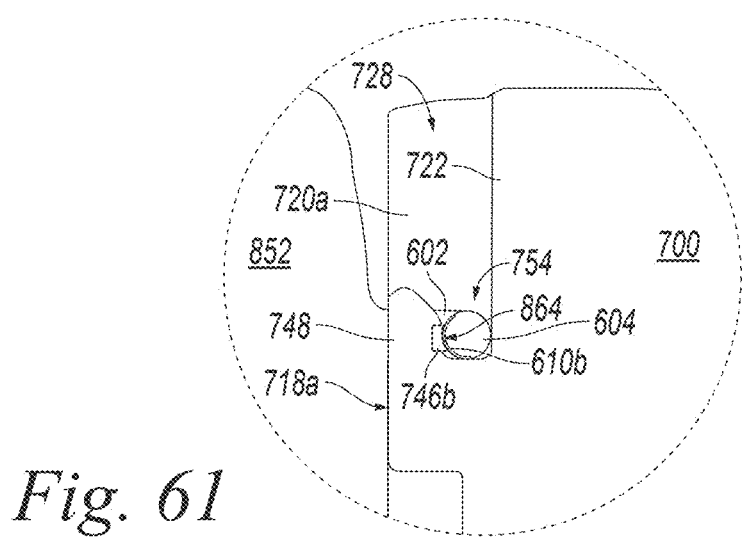

The method 800 can further include transferring at least a portion of a weight of the robot 852 to the dock 700 (block 818). As shown in FIGS. 60 and 61, the method 800 can relatedly include tilting the inferior portion 108 of the torso 104 relative to the superior portion 106 of the torso 104 (block 820). This tilting can occur in connection with rotating the inferior portion 108 of the torso 104 in the direction of arrow 866 about an axis 868 perpendicular to the midsagittal plane 102. In at least some cases, a curvature of the charging interface 864 at least partially defines the axis 868. In these and other cases, the rotation can be actuated simply by releasing some or all active actuation of the legs 120a, 120b. Accordingly, support for a weight of the robot 852 can transfer from the legs 120a, 120b to the dock 700. Thus, the dock 700 can support at least a portion of (e.g., at least most of or substantially all of) the weight of the robot 852 via the superior projection 116a and the hook 734. As also shown in FIG. 60, the method 800 can include contacting the stabilizer 768 and the body 103 of the robot 852, such as via the inferior projection 116b and the inferior portion 108 of the torso 104 (block 822). This can occur, for example, while transferring weight to the dock 700. In at least some cases, the contact inhibits further rotation of the body 103 about the axis 868 and inhibits further rotation of the inferior portion 108 of the torso 104 relative to the superior portion 106 of the torso 104 about the axis 868. In these and other cases, the torso 104 can be upright (e.g., at or near vertical) when the stabilizer 768 is in contact with the dock 700.

Transferring weight to the dock 700 and tilting the inferior portion 108 of the torso 104 toward the dock 700 can cause relative movement between the charge-dispensing electrodes 746 and the charge-receiving electrodes 610 at the charging interface 864. In at least some cases, this relative movement cleans the charging interface 864, such as by displacing dirt and/or corrosion through mechanical action (e.g., wiping, scraping, etc.). As discussed above, cleaning the charging interface 864 can be useful to improve electrical contact between the robot 852 and the dock 700 and thereby facilitate charging the robot 852 via the dock 700. The method 800 can further include determining if electrical contact between the charge-dispensing electrodes 746 and the charge-receiving electrodes 610 is adequate (block 824). For example, the method 800 can include sensing a characteristic of electrical contact between the charge-receiving electrodes 610 and the charge-dispensing electrode 746 and increasing (e.g., from zero) a rate of charging at least partially in response to the characteristic indicating that the electrical contact is adequate. The sensing can be via the sensor 756 and/or via the processing circuitry 764 acting as a sensor. Examples of related testing processes are described above with reference to FIGS. 37 and 38 and below with reference to FIG. 63.

If the testing indicates adequate electrical contact, the method 800 can proceed with charging the battery 612 (block 826) via the dock 700. If the testing indicates inadequate electrical contact, the method 800 can return to tilting the inferior portion 108 of the torso 104 to cause additional cleaning at the charging interface 864. Accordingly, the method 800 can include actuating rotation of the robot 852 relative to dock 700 about the axis 868 at least partially in response to a sensed characteristic indicating inadequate electrical contact between the charge-receiving electrode 610 and the charge-dispensing electrode 746. This rotation can, in turn, cause sliding contact between the charge-dispensing electrode 746 and the charge-receiving electrode 610 at the charging interface 864. The cycle of testing electrical contact at the charging interface 864 and moving the robot 852 relative to the dock 700 can continue until the system 850 determines that the electrical contact is adequate or that a maximum number of attempts to establish adequate electrical contact is exceeded. In the latter case and when charging is complete under normal conditions, the processes of the method 800 can proceed in reverse to transition the system 850 from the docked state to the undocked state.

Figure 62:
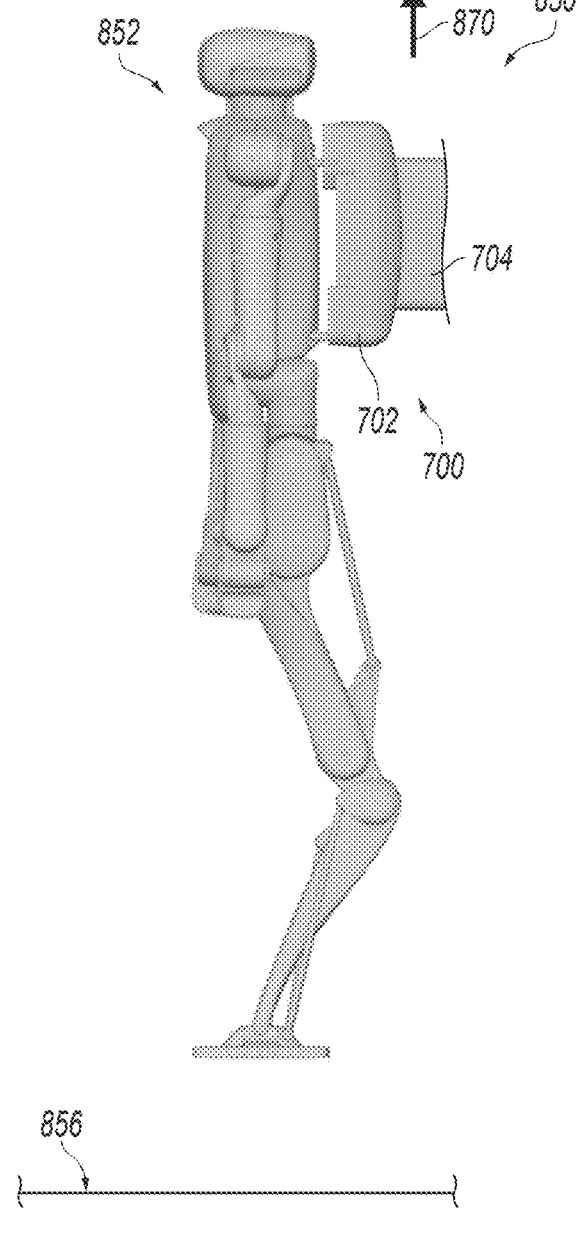

When the system 850 is in the docked state, the robot 852 and the dock 700 can remain in the configuration shown in FIG. 60. Alternatively, the robot 852, the dock 700, or both can move into a different configuration, such as a more compact configuration. For example, when the dock 700 is connected to an overhead support structure and in other cases, the dock 700 can move upward in the direction of arrow 870 as shown in FIG. 62. When the robot 852 is in a fully unactuated state, gravity can cause the arms 118a, 118b and the legs 120a, 120b to shift toward vertical alignment. In this state, the system 850 can be particularly compact. Moreover, when space is available, the robot 852 and the dock 700 can move vertically to an overhead position away from ground-level objects and activity. This can be useful, for example, when ground-level space is too scarce to be occupied by stationary docked robots. Furthermore, large numbers of docked robots 852 in compact configurations can be shifted horizontally (e.g., after shifting vertically) into a dense arrangement that occupies relatively little space. Individual robots 852 can then be deployed as needed from this arrangement.

FIG. 63 is a block diagram corresponding to a method 900 for testing electrical contact between the dock 700 and the robot 852 in accordance with at least some embodiments of the present technology. As shown in FIG. 63, the method 900 can begin with the robot 852 requesting charge (block 902) from the dock 700. For example, the robot 852 can pulse a microprocessor of the computer 613 to send a serial data packet to the dock 700 via the charging interface 864. The dock 700 can then acknowledge the request (block 904). For example, a microprocessor of the processing circuitry 764 can receive and interpret the serial data packet sent from the robot 852 and check for a correct packet. In this or another suitable manner, the system 850 can prevent the charge-dispensing electrodes 746 from dispensing charge inappropriately, such as when a person touches the charge-dispensing electrodes 746. The dock 700 can then send an acknowledgement that it has received the correct packet. This acknowledgement can take the form, for example, of a single pulse of specific duration. The method 900 can then proceed with the dock 700 communicating its status to the robot 852 (block 906) and the robot 852 acknowledging this status (block 908). Similar to the request for charging, the status communication can be via one or more serial data packets communicated via the charging interface 864. The acknowledgement, again, can be a single pulse of specific duration.

If the dock 700 does not indicate any faults that would prohibit charging, the method 900 can proceed with testing resistance at the charging interface 864. As part of the resistance test, the robot 852 can create a short circuit (block 910) between charge-receiving electrodes 610a, 610b. The short circuit can be controlled via a microprocessor of the computer 613. When the short circuit is active, a voltage difference between the charge-receiving electrodes 610a, 610b can collapse to a very low voltage. The dock 700 can detect this voltage change via the sensor 756 and/or via the processing circuitry 764 (block 912). The dock 700 can then drive a known current (e.g., 1 amp) via a conductive path including the charge-receiving electrodes 610a, 610b in series (block 914). The dock 700 can then detect a voltage corresponding to the known current (block 916) and determine a resistance at the charging interface 864 based on this voltage (block 918). Finally, the dock 700 can compare the resistance to a threshold (block 920). If the resistance is above the threshold, the dock 700 can determine that the test failed. Alternatively, the dock 700 can determine that the test passed.

FIGS. 64-67 are simplified cross-sectional views of other types of charge-dispensing electrodes of systems in accordance with at least some embodiments of the present technology. The charge-dispensing electrodes shown in FIGS. 64-67 are resiliently carried by the corresponding docks. As discussed above, this can be useful, for example, to reduce and/or to regulate contact force at a charging interface. With reference to FIGS. 45-52 and 64 together, a dock 950 similar to the dock 700, can include a charge-dispensing electrode 952 resiliently carried by a protrusion 954 similar to the protrusion 748. The dock 950 can include a spring 956 disposed within a cavity 958 defined by the protrusion 954. The spring 956 and the charge-dispensing electrode 952 can be configured to resiliently deflect at least partially in response to contact with at least one of the charge-receiving electrodes 610a, 610b as a system including the dock 950 transitions from an undocked state toward a docked state. In addition or alternatively, the charge-dispensing electrode 952 can be configured to resiliently deflect at least partially in response to contact with at least one of the charge-receiving electrodes 610a, 610b as the dock 950 receives the superior projection 116a along the receiving path 740. Furthermore, the charge-dispensing electrode 952 can be configured to slidingly contact at least one of the charge-receiving electrodes 610a, 610b as a system including the dock 950 transitions from the undocked state toward the docked state. Like the charge-dispensing electrodes 746, the charge-dispensing electrode 952 can be shaped to contact at least one of the charge-receiving electrodes 610a, 610b via a curved charging interface.

With reference to FIGS. 45-52 and 65 together, a dock 960 similar to the dock 700, can include a charge-dispensing electrode 962 resiliently carried by the protrusion 748. The charge-dispensing electrode 962 can include a flap 964 and a living hinge 966 through which the flap 964 is connected to the protrusion 748. With reference to FIGS. 45-52 and 66 together, a dock 970 similar to the dock 700, can include a charge-dispensing electrode 972 resiliently carried by the upper backplate 722. The charge-dispensing electrode 972 can include a straight contact 974 and a hinge 976 through which the straight contact 974 is hingedly connected to the upper backplate 722. In at least some cases, the straight configuration of the charge-dispensing electrode 972 enhances mechanical removal of corrosion, dirt, etc. in response to sliding contact with a curved surface of at least one of the charge-receiving electrodes 610a, 610b. Finally, with reference to FIGS. 45-52, 65 and 67 together, a dock 980 similar to the dock 700, can include a charge-dispensing electrode 982 including the flap 964 and living hinge 966 shown in FIG. 65, an additional flap 986, and an additional living hinge 988 through which the additional flap 986 is resiliently connected to the upper backplate 722. The charge-dispensing electrode 982 can be configured, for example, to contact a counterpart of the charge-receiving electrodes 610 that extends around a full circumference of the rail 604.

CONCLUSION

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may be disclosed herein in the context of those embodiments, other embodiments may also exhibit such advantages, and not all embodiments need necessarily exhibit such advantages or other advantages disclosed herein to fall within the scope of the present technology. This disclosure and the associated technology can encompass other embodiments not expressly shown or described herein.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Any reference herein to "the inventors" means at least one inventor of the present technology. As used herein, the terms "generally," "substantially," "about," and similar terms are used as terms of approximation and not as terms of degree, and are intended to account for the inherent variations in measured or calculated values that would be recognized by those of ordinary skill in the art. Additionally, the terms "comprising," "including," "having," and the like are used throughout this disclosure to mean including at least the recited feature(s) such that any greater number of the same feature(s) and/or one or more additional types of features are not precluded. This is the case even if a particular number of features is specified unless that specified number is preceded by the word "exactly" or another clear indication that it is intended to be closed ended. In a particular example, "comprising two arms" means including at least two arms.

Directional terms, such as "upper," "lower," "front," "back," "vertical," and "horizontal," may be used herein to express and clarify the relationship between various structures. It should be understood that such terms do not denote absolute orientation. Similarly, terms of anatomical direction, such as "distal" and "medial," may be used herein to express and clarify the relationship between various structures. In the context of the robot 100 and in the absence of a statement to the contrary, such terms refer to the robot 100 in the first state shown in FIGS. 1-3. Furthermore, terms corresponding to anatomical parts (e.g., "wrist," "elbow," "hip," "thigh," "calf," "torso," etc.) may be assigned arbitrarily and are intended to be interpreted in the context of the described embodiments rather than in the context of a human. Reference herein to "one embodiment," "an embodiment," or similar phrases means that a particular feature, structure, or operation described in connection with such phrases can be included in at least one embodiment of the present technology. Thus, such phrases as used herein are not all referring to the same embodiment. Unless preceded with the word "conventional," reference herein to "counterpart" devices, systems, methods, features, structures, or operations refers to devices, systems, methods, features, structures, or operations in accordance with at least some embodiments of the present technology that are similar to a described device, system, method, feature, structure, or operation in certain respects and different in other respects. Finally, it should be noted that various particular features, structures, and operations of the embodiments described herein may be combined in any suitable manner in additional embodiments in accordance with the present technology.

We claim:

1. A method comprising:

ambulating a robot posteriorly along an anterior-posterior dimension defined by the robot toward a dock operably associated with the robot within a system, wherein ambulating the robot includes ambulating the robot via movement of a plurality of legs of the robot;

tilting a superior portion of a torso of a body of the robot relative to an inferior portion of the torso about a first tilting axis perpendicular to a sagittal plane defined by the robot, wherein tilting the superior portion of the torso at least partially causes a hanger of the robot to be received at the dock;

tilting the inferior portion of the torso relative to the superior portion of the torso toward the dock about a second tilting axis perpendicular to the sagittal plane after the hanger is received at the dock;

slidingly contacting the hanger and the dock at an interface between the hanger and the dock while tilting the inferior portion of the torso relative to the superior portion of the torso, wherein the interface is curved about the second tilting axis;

moving the plurality of legs to transfer at least a portion of a weight of the robot to the dock via the hanger after receiving the hanger at the dock; and charging a battery of the robot via the dock after transferring at least the portion of the weight of the robot to the dock.

2. The method of claim 1, further comprising contacting a stabilizer of the dock and the inferior portion of the torso after tilting the inferior portion of the torso, wherein contact between the stabilizer and the inferior portion of the torso inhibits further rotation of the inferior portion of the torso relative to the superior portion of the torso about the second tilting axis.

3. The method of claim 1, wherein:

tilting the superior portion of the torso at least partially causes the hanger to be received in a first receiving direction at a guide of the dock;

the method further comprises moving the hanger in a second receiving direction from the guide to a hook of the dock after receiving the hanger at the guide;

the first receiving direction is different from the second receiving direction; and moving the plurality of legs to transfer at least the portion of the weight of the robot to the dock includes moving the plurality of legs to transfer at least the portion of the weight of the robot to the dock via the hanger and via the hook.

4. The method of claim 3, further comprising slidingly contacting the hanger and the guide while moving the hanger in the second receiving direction, where slidingly contacting the hanger and the guide urges the hanger into alignment with the hook.

5. The method of claim 4, wherein the second receiving direction is within 20 degrees of perpendicular to the first receiving direction.

6. The method of claim 4, wherein:

during the method, the dock includes a base and a main housing cantilevered from the base; and the hook is at the main housing.

7. The method of claim 1, wherein ambulating the robot posteriorly includes ambulating the robot posteriorly bipedally.

8. The method of claim 7, wherein:

ambulating the robot posteriorly bipedally includes ambulating the robot posteriorly bipedally along a ground surface;

during the method, the dock is connected to an overhead support structure; and the method further comprises moving the dock upward relative to the ground surface while the hanger is received at the dock.

9. The method of claim 8, wherein moving the dock upward relative to the ground surface causes individual legs among the plurality of legs to straighten by gravity.

10. The method of claim 1, wherein transferring at least the portion of the weight of the robot includes transferring at least most of the weight of the robot.

11. The method of claim 1, wherein transferring at least the portion of the weight of the robot includes transferring substantially all of the weight of the robot to the dock.

12. The method of claim 1, wherein, during the method, the hanger extends posteriorly from the body.

13. The method of claim 1, wherein, during the method, the hanger is connected to the body via the superior portion of the torso.

14. The method of claim 13, wherein, during the method, the plurality of legs is connected to the body via the inferior portion of the torso.

15. The method of claim 1, wherein, during the method, the plurality of legs is connected to the body via the inferior portion of the torso.

16. A system, comprising:

a robot defining a sagittal plane and including:

a charge-receiving electrode curved about an axis perpendicular to the sagittal plane, and a battery configured to be charged via the charge-receiving electrode;

a dock operably associated with the robot, wherein the dock includes a charge-dispensing electrode shaped to contact the charge-receiving electrode via a curved charging interface;

a sensor operably associated with the robot and with the dock, wherein the sensor is configured to sense a characteristic of electrical contact between the charge-receiving electrode and the charge-dispensing electrode; and a computer operably associated with the robot, with the dock, and with the sensor, wherein the computer includes:

processing circuitry, and memory storing non-transitory instructions that, when executed via the processing circuitry, at least partially cause:

a rate of charging the battery via the charge-receiving electrode and via the charge-dispensing electrode to increase when the characteristic indicates adequate electrical contact between the charge-receiving electrode and the charge-dispensing electrode, and sliding contact between the charge-dispensing electrode and the charge-receiving electrode at the curved charging interface when the characteristic indicates inadequate electrical contact between the charge-receiving electrode and the charge-dispensing electrode.

17. The system of claim 16, wherein the charge-dispensing electrode is resiliently carried by the dock.

18. The system of claim 17, wherein:

the system is transitionable between:

an undocked state in which the robot and the dock are spaced apart from one another, and a docked state in which the charge-receiving electrode is electrically connected to the charge-dispensing electrode; and the charge-dispensing electrode is configured to resiliently deflect at least partially in response to contact with the charge-receiving electrode as the system transitions from the undocked state toward the docked state.

19. The system of claim 17, wherein:

the charge-receiving electrode is at a hanger of the robot;

the charge-dispensing electrode is at a hook of the dock; and the dock is configured to support at least most of a weight of the robot via the hanger and via the hook while charging the battery.

20. The system of claim 16, wherein:

the robot includes:

a body, a plurality of legs connected to the body, and a hanger extending posteriorly from the body;

the robot is configured to ambulate via the plurality of legs; and the charge-receiving electrode is at the hanger.

\* \* \* \* \*